US012529792B2

(12) United States Patent
Wang et al.

(10) Patent No.: US 12,529,792 B2
(45) Date of Patent: *Jan. 20, 2026

(54) LIDAR, METHOD FOR CONTROLLING THE SAME, AND APPARATUS INCLUDING LIDAR

(71) Applicant: SUTENG INNOVATION TECHNOLOGY CO., LTD., Shenzhen (CN)

(72) Inventors: Chao Wang, Shenzhen (CN); Songshan Hou, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 934 days.

This patent is subject to a terminal disclaimer.

(21) Appl. No.: 17/704,088

(22) Filed: Mar. 25, 2022

(65) Prior Publication Data

US 2022/0390603 A1    Dec. 8, 2022

Related U.S. Application Data

(63) Continuation of application No. PCT/CN2020/117217, filed on Sep. 23, 2020.

(30) Foreign Application Priority Data

Sep. 26, 2019   (CN) .......................... 201910917732.X
Jan. 6, 2020    (WO) ................. PCT/CN2020/070547

(51) Int. Cl.
    *G01S 17/08*    (2006.01)
    *G01S 17/931*   (2020.01)

(52) U.S. Cl.
    CPC ............ *G01S 17/08* (2013.01); *G01S 17/931* (2020.01)

(58) Field of Classification Search
    CPC ........ G01S 17/08; G01S 7/4811; G01S 17/02; G01S 17/4816; G01S 17/931; G01S 17/87
    See application file for complete search history.

(56) References Cited

U.S. PATENT DOCUMENTS 5,808,797 A *   9/1998   Bloom .................... B81B 3/001
                                                      348/755
8,264,667 B2 *  9/2012   Troost ................. G03F 7/70408
                                                      355/53
(Continued)

FOREIGN PATENT DOCUMENTS

CN    103608696 A    2/2014
CN    105659108 A    6/2016
(Continued)

OTHER PUBLICATIONS

International Search Report issued in corresponding International Application No. PCT/CN2020/070547, mailed Oct. 13, 2020, 5 pages.
(Continued)

Primary Examiner — Assres H Woldemaryam
(74) Attorney, Agent, or Firm — BAYES PLLC

(57) ABSTRACT

This application discloses a LiDAR and an apparatus. The LiDAR includes: a casing, demarcating an emission chamber and a receiving chamber; a laser emission device, arranged in the emission chamber and configured to emit a laser beam to the first target region; and a plurality of laser receiving devices, arranged in the receiving chamber. The plurality of laser receiving devices receive a laser beam reflected from the second target region, and the first target region and the second target region are at least partially overlapped. The second target region includes a plurality of detection subregions, each detection subregion is smaller than the first target region and is at least partially overlapped (Continued)

with the first target region, and each laser receiving device receives, in a one-to-one correspondence manner, a laser beam reflected from each detection subregion.

6 Claims, 43 Drawing Sheets

(56) References Cited

U.S. PATENT DOCUMENTS

| | | | |
|---|---|---|---|
| 10,809,358 B2* | 10/2020 | Becker | G01S 17/04 |
| 2003/0147082 A1* | 8/2003 | Goldstein | G03F 7/70408 |
| | | | 356/450 |
| 2005/0057735 A1* | 3/2005 | Smith | G03F 7/70408 |
| | | | 355/53 |
| 2005/0088633 A1* | 4/2005 | Borodovsky | G03F 7/70466 |
| | | | 355/77 |
| 2015/0055117 A1* | 2/2015 | Pennecot | G01S 7/4812 |
| | | | 356/4.01 |
| 2016/0091364 A1 | 3/2016 | Tu et al. | |
| 2018/0203102 A1* | 7/2018 | Wang | G01S 7/4815 |
| 2019/0377093 A1 | 12/2019 | Wiebold et al. | |
| 2022/0390603 A1* | 12/2022 | Wang | G01S 17/08 |

FOREIGN PATENT DOCUMENTS

| | | | | |
|---|---|---|---|---|
| CN | 206161860 U | | 5/2017 | |
| CN | 207557480 U | | 6/2018 | |
| CN | 108414999 A | | 8/2018 | |
| CN | 109709529 A | | 5/2019 | |
| CN | 109725299 A | | 5/2019 | |
| CN | 109814082 A | | 5/2019 | |
| CN | 109870708 A | | 6/2019 | |
| CN | 109884656 A | | 6/2019 | |
| CN | 110174660 A | | 8/2019 | |
| CN | 110412602 A * | 11/2019 | G01S 7/481 |
| JP | H08327737 A | | 12/1996 | |
| JP | H08327738 A | | 12/1996 | |
| JP | 2010060309 A | | 3/2010 | |
| JP | 5697478 B2 | | 4/2015 | |

OTHER PUBLICATIONS

International Search Report issued in corresponding International Application No. PCT/CN2020/117217, mailed Dec. 28, 2020, 5 pages.
First Office Action issued in related Chinese Application No. 202080004982.5, mailed May 19, 2023, 11 pages.
First Office Action issued in related Chinese Application No. 201910917732.X, mailed Apr. 24, 2023, 6 pages.

* cited by examiner

LIDAR, METHOD FOR CONTROLLING THE SAME, AND APPARATUS INCLUDING LIDAR

CROSS-REFERENCE TO RELATED APPLICATION

The present application is a continuation of International Application No. PCT/CN2020/117217, filed on Sep. 23, 2020, and also claims priority to International Application No. PCT/CN2020/070547, filed on Jan. 6, 2020, and Chinese Patent Application No. 201910917732.X, filed on Sep. 26, 2019, all of which are incorporated herein by reference in their entireties.

TECHNICAL FIELD

This application relates to the technical field of laser detection, and in particular, to a LiDAR, a method for controlling the same, and an apparatus including the LiDAR.

BACKGROUND

With development and application of optical technologies, many LiDAR systems that emit laser beams to detect characteristics of a target object, such as a position and a speed, emerge, and the LiDAR systems have been widely applied to various fields, such as distance measuring, tracking and measurement of low-altitude flying targets, weapon guidance, atmospheric monitoring, mapping, early warning, and traffic management. Especially, in the field of automated driving, the LiDAR systems are often used to detect and photograph surroundings of a vehicle in a field of view, so that an automated vehicle can plan a correct driving route based on information detected by the LiDAR systems.

Currently, flash LiDAR systems are widely applied to automated vehicles due to their advantages such as simple structures, low system loads, and long lifespans of optical receivers/transmitters, to detect near-field surroundings of the vehicles. A basic working principle of the flash LiDAR system is that a transmitting end emits lasers to illuminate an entire field of view area to be detected at one time through "floodlight," and a receiving end receives all reflected lasers in the field of view area by using a corresponding detector, to obtain detection information in the field of view area by analyzing the reflected lasers.

However, in the flash LiDAR system, there is a limited range of angles of view for an outgoing laser, which causes a relatively large detection blind area to the flash LiDAR system and reduces an obstacle avoidance capability of a vehicle using the flash LiDAR system. In addition, a detection distance of the existing flash LiDAR system is insufficient. To increase the detection distance, transmission power needs to be significantly increased, which greatly increases power consumption, a thermal effect, and device costs of the system.

BRIEF SUMMARY

Embodiments of this application provide a LiDAR, a method for controlling the same, and an apparatus including the LiDAR, which can reduce a detection blind spot and effectively improve energy utilization of an outgoing laser.

According to an aspect of this application, a LiDAR system is provided, where the LiDAR system includes: at least two laser transceiver components; detection regions corresponding to the at least two laser transceiver components are spliced; each detection region is divided into at least two detection subregions along a vertical direction, and each detection subregion is aligned with a different angle range of the detection region along the vertical direction; and each laser transceiver component includes a laser emission device and a laser receiving device that are correspondingly arranged;
  the laser emission device is configured to emit an outgoing laser in a preset direction to a corresponding detection region; and
  the laser receiving device is configured to receive a reflected laser returned after the outgoing laser is reflected by an object in the corresponding detection region.

According to a second aspect of this application, a method for controlling a LiDAR system is provided and applied to the LiDAR system, where the LiDAR system includes: at least two laser transceiver components; detection regions corresponding to the at least two laser transceiver components are spliced; each detection region is divided into at least two detection subregions along a vertical direction, and each detection subregion is aligned with a different angle range of the detection region along the vertical direction; each laser transceiver component includes a laser emission device and a laser receiving device that are correspondingly arranged; and the method includes:
  controlling the laser emission device to emit an outgoing laser in a preset direction to a corresponding detection region; and
  controlling a laser receiving device to receive a reflected laser returned after the outgoing laser is reflected by an object in the corresponding detection region.

According to a third aspect of this application, a LiDAR is provided and includes:
  a casing, demarcating an emission chamber and a receiving chamber;
  a laser emission device, arranged in the emission chamber and configured to emit a laser beam to a first target region; and
  a plurality of laser receiving devices, arranged in the receiving chamber, where the plurality of laser receiving devices can receive a laser beam reflected from a second target region, and the first target region and the second target region are at least partially overlapped,
  where the second target region includes a plurality of detection subregions, each detection subregion is less than the first target region and at least partially overlaps with the first target region, and each laser receiving device receives, in a one-to-one correspondence manner, a laser beam reflected from each detection subregion.

According to a fourth aspect of the embodiments of this application, an apparatus is further provided and includes the LiDAR in any one of the foregoing aspects.

Based on the LiDAR system provided in this application, two or more laser transceiver components are combined or spliced, which can enlarge the detection region of the LiDAR system in the horizontal directions and implement a large-angle detection region, thereby reducing a range of blind spots on both horizontal sides of the outgoing laser of the LiDAR system and improving an obstacle avoidance capability of the vehicle using the LiDAR system. In addition, based on an actual need, a different detection subregion is used to match the laser emission device, which avoids a waste of light energy caused by mismatch between the detection subregion and energy density of the outgoing laser and improves utilization of light energy in each detection subregion, thereby meeting an application need for system detection, also reducing overall power consumption of the LiDAR system, and further reducing manufacture costs of the LiDAR system. A LiDAR is further provided, where the laser emission device and the laser receiving device are arranged independently in the LiDAR, and there are at least two laser receiving devices. Compared with the structure with only one laser receiving device in the prior art, the plurality of laser receiving devices are added, which can enlarge the receiving field of view and increase the detection angle of view, thereby reducing a detection blind spot of the LiDAR.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show merely some embodiments of this application, and a person skilled in the art may still derive other drawings from these accompanying drawings without creative efforts.

DETAILED DESCRIPTION

To make the objectives, technical solutions, and advantages of this application more comprehensible, the following further describes this application in detail with reference to accompanying drawings and embodiments. It should be understood that the specific embodiments described herein are merely used to explain this application but are not intended to limit this application.

Figure 1:
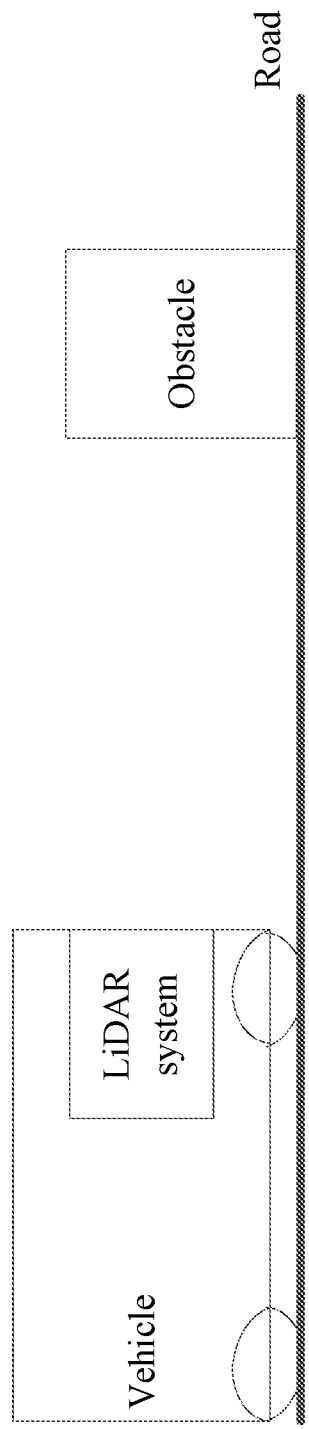
FIG. 1 is a schematic diagram of an application scenario according to an embodiment.

The LiDAR provided in this application may be applied to any apparatus that needs to perform laser detection, such as a vehicle in an application environment shown in FIG. 1.

The LiDAR can detect parameters such as a distance and a speed of the vehicle relative to an obstacle. The vehicle detects a nearby moving or approaching obstacle through a LiDAR system, such as a taller vehicle, a still object on a roadside, or an abruptly approaching flying object, so that the vehicle can plan a path based on detected information to avoid the obstacle and the vehicle can avoid collision with the obstacle. The vehicle may be an automated vehicle or a common vehicle. This is not limited to this application.

Currently, a method for identifying an obstacle by a vehicle through a LiDAR system in a surrounding environment has been widely applied, and especially the flash LiDAR system is widely applied to near-field detection of the vehicle. However, For a conventional flash LiDAR system, output power, an angle of view, and the like of a light source are unchanged, which causes a large-area blind spot in front of or on both sides of the vehicle using the LiDAR system, thereby reducing an obstacle avoidance capability of the vehicle. Therefore, in view of the foregoing problem, this application proposes a LiDAR and an apparatus including the LiDAR, to eliminate the foregoing problem.

Figure 2:
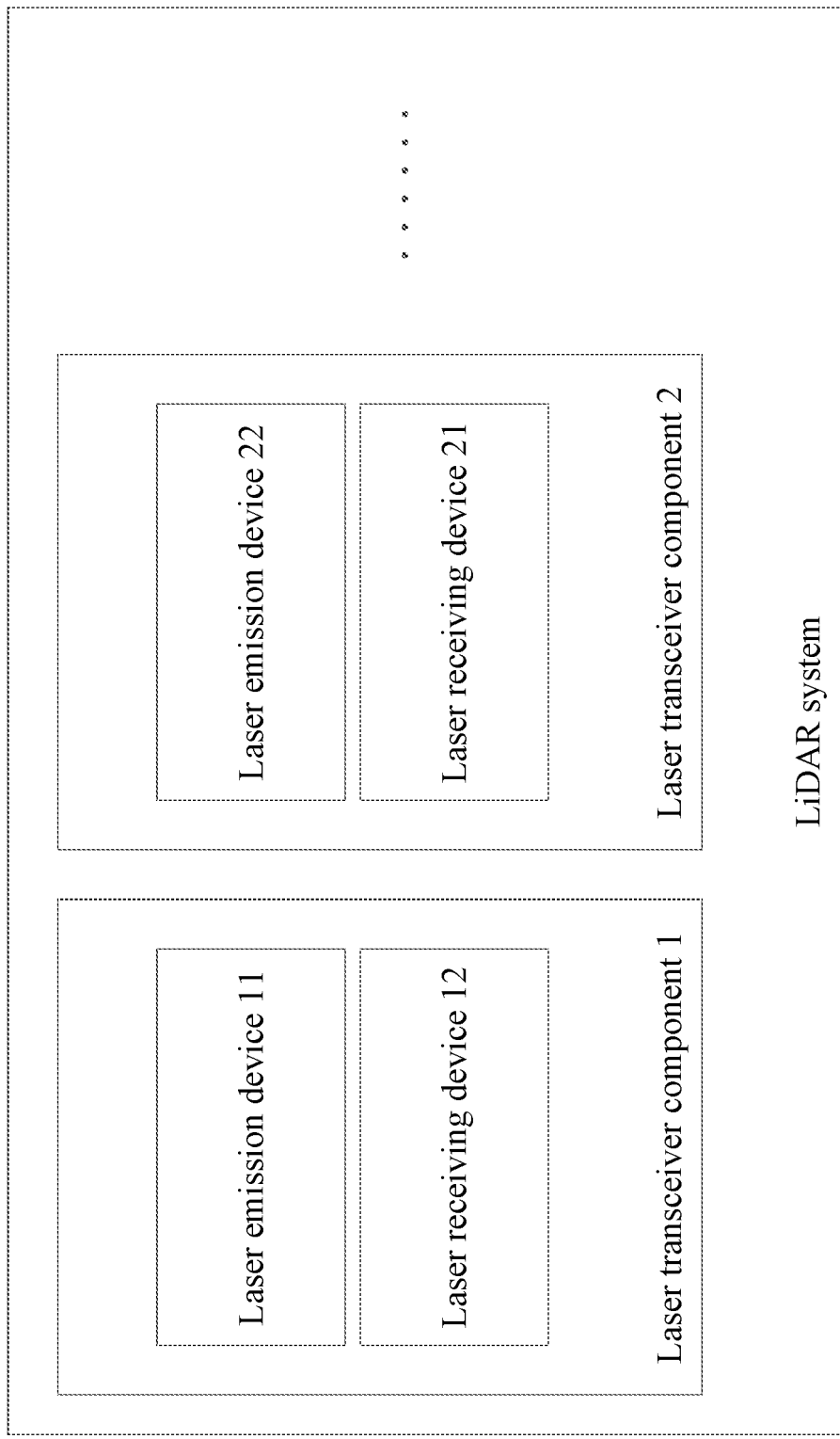
FIG. 2 is a schematic diagram of a LiDAR system according to an embodiment.

FIG. 2 is a schematic diagram of a LiDAR system according to an embodiment. As shown in FIG. 2, the LiDAR system includes: at least two laser transceiver components; where detection regions corresponding to the at least two laser transceiver components are spliced; each detection region is divided into at least two detection subregions along a vertical direction, and each detection subregion is aligned with a different angle range of the detection region along the vertical direction; and each laser transceiver component includes a laser emission device and a laser receiving device that are correspondingly arranged; the laser emission device is configured to emit an outgoing laser in a preset direction to a corresponding detection region; and the laser receiving device is configured to receive a reflected laser returned after the outgoing laser is reflected by an object in the corresponding detection region.

Figure 2A:
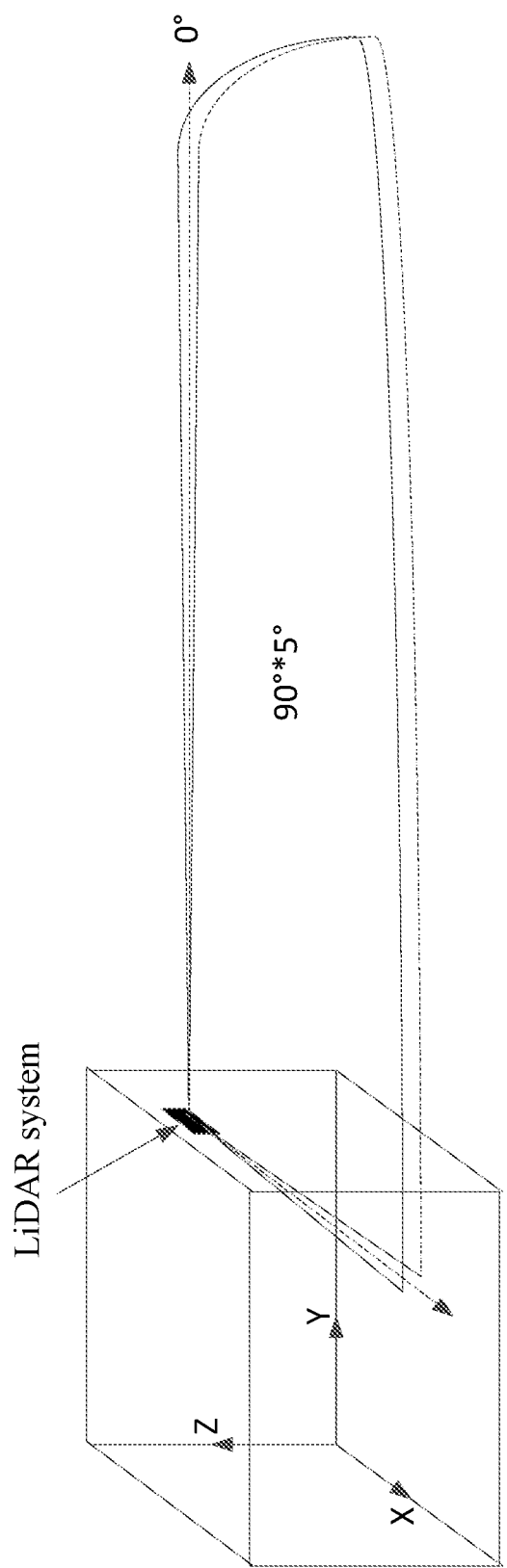
FIG. 2A is a schematic diagram of an emitted beam in a LiDAR system according to an embodiment.
Figure 2B:
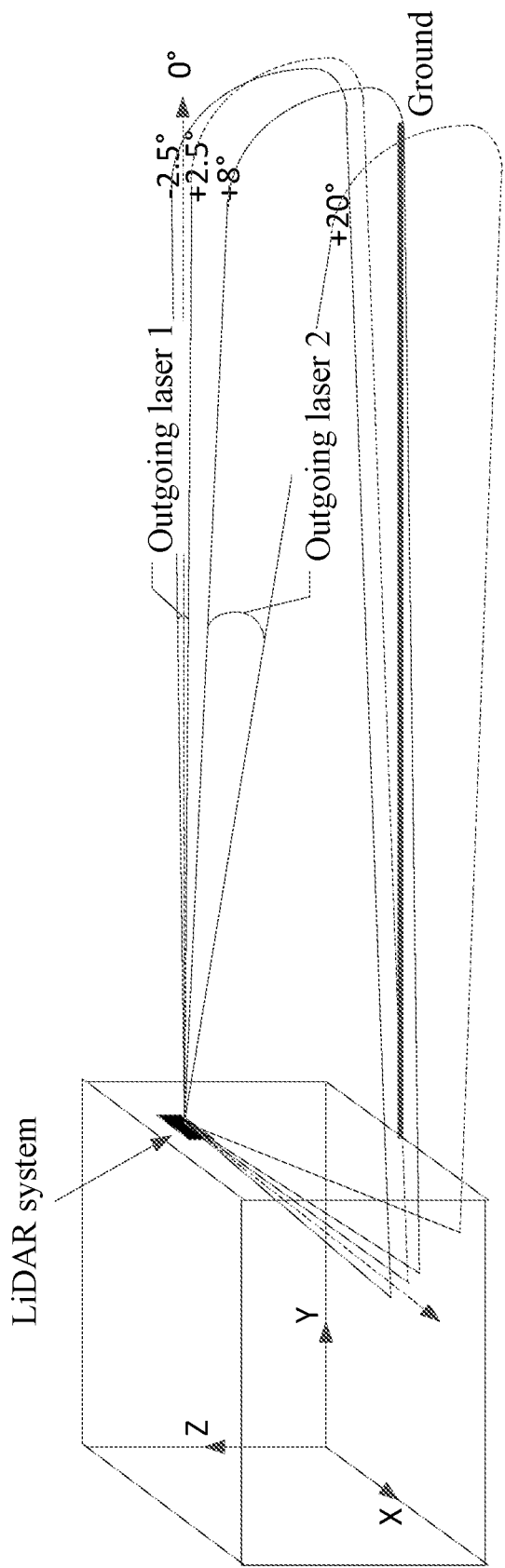
FIG. 2B is a schematic diagram of an emitted beam in a LiDAR system according to an embodiment.

The foregoing laser emission device may emit an outgoing laser at any outgoing angle, and a specific outgoing angle may be set in advance based on an actual application requirement, and may be an outgoing angle of 60°×90°, an outgoing angle of 90°×90°, or the like. For example, FIG. 2A is a schematic diagram of an emitted beam of a laser emission device. An outgoing angle of an outgoing laser emitted by the laser emission device is 90°×5°, where 90° is a horizontal outgoing angle of the laser emission device, and 5° is a vertical outgoing angle of the LiDAR emission system. The foregoing laser emission device may include at least one laser emitter. Optionally, different types of laser emitters, different output power of the laser emitters, and different arrangement densities of the laser emitters may also be set for the foregoing laser emission device, to adjust a detection capability of the outgoing laser covering a different angle range of the detection region, such as a detection distance and detection precision. Optionally, an arrangement direction of the laser emitters may also be set, or an optical component may be disposed in front of the laser emitters for the foregoing laser emission device, to adjust the outgoing direction of the outgoing laser, so that the outgoing laser covers a different angle range of the detection region. For example, FIG. 2B is a schematic diagram of an emitted beam of a laser emission device. The laser emission device can emit two beams of outgoing lasers simultaneously, specifically, an outgoing laser 1 and an outgoing laser 2 in FIG. 2B; an outgoing angle of the outgoing laser 1 is 90°×5°, and an outgoing direction is a sky pointing direction, covering an angle range of −2.5° to 2.5° in the detection region (with 0° indicating a horizontal direction); and an outgoing angle range of the outgoing laser 2 is 90°×12°, and an outgoing direction is a ground pointing direction, covering an angle range of 8° to 20° in the detection region.

In actual application, the foregoing laser emission device may include at least one laser emitter, and the laser emitter may be arranged in a form of an array, so that the outgoing laser emitted by the laser emission device is at a specific outgoing angle range. Under such conditions, the laser emission device may have the same type of laser emitter arrays, or optionally, the laser emission device may have different types of laser emitter arrays; the laser emitters may use a continuous light source or a pulsed light source; and the laser emitter may be an LED (light emitting diode), an LD (laser diode), a VCSEL (vertical cavity surface emitting laser), or the like. This is not limited to this embodiment. Correspondingly, the laser emitter arrays in the laser emission device may have the same output power, or optionally, the laser emitter arrays in the laser emission device may have different output power. Based on different actual application scenarios, peak power of a single LED light source is usually 0.5 W to 4 W, and an optional range of peak power of a VCSEL light source is usually 0.5 W to 6 W. This can be designed based on an actual application requirement.

The foregoing laser receiving device can receive a reflected laser returned after the outgoing laser of the laser emission device in the laser transceiver component is projected to the detection region. For example, the laser receiving device 12 in FIG. 2 receives a reflected laser returned after the outgoing laser is projected by the laser emission device 11 in the laser transceiver component 1 to the corresponding detection region, and the laser receiving device 22 receives a reflected laser returned after the outgoing laser is projected by the laser emission device 21 in the laser transceiver component 2 to the corresponding detection region. Correspondingly, the foregoing laser receiving device is also configured to perform photoelectric conversion on the received reflected laser. Specifically, an optical signal of the reflected laser is converted into an electrical signal, and then the electrical signal is further analyzed and parsed, to obtain information about an object in each detection region, for example, imaging or distance information of the object.

In actual application, the laser receiving device includes a receiving lens and a laser receiver. The receiving lens is configured to receive the reflected laser from the corresponding detection region, and focus the received reflected laser on the laser receiver; and the laser receiver is configured to convert the reflected laser received by the receiving lens into an electrical signal for parsing, to obtain the information about the object in the detection region. Optionally, the foregoing receiving lens may specifically use a receiving lens with a sufficient "field of view," a large diameter, and a large angle of view, to receive reflected lasers to the largest extent.

Optionally, a type of the laser receiver may depend on a type of laser emitter based on an actual application requirement. For example, the receiver may be specifically an SiPM (silicon photomultiplier), a CCD device, a CMOS device, or even a device capable of implementing optical signal conversion and parsing, such as an integrated TOF chip.

In the foregoing LiDAR system, a detection region corresponding to each laser transceiver component may be divided into at least two detection subregions along a vertical direction, and each detection subregion is aligned with a different angle range of the detection region along the vertical direction.

Figure 11:
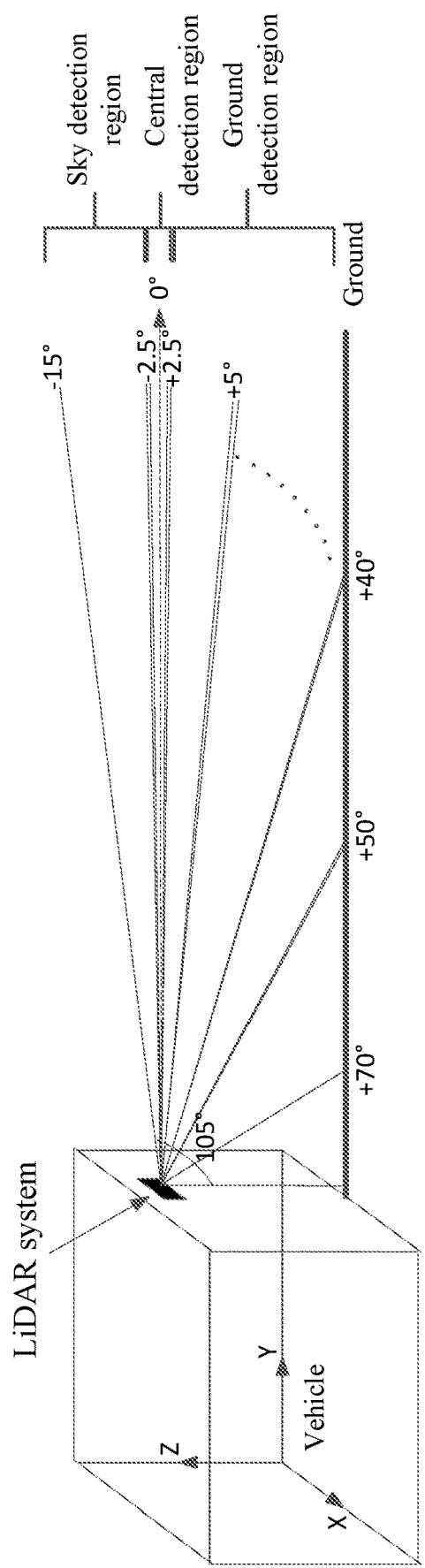
FIG. 11 is a schematic diagram of a LiDAR system according to an embodiment.

In the LiDAR system related to this embodiment, because different laser transceiver components have different design parameters, the detection region of the LiDAR system may include a plurality of detection subregions. For example, the detection region may be specifically divided into a ground detection subregion, a central detection subregion, and a sky detection subregion. The ground detection subregion is used to detect a road obstacle, a roadside, a near-field blind spot, and the like; the central detection subregion is used to detect a pedestrian and a vehicle moving horizontally, a building, and the like in the front region; and the sky detection subregion is used to detect a midair obstacle, an adjacent vehicle, a road facility, and the like, such as a height restriction bar, a power distribution box, and a low-altitude flying unmanned aerial vehicle. The laser transceiver component in the LiDAR system is used as an example. FIG. 11 is a schematic diagram of an outgoing laser of a laser emission device. A vertical outgoing angle of the laser emission device in the figure is 105°, an outgoing angle of the sky detection subregion is 12.5°, and an angle range of a corresponding detection region is −15° to −2.5° (with 0° indicating a horizontal direction); an outgoing angle of the central detection subregion is 5°; an angle range of the central detection subregion is −2.5° to +2.5°; and an outgoing angle range of the ground detection region is 87.5°, and an angle range of the ground detection subregion is +2.5° to +90°. It can be seen that a vertical angle range of a total detection region of the LiDAR system is divided into the sky detection subregion, the central detection subregion, and the ground detection subregion, and the total detection region of the LiDAR system is divided into a plurality of subregions in a vertical direction. Therefore, when the LiDAR system is designed, different types of laser emitters may be separately disposed based on different needs of subregions, laser transmitters that belong to the same type but have different emission power may also be disposed, or laser transmitters that belong to the same type but are arranged into different densities may also be disposed. For example, the central detection region usually needs to have a long-distance detection capability, and therefore, a laser emitter with relatively high power is usually required. While a distance between the LiDAR system and the ground is usually short, and therefore, the ground detection region only needs to have a short-distance detection capability, and usually, only a laser emitter with relatively low power is required to avoid wasting energy. Through division of the plurality of subregions, the laser emission device can emit outgoing lasers with different power and different outgoing angle ranges to different detection subregions, to detect an object in the detection subregion based on a need of each detection subregion, which avoids a waste of light energy caused by mismatch between the detection subregion and the emission power and improves utilization of light energy in each detection subregion, thereby reducing power consumption of the LiDAR system and further reducing manufacture costs of the LiDAR system.

With reference to descriptions of components in the LiDAR system, referring to FIG. 2, an application scenario in FIG. 1 is used as an example to describe a working principle of the LiDAR system in this embodiment. A working principle is as follows: when a LiDAR system on the vehicle needs to detect surroundings of the vehicle, a plurality of laser transceiver components in the LiDAR system can work simultaneously. In the procedure, a laser emission device of each laser transceiver component emits the outgoing laser within an angle range of the corresponding detection region, so that detection regions corresponding to different laser transceiver components are spliced to form a detection region with a larger angle range. The outgoing laser emitted within the angle range of the corresponding detection region is returned after being reflected by the object. The reflected laser is received by the receiving lens in the laser receiving device. The reflected laser passes through the receiving lens and is focused on the laser receiver, and an optical signal of the reflected laser is converted into an electrical signal for parsing, to obtain information about the object in the detection region, thereby obtaining surroundings of the vehicle. It should be noted that when the laser transceiver components emit outgoing lasers to the corresponding detection region, the laser transceiver components can emit a plurality of beams of outgoing lasers with different energy densities to the corresponding detection region, and each beam of outgoing lasers can be projected to the corresponding detection region, which is equivalent to dividing each detection region into subregions with different angle ranges along the vertical direction.

The LiDAR system provided in the foregoing embodiment includes: at least two laser transceiver components; and each laser transceiver component includes a laser emission device and a laser receiving device that are correspondingly arranged; where detection regions corresponding to the at least two laser transceiver components are spliced; each detection region is divided into at least two detection subregions along a vertical direction, and each detection subregion is aligned with a different angle range of the detection region along the vertical direction; the laser emission device is configured to emit an outgoing laser in a preset direction to a corresponding detection region; and the laser receiving device is configured to receive a reflected laser returned after the outgoing laser is reflected by an object in the corresponding detection region. The foregoing solution uses a combination of two or more laser transceiver components, which can enlarge the detection region of the LiDAR system in the horizontal directions and implements a large-angle detection region, thereby reducing a range of blind spots on both horizontal sides of the outgoing lasers of the LiDAR system and improving an obstacle avoidance capability of the vehicle using the LiDAR system. In addition, in the foregoing LiDAR system, the detection region corresponding to each laser transceiver component includes a plurality of detection subregions divided along the vertical direction, and each detection subregion can be aligned with a different angle range of the detection region along the vertical direction, which is equivalent to simultaneously emitting a plurality of beams of outgoing lasers by the laser transceiver components toward different outgoing angle ranges, and therefore, when the foregoing LiDAR system is used for detection, the detection regions have different detection distance requirements in different angle ranges along the vertical direction. For a detection subregion with a short detection distance, outgoing lasers of the laser emission device corresponding to the detection subregion have a low energy density; and for a detection subregion with a long detection distance, outgoing lasers emitted by the laser emission device corresponding to the detection subregion have a high energy density, and laser emission devices are selected to match different detection regions based on the actual application requirements, which avoids a waste of light energy caused by the mismatch between the detection region and the energy density of the outgoing lasers and improves utilization of light energy in each detection region, thereby meeting a system detection application requirement, reducing the overall power consumption of the LiDAR system, and reducing manufacture costs of the LiDAR system.

Figure 2C:
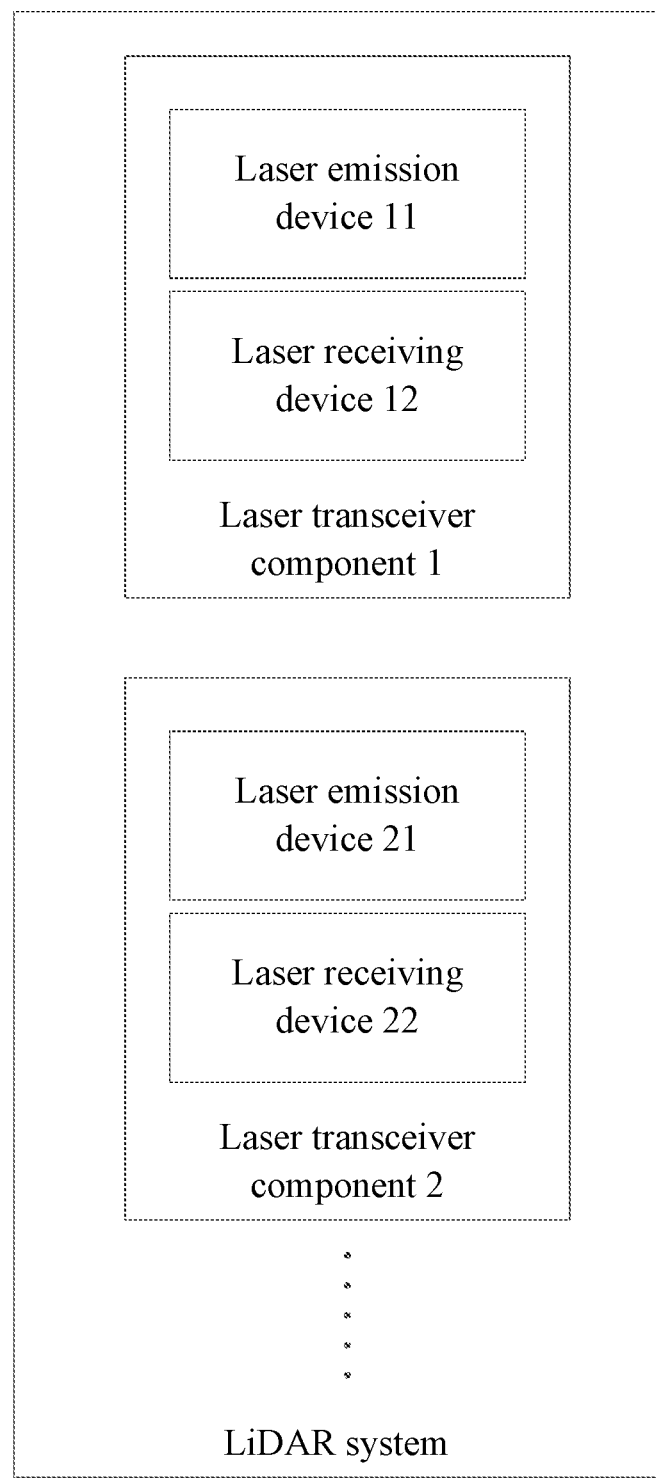
FIG. 2C is a schematic diagram of a LiDAR system according to an embodiment.

In actual application, the plurality of laser transceiver components included in the LiDAR system can have various layouts, and specifically, for example, may be arranged abreast in a horizontal direction, as shown in FIG. 2; optionally, for example, they may alternatively be longitudinally arranged in a vertical direction, as shown in FIG. 2C; or optionally, they may have a two-dimensional arrangement in a horizontal direction and a vertical direction. The layout of the laser transceiver components is related to a position and a size of the detection region of the laser transceiver components. Through different layouts, positions and sizes of different detection regions of the LiDAR system can be detected. The plurality of laser transceiver components are arranged, to splice detection regions of the plurality of laser transceiver components. Coverage of the detection region on the horizontal plane of the LiDAR system is enlarged through splicing in the horizontal directions; coverage of the detection region on the vertical plane of the LiDAR system is enlarged through splicing in the vertical directions; and coverage of both detection regions on the horizontal plane and the vertical plane of the LiDAR system is enlarged through splicing in the horizontal directions and the vertical directions.

Correspondingly, the laser emission device and the laser receiving device in each laser transceiver component may also have various layouts. The laser emission device and the laser receiving device of the laser transceiver component may be arranged in a horizontal direction or a vertical direction.

Figure 2D:
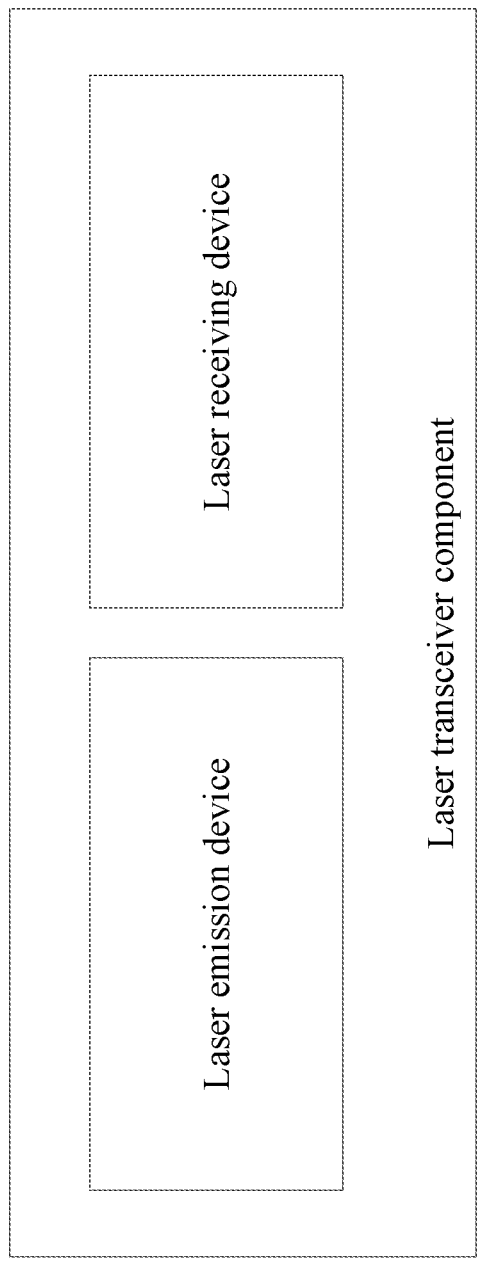
FIG. 2D is a schematic diagram of a laser transceiver component according to an embodiment.
Figure 2E:
FIG. 2E is a schematic diagram of a laser transceiver component according to an embodiment.
Figure 2F:
FIG. 2F is a schematic diagram of laser transceiver components according to an embodiment.

For example, one laser transceiver component is used as an example. As shown in FIG. 2D, the laser emission device and the laser receiving device may be arranged abreast in a horizontal direction; or optionally, as shown in FIG. 2E, the laser emission device and the laser receiving device may be arranged longitudinally in a vertical direction. In addition, as shown in FIG. 2F, laser emission devices and laser receiving devices in different laser transceiver components may also be staggered.

In an application scenario, when the LiDAR system includes at least two laser transceiver components, the at least two laser transceiver components are arranged abreast in a horizontal direction, and the detection regions corresponding to the at least two laser transceiver components are spliced in the horizontal direction.

Figure 3:
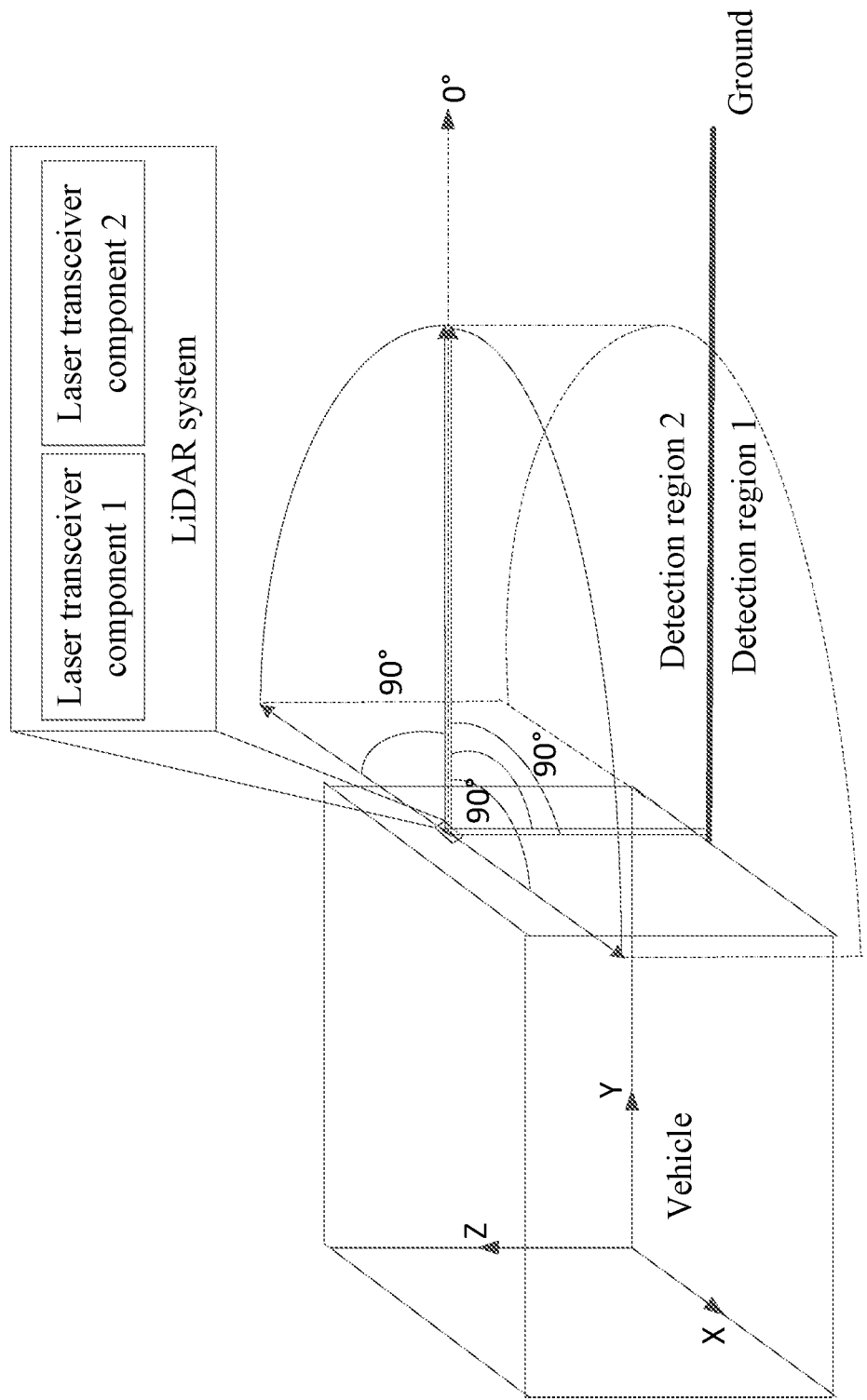
FIG. 3 is a schematic diagram of outgoing laser projection of a LiDAR system according to an embodiment.

The LiDAR system in FIG. 3 is used as an example for description. In the figure, it is assumed that the LiDAR system includes two laser transceiver components, namely a laser transceiver component 1 and a laser transceiver component 2. A detection region of the laser transceiver component 1 is 90°×90°, a detection region of the laser transceiver component 2 is also 90°×90°, the laser transceiver component 1 and the laser transceiver component 2 are arranged abreast in a horizontal direction, and as a result, a total of spliced outgoing angle ranges of laser beams emitted by the laser transceiver component 1 and laser transceiver component 2 is 180°×90°. The detection region 1 corresponding to the laser transceiver component 1 and the detection region 2 corresponding to the laser transceiver component 2 are spliced in the horizontal direction, and the detection region of the entire LiDAR system is enlarged after splicing. It should be noted that a specific splicing method is related to a setting of the laser emission device and the laser receiving device in each laser transceiver component, and is specifically related to spatial positions, arrangements, and the like of the laser emission device and the laser receiving device. To avoid generation of a new shadow region or blind spot, near-field saturation caused by reflected light or a multipath effect, or the like, proper optical isolation of the laser emission device and the laser receiving device is further required.

Figure 4:
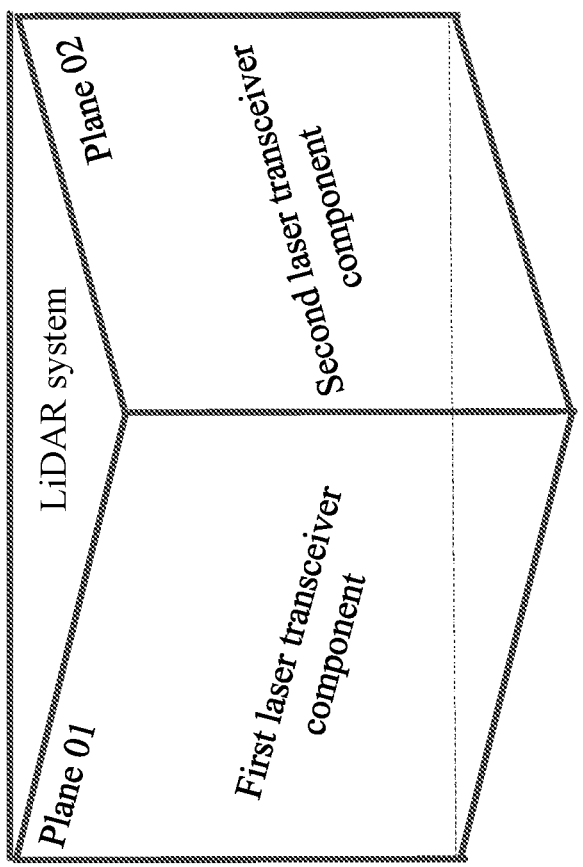
FIG. 4 is a schematic diagram of a LiDAR system according to an embodiment.

Optionally, this application further provides a LiDAR system. As shown in FIG. 4, the LiDAR system includes two laser transceiver components: a first laser transceiver component and a second laser transceiver component; a first detection region corresponding to the first laser transceiver component and a second detection region corresponding to the second laser transceiver component face different directions, and the first detection region and the second detection region are spliced in the horizontal direction.

The first transceiver component and the second transceiver component in this embodiment are respectively mounted on different side planes of the LiDAR system (a plane 01 and a plane 02 in FIG. 4), so that a first detection region of the first transceiver component faces one direction, the second detection region of the second laser transceiver component faces another direction, and the first detection region and the second detection region face different directions. Further, an outgoing laser of the first laser transceiver component and an outgoing laser of the second laser transceiver component are directed in different directions and are projected to detection regions in different directions. In the foregoing structure, the first detection region and the second detection region may be spliced, to obtain a spliced detection region of the entire LiDAR system. Specifically, the first detection region and the second detection region may be adjacently spliced. Optionally, the first detection region and the second detection region may also be partially staggered for splicing, provided that the spliced detection region can meet an actual application requirement. In addition, as can be seen from FIG. 4, when the LiDAR system is designed, there is an included angle between the plane 01 and the plane 02, and as a result, the first detection region of the first laser transceiver component may face one direction, and the second detection region of the second laser transceiver component may face another direction. In addition, a value of the angle may be specifically determined based on an actual application requirement. This is not limited to this embodiment.

It can be seen from the foregoing embodiment that a splicing method of the first detection region and the second detection region depends on the layout of the first laser transceiver component and the second laser transceiver component. Therefore, this application specifically provides two layouts of the first laser transceiver component and the second laser transceiver component. The two layouts are described below.

Figure 4A:
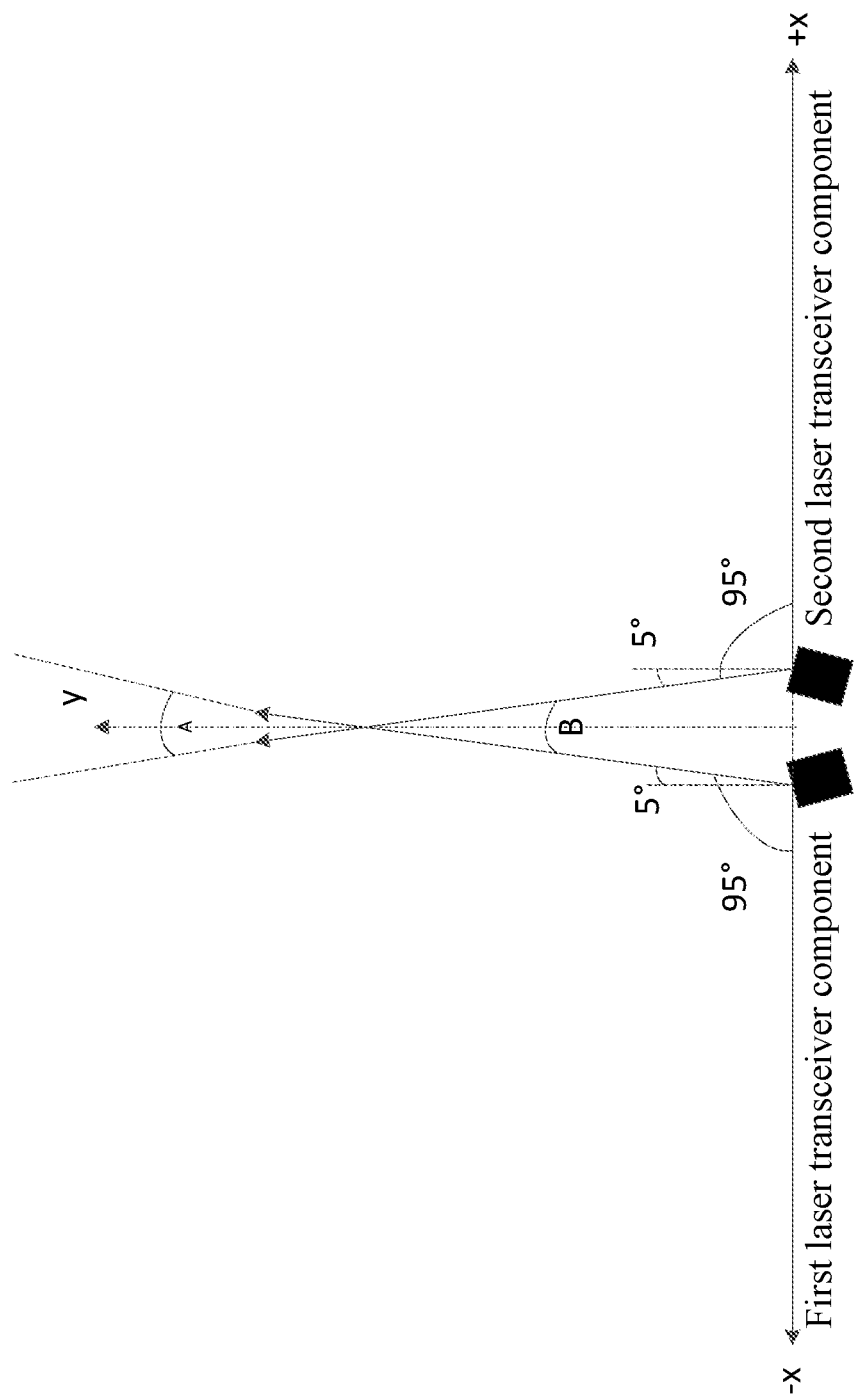
FIG. 4A is a schematic diagram of a detection angle of view of a LiDAR system according to an embodiment.

The first layout is as follows. FIG. 4 is a schematic structural diagram of a LiDAR system. The first detection region and the second detection region may be arranged back-to-back. That is, the first laser transceiver component and the second laser transceiver component in the LiDAR system are respectively arranged on different side planes (the plane 01 and the plane 02 in the figure) of the LiDAR system back-to-back. In this case, the detection region of the LiDAR system is a detection region formed by splicing the first detection region and the second detection region. For example, when the LiDAR system shown in FIG. 4 is used for detection, as shown in FIG. 4A, the horizontal plane XY is used as an example, the first detection region of the first laser transceiver component in the LiDAR system has a horizontal angle range of 95°, and faces a direction −xy; and the second detection region of the second laser transceiver component has a horizontal angle range of 95°, and faces a direction +xy. The first detection region and the second detection region are adjacently spliced, and an obtained detection angle of view in the LiDAR system is 180°. It should be noted that there are an overlapped region (a region A in the figure) and a blind spot (a region B in the figure) when the first detection region and the second detection region are adjacently spliced. Herein, detection resolution of the overlapped region is relatively high. Sizes of the overlapped region and the blind spot are related to the layout of the first laser transceiver component and the second laser transceiver component, and are also related to the sizes of the first detection region and the second detection region. With the foregoing structure in which the first laser transceiver component and the second laser transceiver component are arranged back-to-back, rear-end space of the LiDAR system is relatively compact, which facilitates a volume optimization design of the LiDAR system, thereby reducing a volume and manufacture costs of the LiDAR system.

Figure 5:
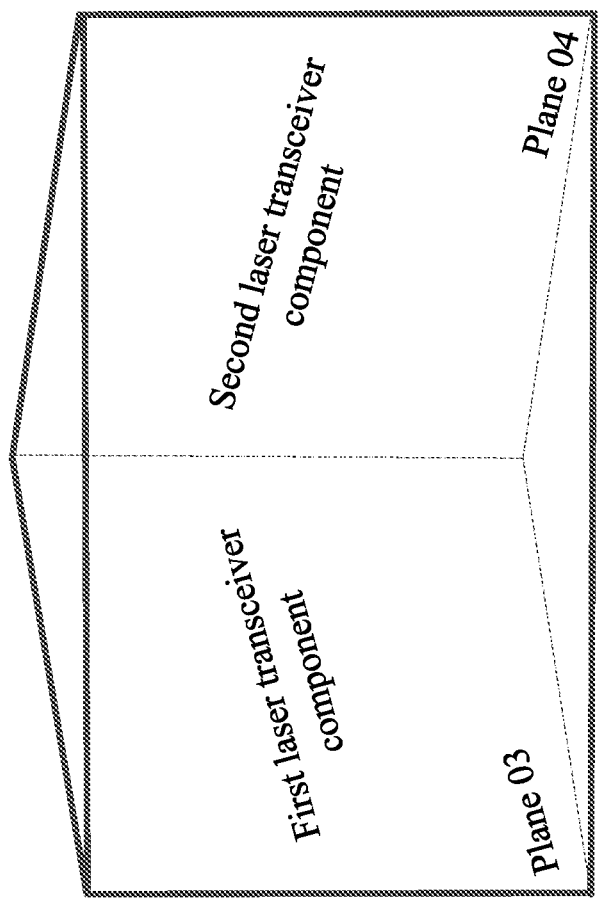
FIG. 5 is a schematic diagram of a LiDAR system according to an embodiment.
Figure 5A:
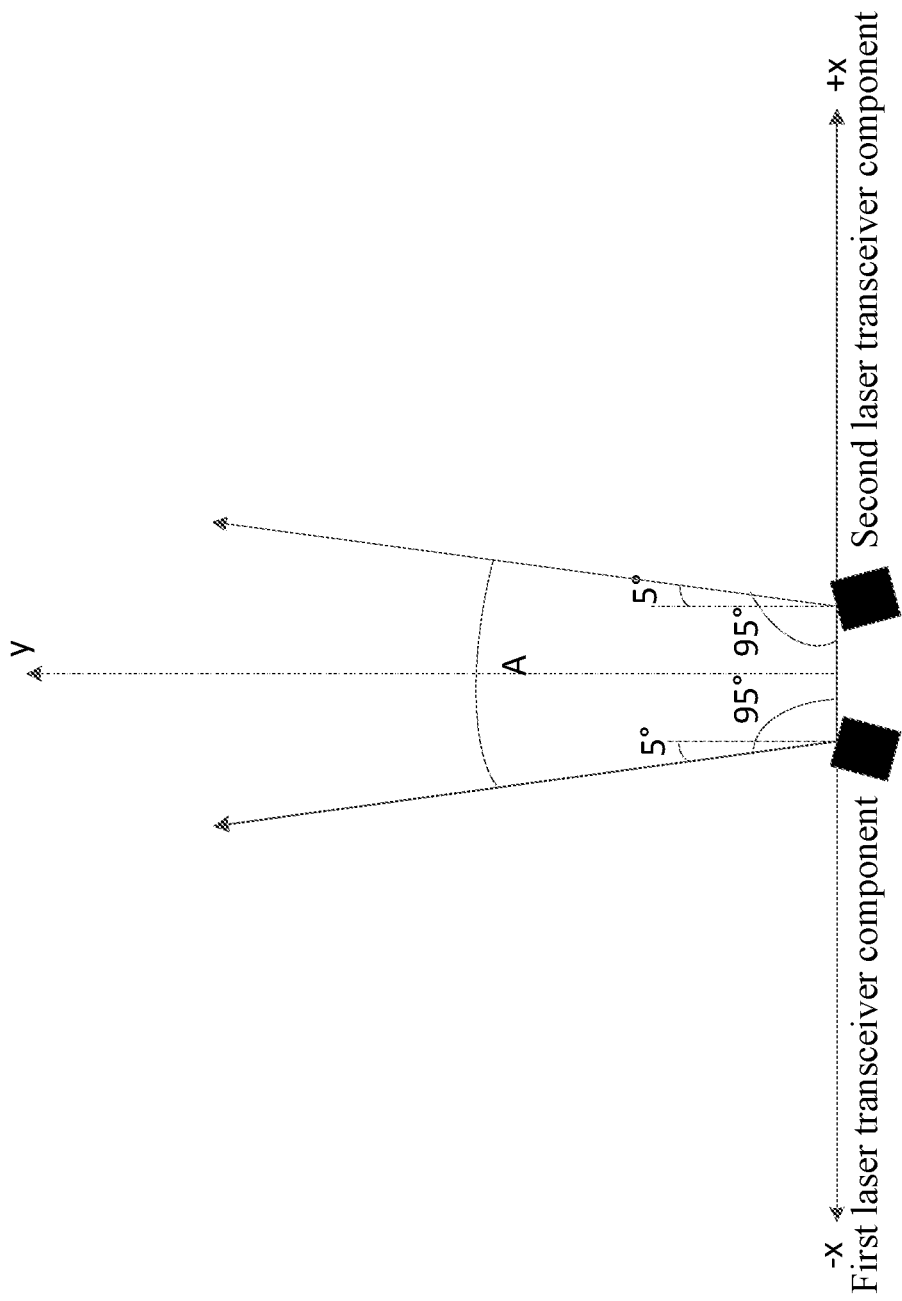
FIG. 5A is a schematic diagram of a detection angle of view of a LiDAR system according to an embodiment.

The second layout is as follows. FIG. 5 is a schematic structural diagram of a LiDAR system. The first detection region and the second detection region are arranged facing one another. That is, the first laser transceiver component and the second laser transceiver component in the LiDAR system are respectively arranged on different side planes (the plane 03 and the plane 04 in the figure) of the LiDAR system facing one another. In this case, the detection region of the LiDAR system is a detection region formed by splicing the first detection region and the second detection region. For example, when the LiDAR system shown in FIG. 5 is used for detection, as shown in FIG. 5A, the horizontal plane XY is used as an example, the first detection region of the first laser transceiver component in the LiDAR system has a horizontal angle range of 95°, and faces a direction +xy; and the second detection region of the second laser transceiver component has a horizontal angle range of 95°, and faces a direction −xy. The first detection region and the second detection region are partially staggered for splicing, and an obtained horizontal angle range of the detection region of the LiDAR system is 180°. It should be noted that there is a specific overlapped region (a region A in the figure) when the first detection angle of view and the second detection angle of view are staggered for splicing. Herein, detection resolution of the overlapped region is relatively high. A size of the region is related to the layout of the first laser transceiver component and the second laser transceiver component, and is also related to the sizes of the first detection region and the second detection region. With the foregoing structure in which the first laser transceiver component and the second laser transceiver component are arranged facing one another, rear-end space of the LiDAR system is relatively ample, thereby avoiding mutual influence and interference between various devices included in the first laser transceiver component and the second laser transceiver component.

Further description is provided. It can be seen from the foregoing embodiments of FIG. 2D and FIG. 2E that there may be various layouts of the laser emission device and the laser receiving device in each laser transceiver component, and specifically, there may be an arrangement in a horizontal direction or a vertical direction. The following describes a layout in which the LiDAR system includes two laser transceiver components, the two laser transceiver components are arranged horizontally, and the laser emission device and the laser receiving device of each laser transceiver component are arranged horizontally.

A first application scenario is as follows.

Figure 6:
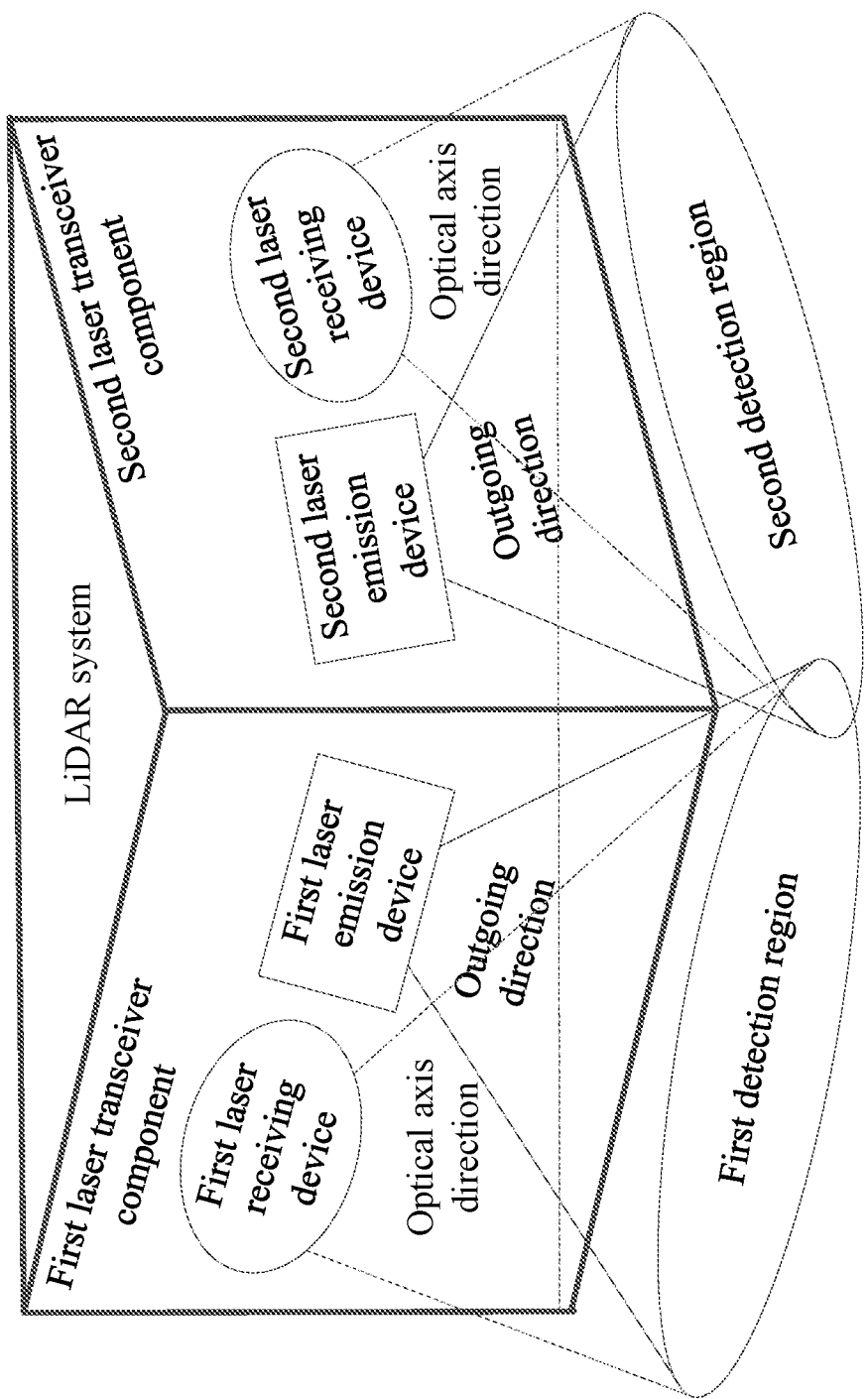
FIG. 6 is a schematic diagram of a LiDAR system according to an embodiment.

As shown in FIG. 6, the first laser emission device and the first laser receiving device in the first laser transceiver component in the LiDAR system are arranged abreast in a horizontal direction, and the second laser emission device and the second laser receiving device in the second laser transceiver component are arranged abreast in a horizontal direction. In this case, an outgoing direction of the first laser emission device is the same as an optical axis direction of the first laser receiving device; and an outgoing direction of the second laser emission device is the same as the optical axis direction of the second laser receiving device.

Figure 6A:
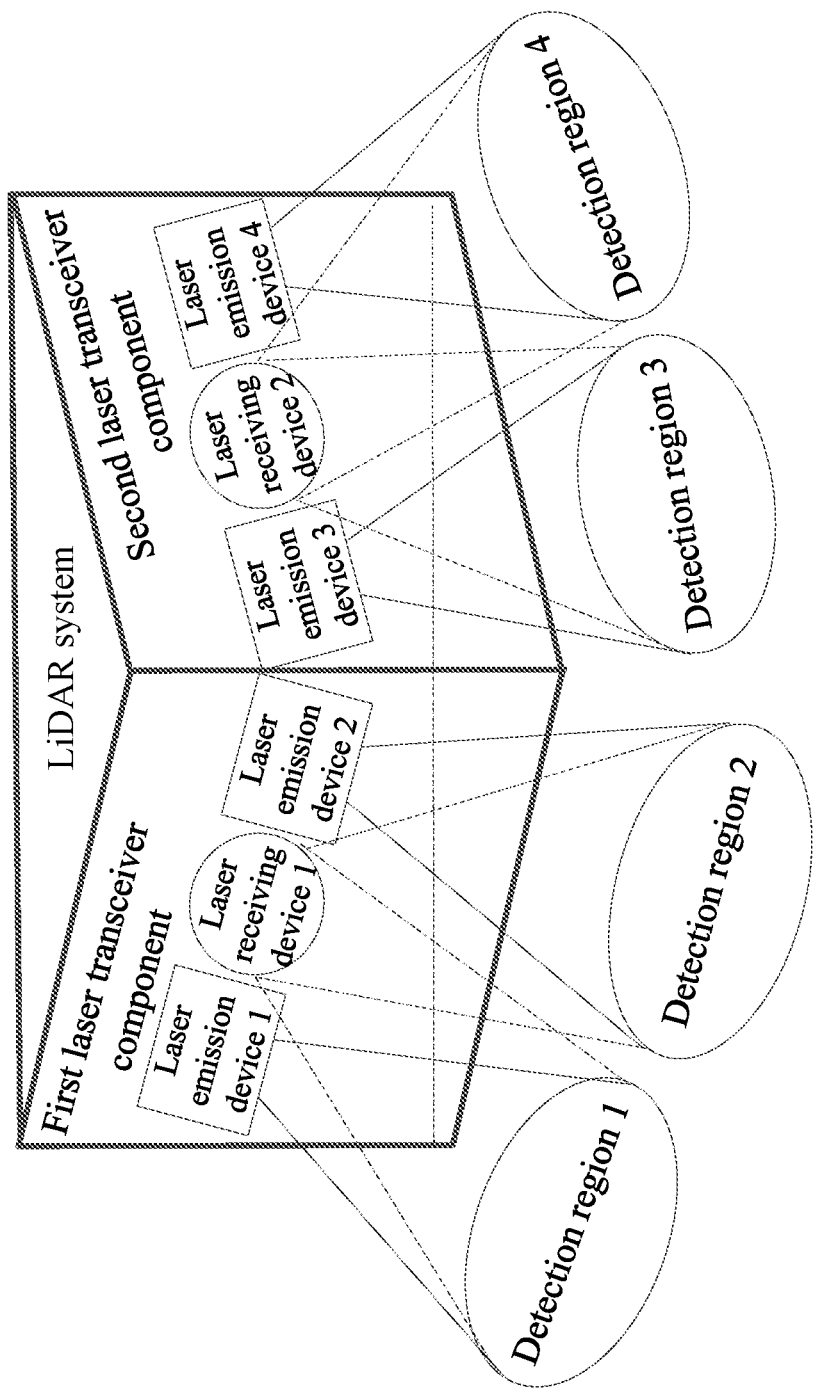
FIG. 6A is a schematic diagram of a LiDAR system according to an embodiment.

This embodiment relates to a case that the first laser transceiver component and the second laser transceiver component only include one laser emission device and one corresponding laser receiving device. In this case, the outgoing laser of the first laser emission device is projected to the first detection region, and the first laser receiving device receives the reflected laser returned after being reflected by an object in the first detection region. In addition, the outgoing laser of the second laser emission device is projected to the second detection region, and the second laser receiving device receives the reflected laser returned after being reflected by an object in the second detection region. The detection region of the LiDAR system is the detection region obtained by splicing the first detection region and the second detection region. It should be noted that FIG. 6 only provides the case that the first detection region and the second detection region are staggered for splicing, and in actual application, there are also cases of adjacent splicing, and non-adjacent and non-staggered splicing. In addition, FIG. 6 mainly illustrates a relationship between the outgoing direction and the optical axis direction of each laser transceiver component, but does not mean that an actual detection region of each laser transceiver component is as large as that shown in the figure. Optionally, in the foregoing layout, the first laser transceiver component and the second laser transceiver component may also include a plurality of laser emission devices and one corresponding laser receiving device. As shown in FIG. 6A, both a laser emission device 1 and a laser emission device 2 correspond to a laser receiving device 1, and an outgoing direction of the laser emission device 1 and the laser emission device 2 is the same as an optical axis direction of the laser receiving device 1. In addition, the laser emission device 1 and the laser emission device 2 emit outgoing lasers to their respective detection regions (a detection region 1 and a detection region 2), and a receiving lens 1 receives reflected lasers returned after being reflected by objects in the detection region 1 and the detection region 2. Correspondingly, both the laser emission device 3 and the laser emission device 4 correspond to the laser receiving device 2, and outgoing directions of the laser emission device 3 and the laser emission device 4 are the same as the optical axis direction of the laser receiving device 2. In addition, the laser emission device 3 and the laser emission device 4 emit outgoing lasers to corresponding detection regions (a detection region 3 and a detection region 4), and a receiving lens 2 receives reflected lasers returned after being reflected by objects in the detection region 3 and the detection region 4.

Specifically, as shown in FIG. 15 to FIG. 23, the LiDAR system 10 includes: a casing 100, a laser emission device, and a plurality of laser receiving devices. The casing 100 is configured to demarcate an inner chamber 200, and the inner chamber 200 can be divided into an emission chamber 210 and a receiving chamber 220. The laser emission device is arranged in the emission chamber 210, and is configured to emit a laser beam to the first target region. A plurality of laser receiving devices are arranged in the receiving chamber 220. The plurality of laser receiving devices may receive a laser beam reflected from the second target region. The first target region and the second target region are at least partially overlapped. Herein, the second target region includes a plurality of detection subregions, each detection subregion is smaller than the first target region and is at least partially overlapped with the first target region, and each laser receiving device receives, in a one-to-one correspondence manner, a laser beam reflected from each detection subregion.

The number of laser emission devices is the same as the number of laser receiving devices, and each laser receiving device receives, in a one-to-one correspondence manner, the laser beam emitted by each laser emission device to and reflected back from the first target region. There may be two laser emission devices. For ease of description, the two laser emission devices are referred to as a first emission device 410 and a second emission device 420. The first emission device 410 emits a laser beam to a first emission subregion, and the second emission device 420 emits a laser beam to a second emission subregion. The first emission subregion and the second emission subregion may be partially overlapped, completely overlapped, or non-overlapped. Preferably, the first emission subregion and the second emission subregion may be partially overlapped to implement full coverage of the entire detection field of view.

When there are two laser emission devices, there may also be two laser receiving devices. For ease of description, the two laser receiving devices are referred to as a first receiving device 310 and a second receiving device 320, and both the first receiving device 310 and the second receiving device 320 are configured to receive the laser beam reflected back from the first target region. Optionally, the first receiving device 310 receives a laser beam reflected back from the first detection subregion, and the second receiving device 320 receives a laser beam reflected back from the second detection subregion. Receiving angles of view of the first receiving device 310 and the second receiving device 320 are less than that of the second target region, thereby simplifying a design difficulty of the receiving lens and reducing interference from ambient light to improve a signal-to-noise ratio of the received signal. The first detection subregion and the second detection subregion may be partially overlapped, completely overlapped, or non-overlapped. Preferably, the first detection subregion and the second detection subregion may be partially overlapped to implement full coverage of the entire detection field of view.

The laser receiving devices are in a one-to-one correspondence with the laser emission devices. The corresponding pair of laser emission device and laser receiving device form one laser transceiver component. The LiDAR system includes two laser transceiver components, namely a first laser transceiver component and a second laser transceiver component; and the first laser transceiver component includes a first emission device 410 and a first receiving device 310, and the second laser transceiver component includes a second emission device 420 and a second receiving device 320.

In the first laser transceiver component, the first detection subregion of the first receiving device 310 is located in the first emission subregion of the first emission device 410, and an overlapped region is the first detection region; and in the second laser transceiver component, the second detection subregion of the second receiving device 320 is located in the second emission subregion of the second emission device 420, and an overlapped region is the second detection region. The first detection region corresponding to the first laser transceiver component and the second detection region corresponding to the second laser transceiver component face different directions, and the first detection region and the second detection region are spliced in the horizontal direction.

Figure 22:
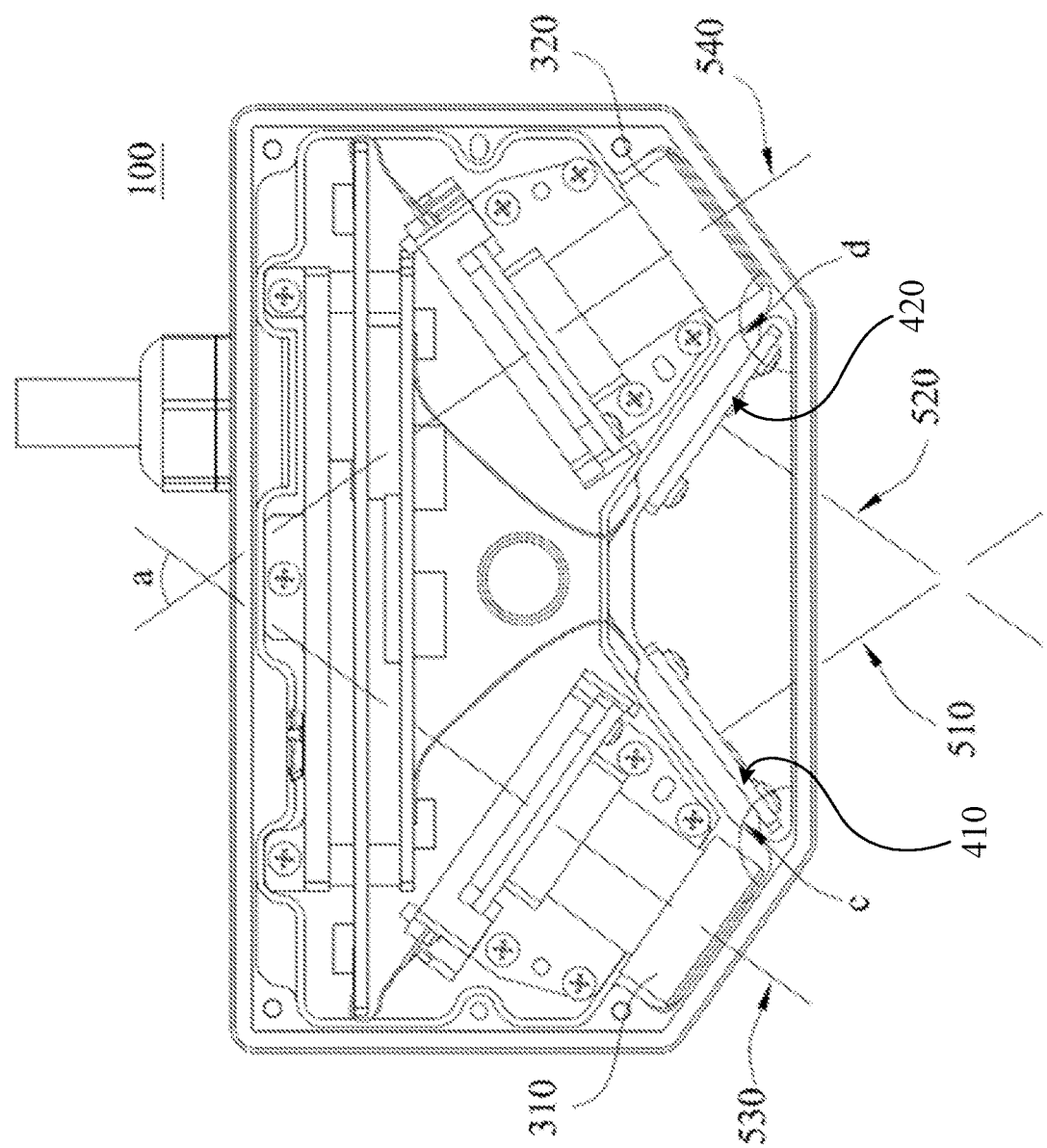
FIG. 22 is a second schematic full cross-sectional view of a LiDAR according to an embodiment of this application.

As shown in FIG. 22, as described above, an outgoing direction of the first laser emission device 410 is the same as an optical axis direction of the first laser receiving device 310; and an outgoing direction of the second laser emission device 420 is the same as the optical axis direction of the second laser receiving device 320. The first laser emission device 410 and the first laser receiving device 310 of the first laser transceiver component are arranged on the plane 01; and the second laser emission device 420 and the second laser receiving device 320 of the second laser transceiver component are arranged on the plane 02. It should be noted that the plane 01 does not specifically indicate a single plane. A mounting plane of the first laser emission device is parallel to that of the first laser receiving device, and optical axis directions of the first laser emission device and the first laser receiving device are perpendicular to their mounting planes. The optical axis direction of the first laser emission device is the same as that of the first laser receiving device. Therefore, planes 01 may also include at least two planes 01' and 01" parallel to one another, the first laser emission device is arranged on the plane 01', and the first laser receiving device is arranged on the plane 01". When an inner structure of the outer casing of the LiDAR system is compact, the first laser emission device can also be divided into a plurality of emission blocks arranged on a plurality of planes parallel to one another, such as a plane 01'-1 and a plane 01'-2. The plane 02 is similar to the plane 01. Details are not described herein again.

The casing 100 includes an outer casing 110 and an inner casing 120; the outer casing 110 is configured to demarcate an inner chamber 200, and the outer casing 110 includes a first translucent plate 1126 and two second translucent plates 1125; and the inner casing 120 is provided in the inner chamber 200, the inner casing 120 is connected to an inner wall of the outer casing 110, and the inner casing 120 divides the inner chamber 200 into an emission chamber 210 and a receiving chamber 220. The first translucent plate 1126 faces the emission chamber 210, and laser beams emitted by the first emission device 410 and the second emission device 420 pass through the first translucent plate 1126 and are directed to the outside of the LiDAR system; and the two second translucent plates 1125 both face the receiving chamber 220, the first receiving device 310 receives a laser beam passing through one of the second translucent plates 1125, and the second receiving device 320 receives a laser beam passing through the other second translucent plate 1125.

The outer casing 110 also includes two end plates 111 which are set opposite to each other and a side wall plate 112; and the side wall plate 112 is located between the two end plates 111 and demarcates the inner chamber 200 together with the two end plates 111. The side wall plate 112 includes an emission wall 1123, a first receiving wall 1121, and a second receiving wall 1122, and along a circumferential direction of the side wall plate 112, the first receiving wall 1121 and the second receiving wall 1122 are respectively located at two ends of the emission wall 1123. The first translucent plate 1126 is arranged at the emission wall 1123, and two second translucent plates 1125 are arranged on the first receiving wall 1121 and the second receiving wall 1122. The inner casing 120 is respectively connected to the two end plates 111 and the emission wall 1123, and demarcates the emission chamber 210 together with the emission wall 1123 and the two end plates 111.

The emission wall, the first receiving wall, and the second receiving wall are all plate-shaped, the first receiving wall and the emission wall form a first included angle, the second receiving wall and the emission wall form a second included angle, and the first included angle and the second included angle are equal, both of which are obtuse angles less than 180 degrees.

The inner casing 120 includes a first plate body 121 and a second plate body 122. The first plate body 121 and the second plate body 122 are respectively connected to the emission wall 1123 and the two end plates 111, and an included angle between the first plate body 121 and the second plate body 122 that faces the emission chamber 210 is an obtuse angle. The first emission device 410 is provided on a surface of the first plate body 121 facing the emission chamber 210, and the second emission device 420 is provided on a surface of the second plate body 122 facing the emission chamber 210. An arrangement plane of the first plate body 121 and the first receiving device 310 forms the foregoing plane 01, and an arrangement plane of the second plate body 122 and the second receiving device 320 forms the foregoing plane 02.

The first receiving device 310 has a first optical path axis, the first optical path axis is perpendicular to one of the two second translucent plates 1125 intersecting with the first optical path axis, the second receiving device 320 has a second optical path axis, the second optical path axis is perpendicular to the other of the two second translucent plates 1125 intersecting with the second optical path axis, and an included angle between the first optical path axis and the second optical path axis is greater than 45 degrees.

The first receiving device 310 has a first conical detection field, the first conical detection field has a first margin edge line m (shown in FIG. 23) adjacent to the emission wall 1123, the second receiving device 320 has a second conical detection field, the second conical detection field has a second margin edge line n (shown in FIG. 23) adjacent to the emission wall 1123, the first margin edge line m intersects with the second margin edge line n, and an intersection is located on a side of a surface of the emission wall 1123 facing a detected object.

The LiDAR system 10 further includes a control device, the control device is configured to control on-off of the first emission device 410 and the second emission device 420, so that the first receiving device 310 receives the laser beam emitted by the first emission device 410 to the first detection subregion and the second receiving device 320 receives the laser beam emitted by the second emission device 420 to the second detection subregion. After the control device is added, each emission subregion is not affected with or without overlapping.

Figure 24:
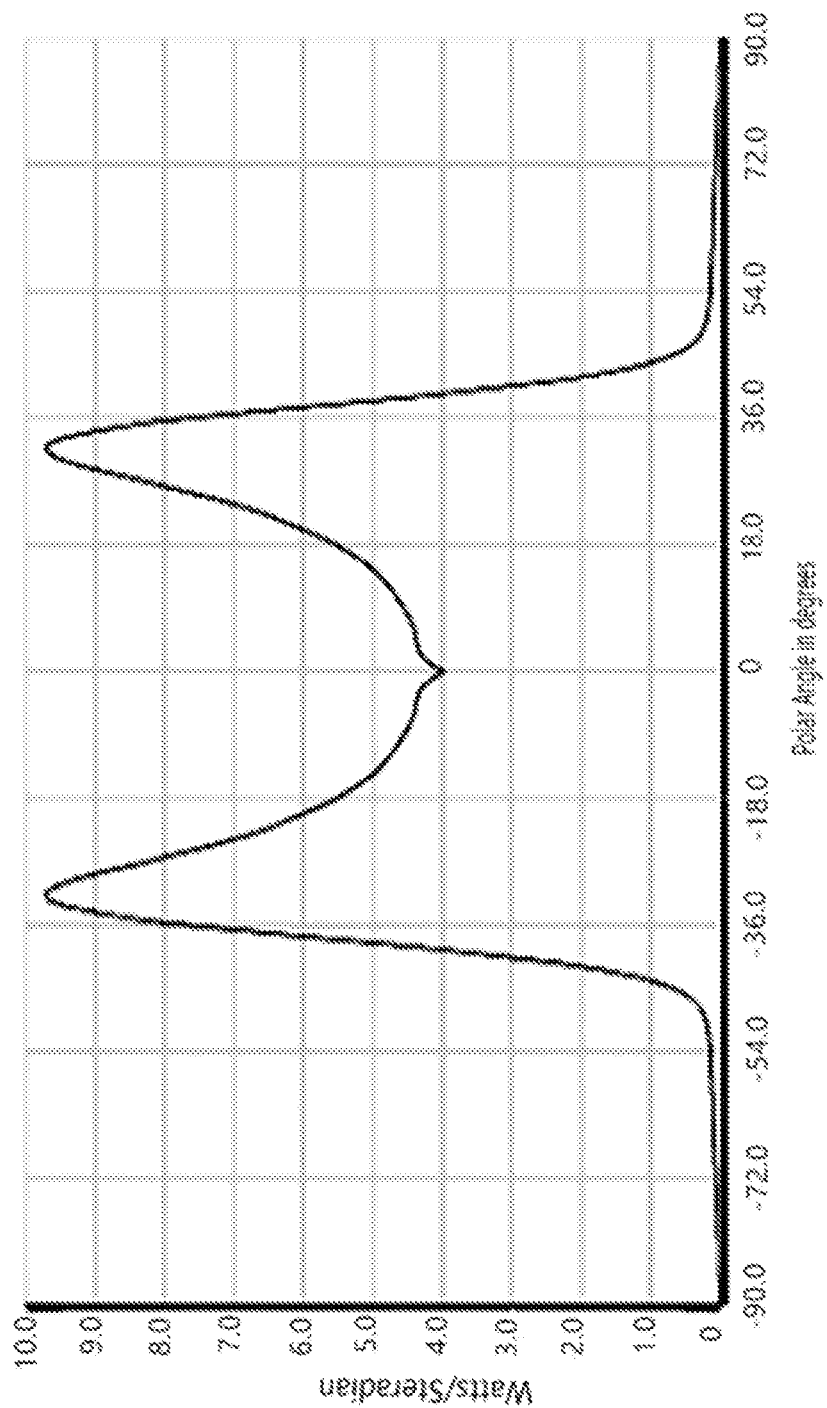
FIG. 24 is a schematic diagram of a curve of intensity of light changing with a position in an emission field of view of a laser emission device in the prior art.

Intensity of light emitted by the laser emission device varies at different positions in the emission field of view, and such variation has specific impact on the detection precision of the LiDAR system. To improve uniformity of light throughout the emission field of view, in an embodiment, the LiDAR may further include a diffuser (namely, a micro-optical system with a specific structure (diffuser or refractive optical elements (ROE)). The diffuser is configured to adjust the light emitted by the laser emission device, so that light energy is more uniformly distributed throughout the emission field of view. Outgoing light emitted by the laser emission device passes through the specific micro-optical system (diffuser or ROE) and then illuminates the field of view at a time through floodlight. In this case, the light in the emission field of view is distributed in a specific region in the space according to a specific rule. FIG. 24 is a curve chart showing that intensity of light in an emission field of view changes with positions. It can be seen that the intensity of light becomes more uniform throughout the emission field of view.

Figure 25:
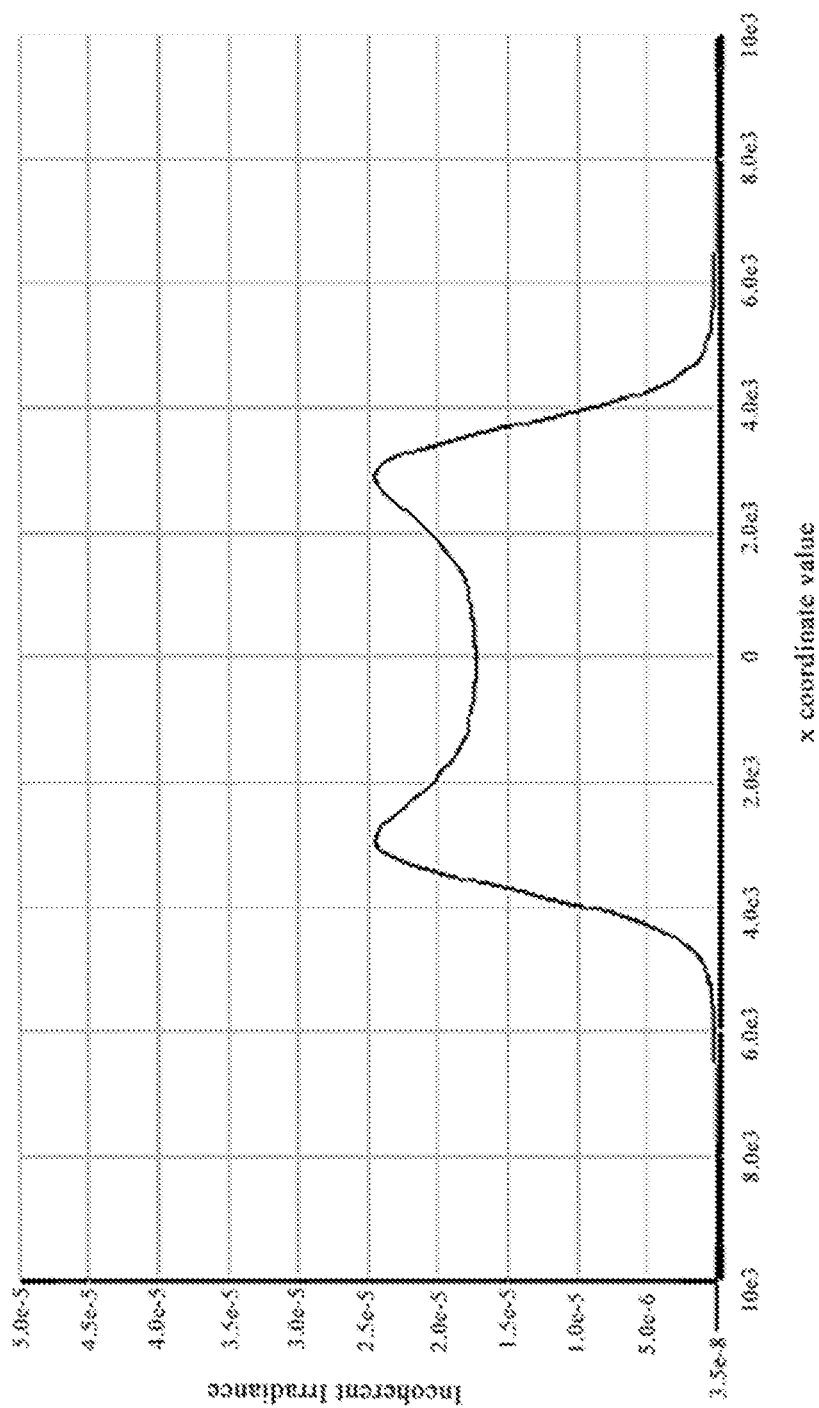
FIG. 25 is a schematic diagram of a curve of intensity of light changing with a position in an emission field of view of a laser emission device according to an embodiment of this application.

As shown in FIG. 25, an optical lens of a receiving end usually has maximum receiving efficiency at a central position, and rapidly attenuated receiving efficiency in a surrounding region, as indicated by a curve 1 in FIG. 25. To more uniformly perform detection, the optical lens of the receiving end of the laser receiving device may be improved accordingly. Specifically, optical lenses of the receiving end of the laser receiving device can use 6 optical lenses, including 5 spherical glass lenses and 1 aspherical glass lens (which, compared with the spherical lens, increases a degree of freedom, has a higher-order dimension, and is equivalent to 1.5 to 2 spherical glass lenses). The plurality of lenses cooperate with each other to implement correction and effectively compensate for an aberration of a tangential surface and a sagittal surface, thereby ensuring sufficient resolution (required for a planar array radar) on the premise of sufficient light transmission. Defocusing of the tangential surface and the sagittal surface causes imaging distortion. The distortion is decreased through methods of using a material with a high refractive index and optimizing an internal transmission angle of view of an optical path, and so on. Generally, television (TV) distortion needs to be less than −30%.

Figure 6B:
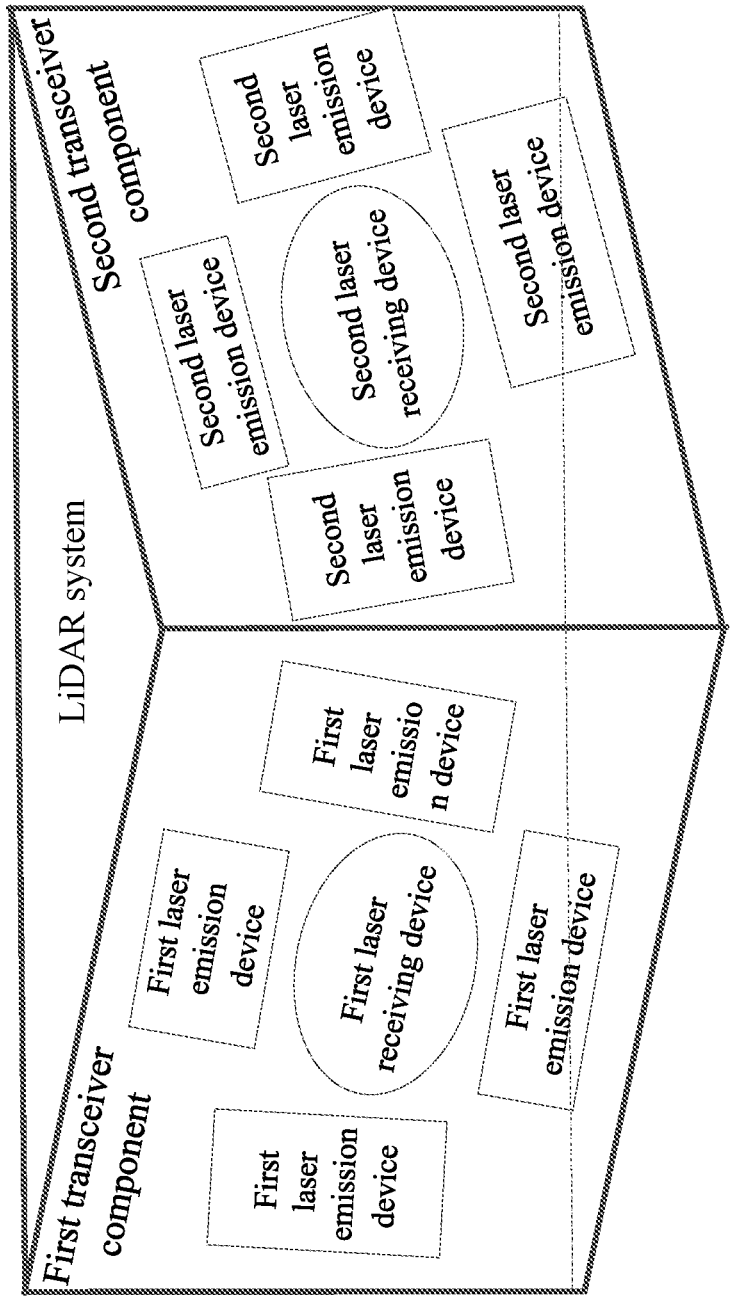
FIG. 6B is a schematic diagram of a LiDAR system according to an embodiment.

Optionally, in the foregoing application scenario of the horizontal arrangement, this application further provides a LiDAR system. The LiDAR system is shown in FIG. 6B. The LiDAR system includes a first laser transceiver component and a second laser transceiver component. The first laser transceiver component includes a plurality of first laser emission devices and one corresponding first laser receiving device, and the second laser transceiver component includes a plurality of second laser emission devices and one corresponding second laser receiving device. The plurality of first laser emission devices are arranged around the first laser receiving device, and the plurality of second laser emission devices are arranged around the second laser receiving device. In this structure, the first laser receiving device is configured to receive the reflected laser returned after the outgoing laser projected by the plurality of first emission devices is reflected by the object in each corresponding detection region, and an optical axis direction of the first laser receiving device is the same as an outgoing direction of each first laser emission device. The second laser receiving device is configured to receive the reflected laser returned after the outgoing laser projected by the plurality of second emission devices is reflected by the object in each corresponding detection region, and an optical axis direction of the second laser receiving device is the same as an outgoing direction of each second laser emission device.

The foregoing application scenario is described based on an example in which the first detection angle of view and the second detection angle of view are disposed back-to-back. Next, an example in which the first detection angle of view and the second detection angle of view are disposed facing one another is used for description.

A second application scenario is as follows.

Figure 7:
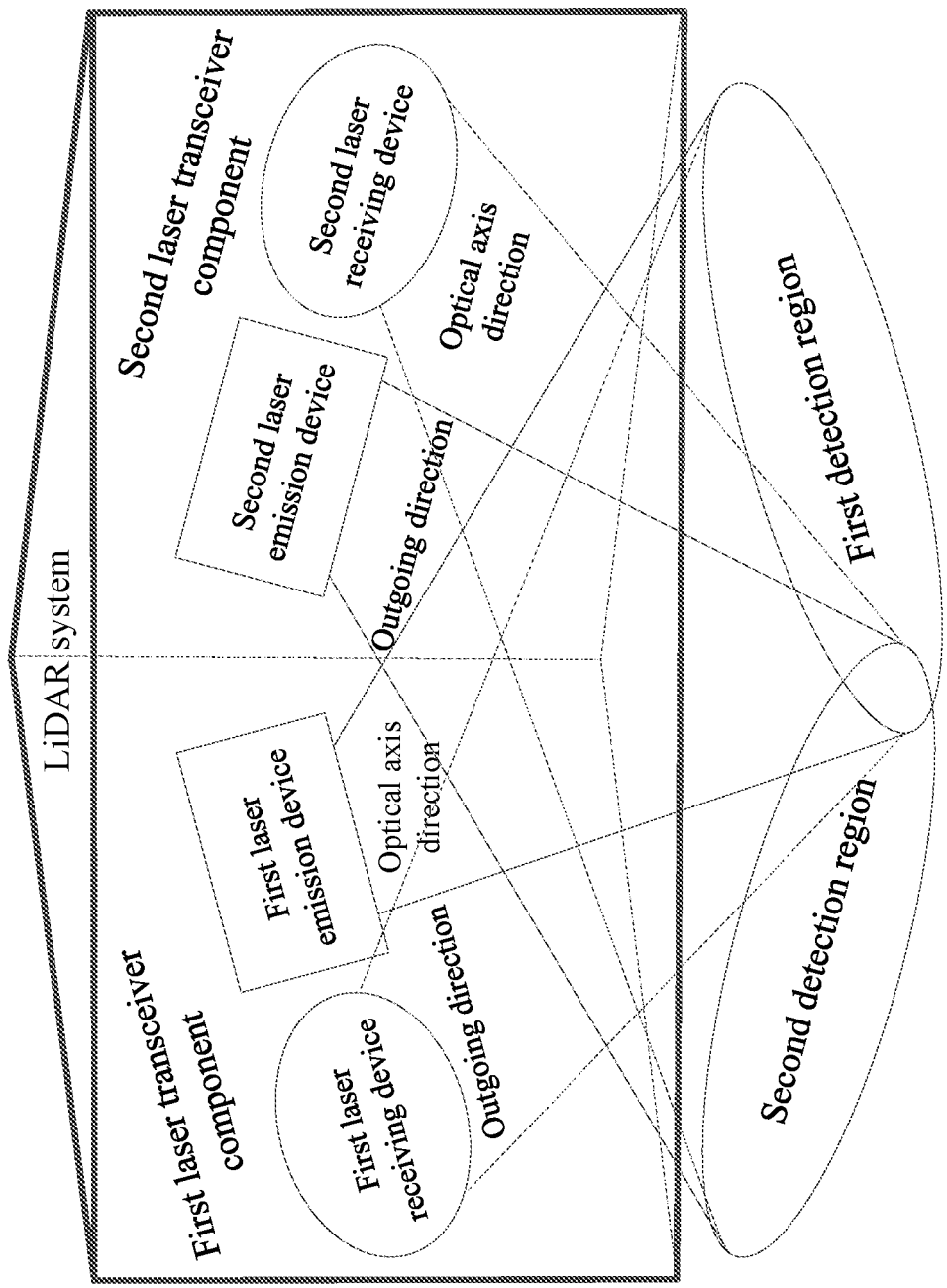
FIG. 7 is a schematic diagram of a LiDAR system according to an embodiment.

As shown in FIG. 7, the first laser emission device and the first laser receiving device in the first laser transceiver component in the LiDAR system are arranged abreast in a horizontal direction, and the second laser emission device and the second laser receiving device in the second laser transceiver component are arranged abreast in the horizontal direction. In this case, an outgoing direction of the first laser emission device is the same as an optical axis direction of the first laser receiving device; and an outgoing direction of the second laser emission device is the same as the optical axis direction of the second laser receiving device.

A detection principle of the LiDAR system related to this embodiment is the same as a detection principle of the LiDAR system in the embodiment of FIG. 6. For details, refer to content of the foregoing embodiment of FIG. 6. Details are not described herein again.

Figure 7A:
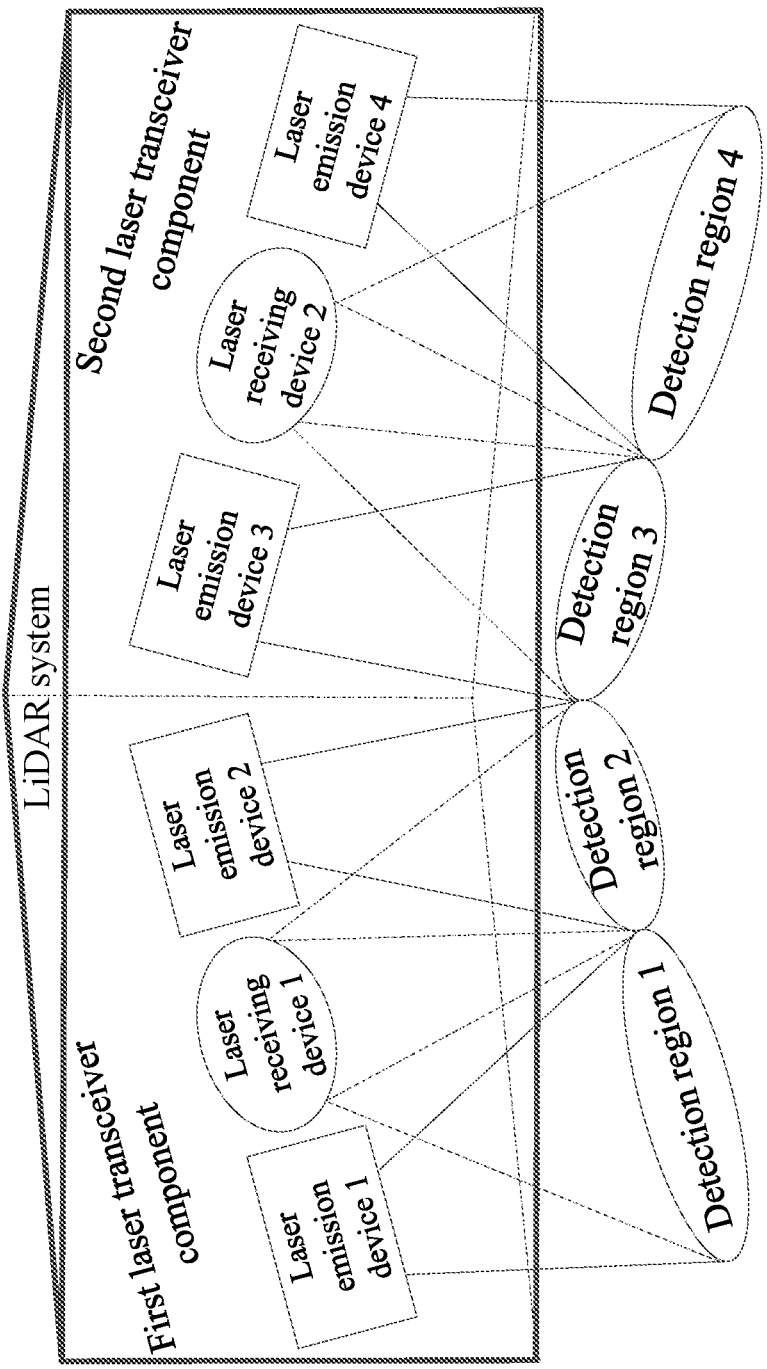
FIG. 7A is a schematic diagram of a LiDAR system according to an embodiment.

Optionally, in such layout, the first laser transceiver component and the second laser transceiver component may also include a plurality of laser emission devices and one corresponding laser receiving device. As shown in FIG. 7A, a detection principle of the LiDAR system related to this embodiment is the same as a detection principle of the LiDAR system in the embodiment of FIG. 6A. For details, refer to content of the foregoing embodiment of FIG. 6A. Details are not described herein again.

Figure 7B:
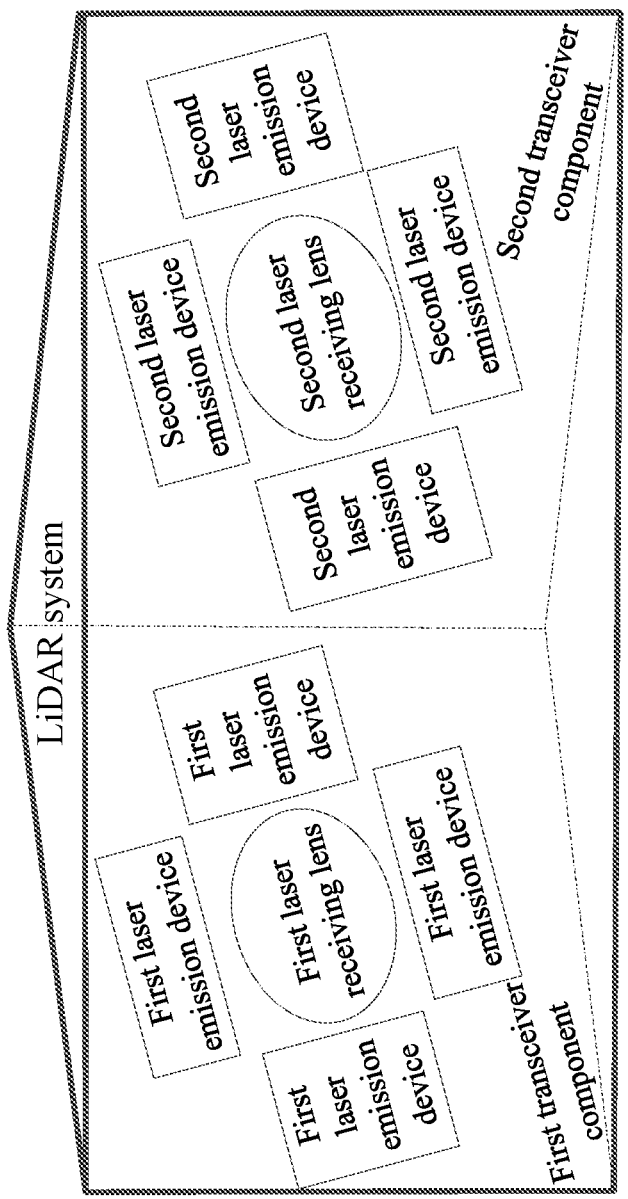
FIG. 7B is a schematic diagram of a LiDAR system according to an embodiment.

Optionally, in the foregoing application scenario of the horizontal arrangement, this application further provides a LiDAR system. A LiDAR system is shown in FIG. 7B. The principle related to this embodiment is the same as that related to the embodiment of FIG. 6B. For details, refer to the foregoing descriptions. Details are not described herein again.

The following embodiment describes a layout in which the LiDAR system includes two laser transceiver components, the two laser transceiver components are arranged horizontally, and the laser emission device and the laser receiving device of each laser transceiver component are arranged vertically.

A third application scenario is as follows.

Figure 8:
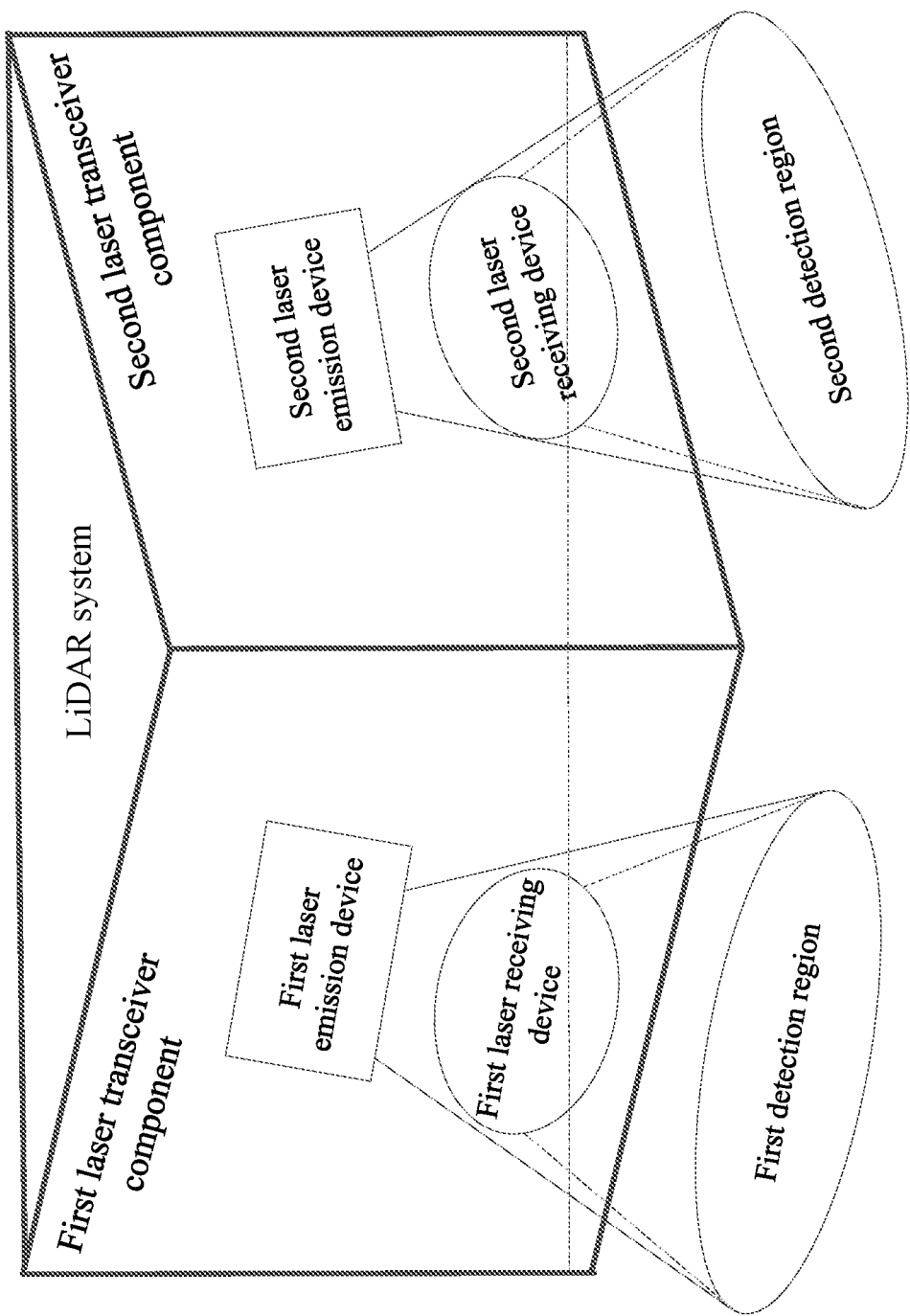
FIG. 8 is a schematic diagram of a LiDAR system according to an embodiment.

As shown in FIG. 8, the first laser emission device and the first laser receiving device in the first laser transceiver component in the LiDAR system are arranged in a vertical direction, and the second laser emission device and the second laser receiving device in the second laser transceiver component are arranged in the vertical direction. In this case, an outgoing direction of the first laser emission device is the same as an optical axis direction of the first laser receiving device; and an outgoing direction of the second laser emission device is the same as the optical axis direction of the second laser receiving device.

This embodiment relates to a case that the first laser transceiver component and the second laser transceiver component only include one laser emission device and one corresponding laser receiving device. In this case, the outgoing laser of the first laser emission device is projected to the first detection region, and the first laser receiving device receives the reflected laser returned after being reflected by an object in the first detection region. In addition, the outgoing laser of the second laser emission device is projected to the second detection region, and the second laser receiving device receives the laser returned after being reflected by an object in the second detection region. The detection region of the LiDAR system is the detection region obtained by splicing the first detection region and the second detection region.

Figure 8A:
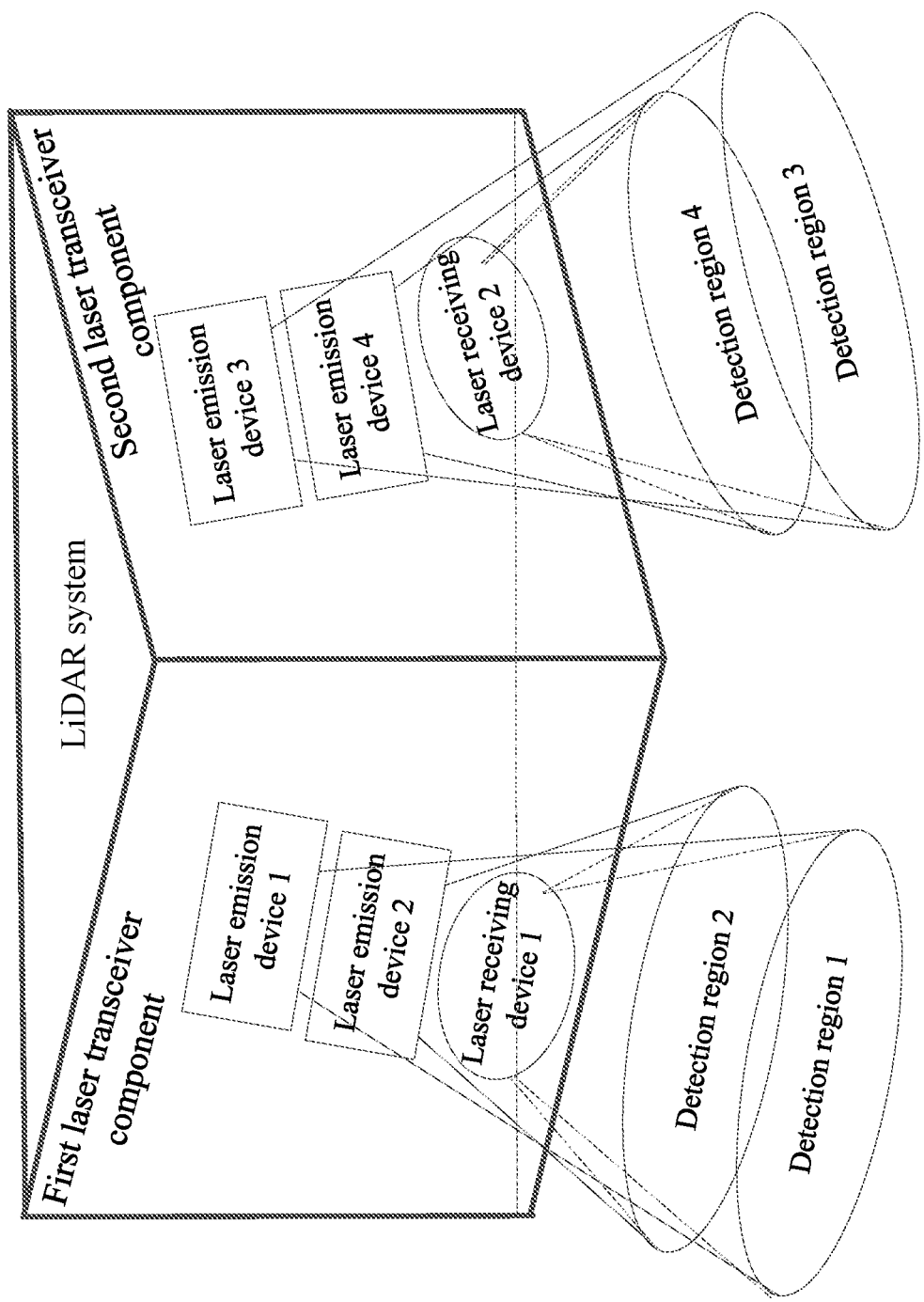
FIG. 8A is a schematic diagram of a LiDAR system according to an embodiment.

Optionally, in the foregoing layout, the first laser transceiver component and the second laser transceiver component may also include a plurality of laser emission devices and one corresponding laser receiving device. As shown in FIG. 8A, both a laser emission device 1 and a laser emission device 2 correspond to a laser receiving device 1, and an outgoing direction of the laser emission device 1 and the laser emission device 2 is the same as an optical axis direction of the laser receiving device 1. In addition, the laser emission device 1 and the laser emission device 2 emit outgoing lasers to their respective detection regions (a detection region 1 and a detection region 2), and a laser receiving device 1 receives reflected lasers returned from objects in the detection region 1 and the detection region 2. Correspondingly, both the laser emission device 3 and the laser emission device 4 correspond to the laser receiving device 2, and outgoing directions of the laser emission device 3 and the laser emission device 4 are the same as the optical axis direction of the laser receiving device 2. In addition, the laser emission device 3 and the laser emission device 4 emit outgoing lasers to corresponding detection regions (a detection region 3 and a detection region 4), and a laser receiving device 2 receives reflected lasers returned after being reflected by objects in the detection region 3 and the detection region 4.

The foregoing application scenario is described based on an example in which the first detection angle of view and the second detection angle of view are disposed back-to-back. Next, an example in which the first detection angle of view and the second detection angle of view are disposed facing one another is used for description.

A fourth application scenario is as follows.

Figure 9:
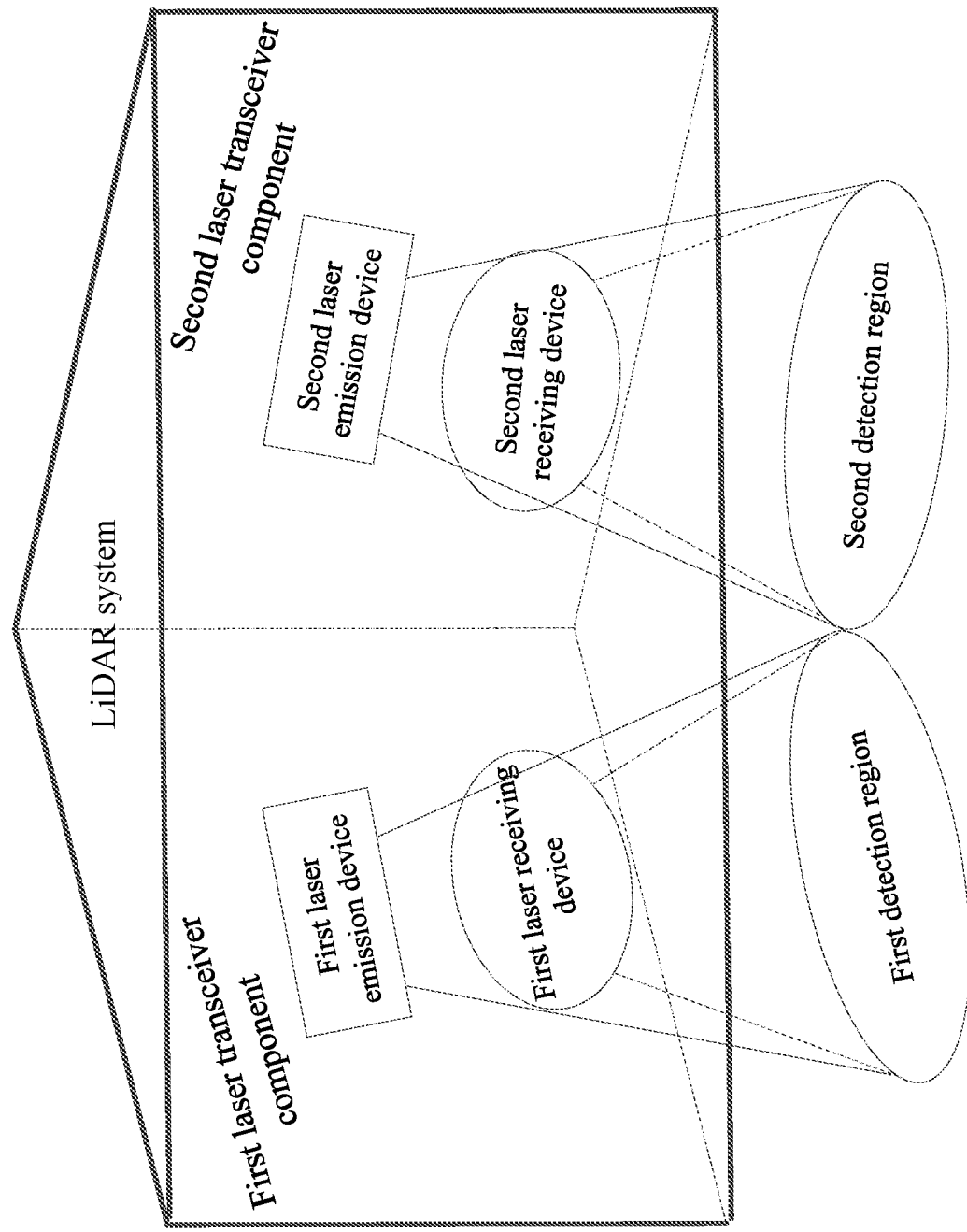
FIG. 9 is a schematic diagram of a LiDAR system according to an embodiment.

As shown in FIG. 9, the first laser emission device and the first laser receiving device in the first laser transceiver component in the LiDAR system are arranged in a vertical direction, and the second laser emission device and the second laser receiving device in the second laser transceiver component are arranged in the vertical direction. In this case, an outgoing direction of the first laser emission device is the same as an optical axis direction of the first laser receiving device; and an outgoing direction of the second laser emission device is the same as the optical axis direction of the second laser receiving device.

A detection principle of the LiDAR system related to this embodiment is the same as a detection principle of the LiDAR system in the embodiment of FIG. 8. For details, refer to content of the foregoing embodiment of FIG. 8. Details are not described herein again.

Figure 9A:
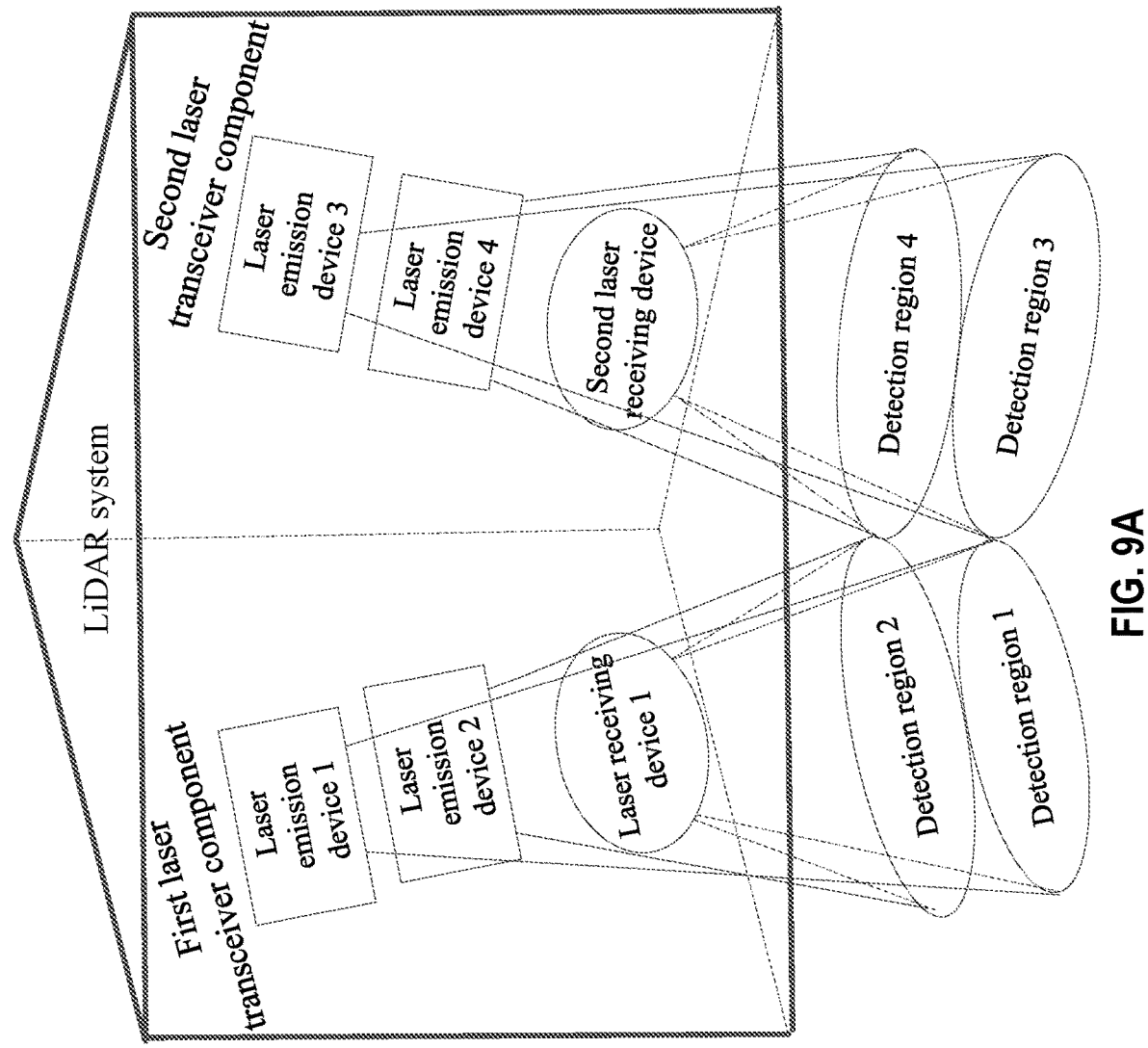
FIG. 9A is a schematic diagram of a LiDAR system according to an embodiment.

Optionally, in such layout, the first laser transceiver component and the second laser transceiver component may also include a plurality of laser emission devices and one corresponding laser receiving device. As shown in FIG. 9A, a detection principle of the LiDAR system related to this embodiment is the same as a detection principle of the LiDAR system in the embodiment of FIG. 8A. For details, refer to content of the foregoing embodiment of FIG. 8A. Details are not described herein again.

Further description is provided. It can be seen from the foregoing embodiment of FIG. 2F that the laser emission device and the laser receiving device in each laser transceiver component may be staggered, and the first detection region and the second detection region are arranged facing one another. The following uses an example for description.

A fifth application scenario is as follows.

Figure 10:
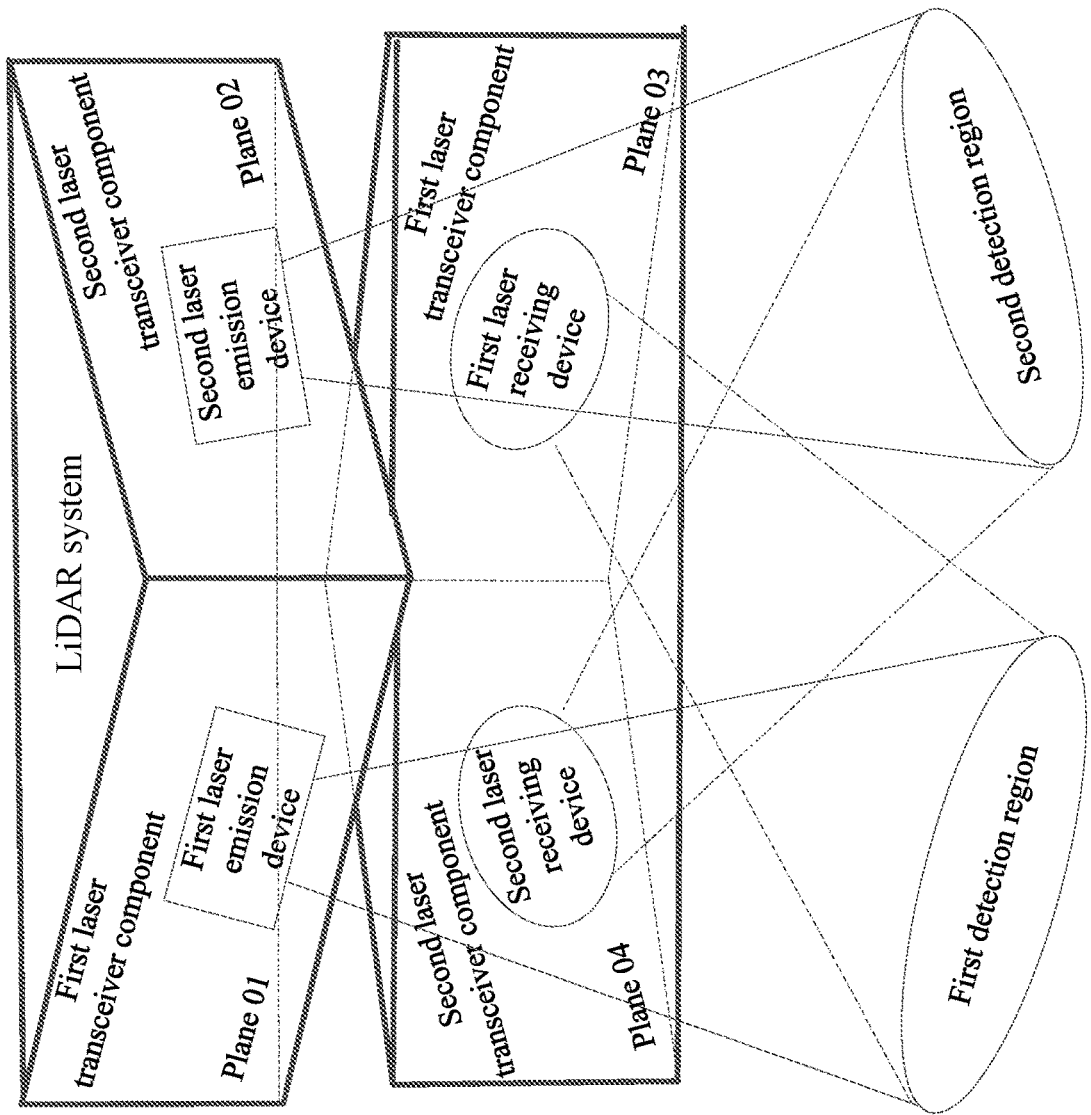
FIG. 10 is a schematic diagram of a LiDAR system according to an embodiment.

As shown in FIG. 10, the first laser emission device in the first laser transceiver component and the second laser receiving device in the second laser transceiver component are arranged in a vertical direction, and the second laser emission device in the second laser transceiver component and the first laser receiving device in the first laser transceiver component are arranged in the vertical direction. An outgoing direction of the first laser emission device is the same as an optical axis direction of the first laser receiving device; and an outgoing direction of the second laser emission device is the same as the optical axis direction of the second laser receiving device.

This embodiment relates to a case that the first laser transceiver component and the second laser transceiver component include a laser emission device and a laser receiving device that are staggered. In this case, as shown in FIG. 10, the first laser emission device and the second laser emission device are arranged back-to-back on the plane 01 and the plane 02, an outgoing laser of the first laser emission device is projected to the first detection region, and an outgoing laser of the second laser emission device is projected to the second detection region. The first laser receiving device and the second laser receiving device are arranged facing each other on the plane 03 and the plane 04. The first laser receiving device receives a laser beam reflected by an object in the first detection region, and the second laser receiving device receives a laser returned after being reflected by an object in the second detection region.

It should be noted that the detection region related to the foregoing FIG. 6 to FIG. 10 is an elliptical region shown in the figure. This is only a schematic illustration, and indicates that the detection region has a specific angle range, size, and direction, but is not limited to a shape and a size of an ellipse, and may be a region of any shape or size. This is not limited to this embodiment.

Optionally, in actual application, an object in a sky detection subregion has relatively high reflectivity. An object in the ground detection subregion usually may be sand, a brick, a gray speed bump, a stone roadside, or the like. These objects generally have low reflectivity. The central detection subregion characterizes performance limit of the LiDAR system.

Figure 12:
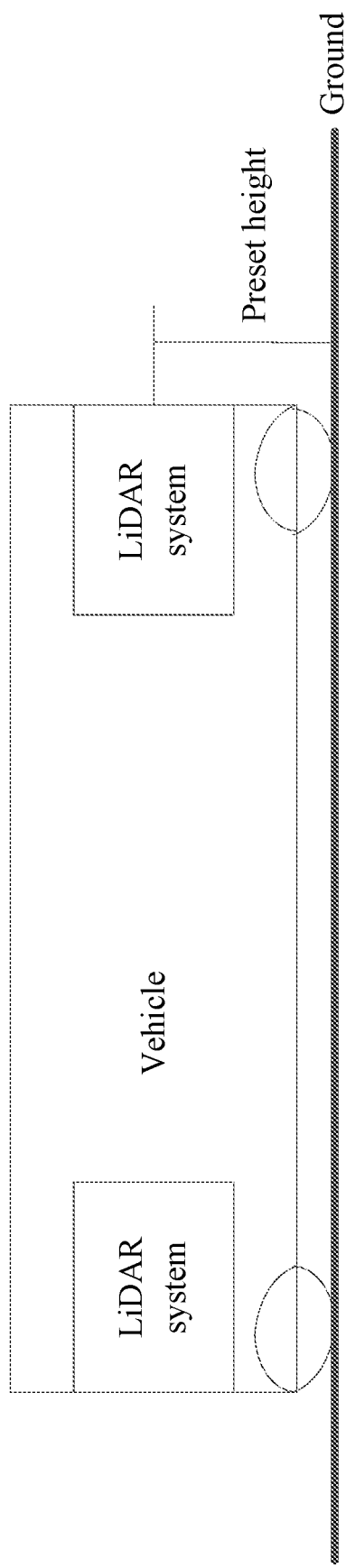
FIG. 12 is a schematic diagram of a vehicle according to an embodiment.

In an embodiment, with reference to the application scenario of FIG. 1, as shown in FIG. 12, this application further provides a vehicle. The LiDAR system in any one of the foregoing embodiments is mounted at a front end and/or a rear end of the vehicle, and a distance between the LiDAR system and the ground reaches a preset height.

The LiDAR system in this embodiment may be mounted at any position on the vehicle. However, to better detect a road condition around the vehicle, the LiDAR system is usually mounted at a front end, a rear end, or a side of the vehicle. Specifically, when the LiDAR system is mounted on the vehicle, the LiDAR system is mounted at a position with a specific preset height from the ground, there is correspondence between the preset height and a height of the vehicle, and the correspondence may be obtained based on experience of a technician. For example, a height of a car is usually within a range of 1.4 to 1.6 meters, and therefore, a mounting height of the corresponding LiDAR system is about 1.5 meters, thereby implementing detection at a proper angle of view around the vehicle. Usually, a height of a truck is within a range of 1.6 to 2.7 meters, a mounting height of the corresponding LiDAR system is about 2.1 meters. The foregoing correspondence is only used as an example for description and does not represent actual design parameters. Therefore, all methods of obtaining a mounting height of a corresponding LiDAR system based on a height of a vehicle shall fall within the protection scope of this application.

Figure 13:
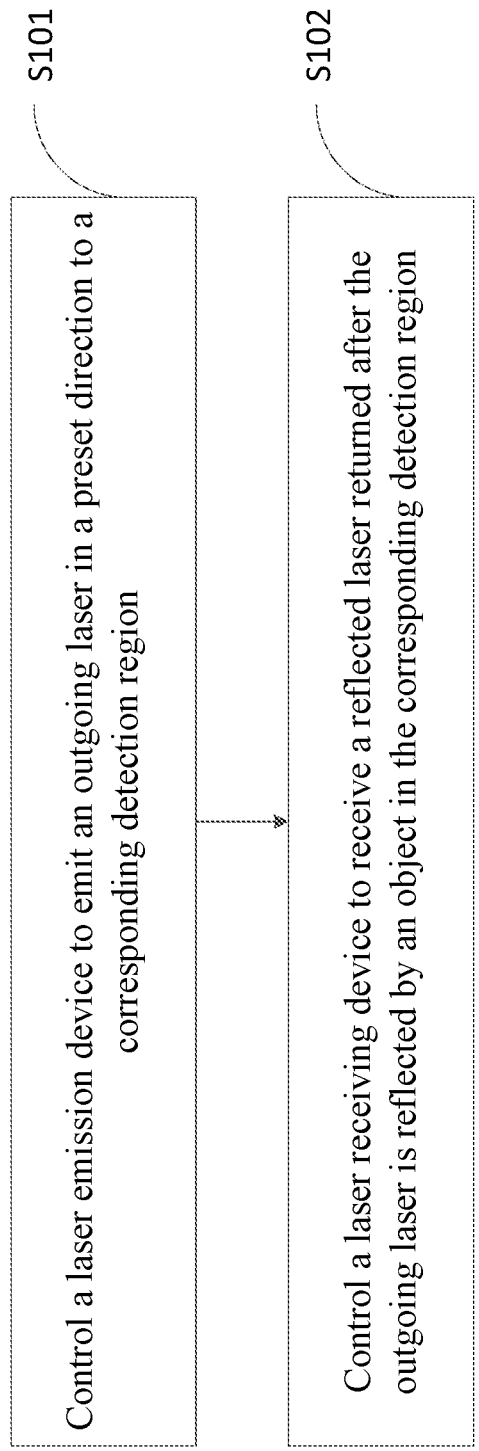
FIG. 13 is a flowchart of a method for controlling a LiDAR system according to an embodiment.

Based on all the foregoing embodiments, this application further provides a method for controlling a LiDAR system. The method is applied to the LiDAR system in any one of the foregoing embodiments. The LiDAR system includes: at least two laser transceiver components; detection regions corresponding to the at least two laser transceiver components are spliced; each detection region is divided into at least two detection subregions along a vertical direction, and each detection subregion is aligned with a different angle range of the detection region along the vertical direction; and each laser transceiver component includes a laser emission device and a laser receiving device that are correspondingly arranged. As shown in FIG. 13, the method includes the following steps.

S101. Control a laser emission device to emit an outgoing laser in a preset direction to a corresponding detection region.

S102. Control a laser receiving device to receive a reflected laser returned after the outgoing laser is reflected by an object in the corresponding detection region. The method for controlling a LiDAR system of the steps S101 and S102 is corresponding to the LiDAR system in the foregoing embodiment of FIG. 2. For a specific explanation, refer to descriptions of the embodiment of FIG. 2. Details are not described herein again.

It should be understood that although the steps in the flowchart in FIG. 13 are shown in sequence as indicated by the arrows, these steps are not necessarily executed in the sequence indicated by the arrows. Unless explicitly stated herein, execution of these steps is not strictly limited to the sequence, and these steps may be executed in another sequence. In addition, at least some steps in FIG. 13 may include a plurality of sub-steps or phases. These sub-steps or phases are not necessarily executed and completed synchronously, but may be executed asynchronously. These sub-steps or phases are not necessarily performed in sequence.

Figure 14:
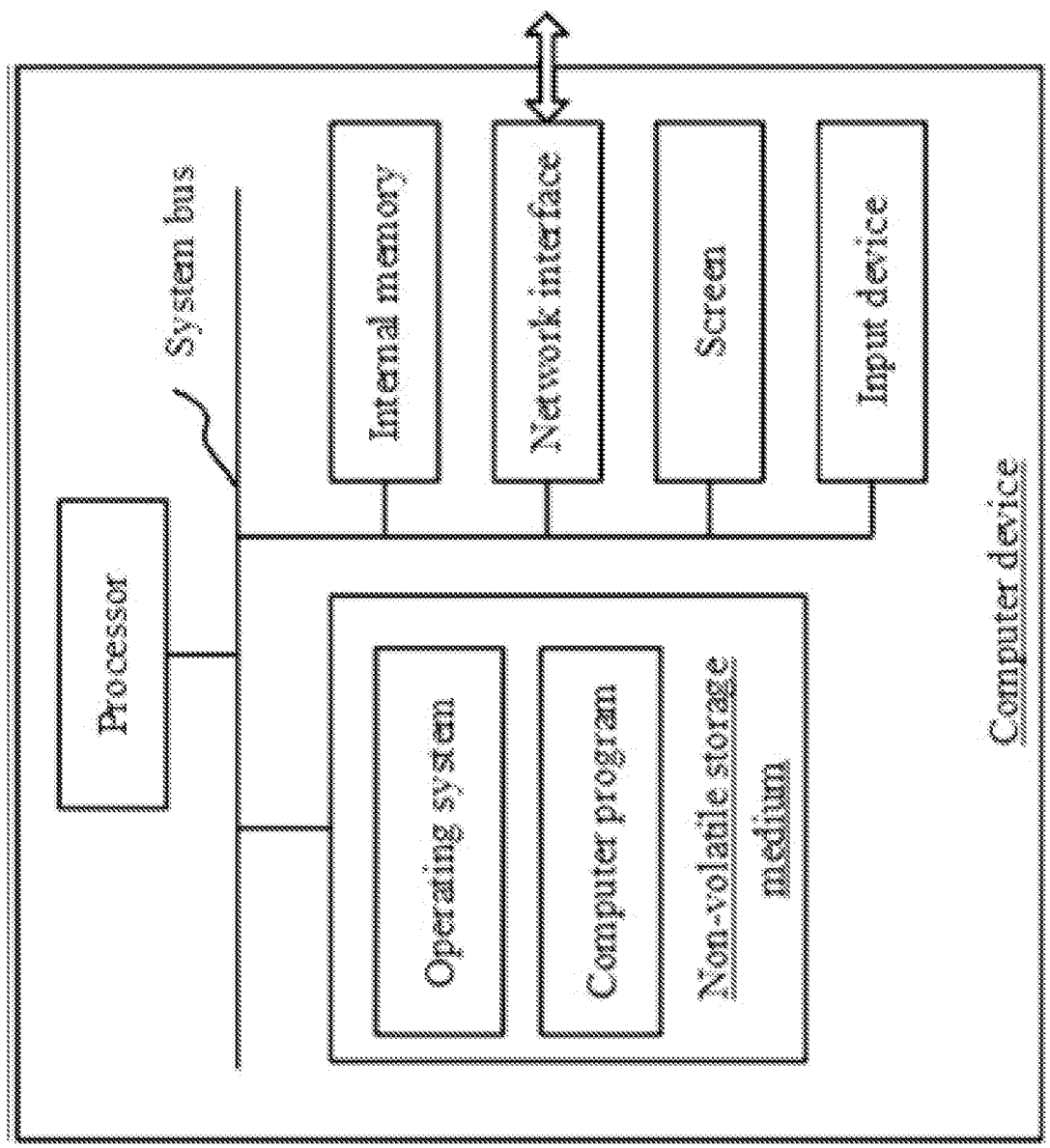
FIG. 14 is a schematic diagram of an inner structure of a computer device according to an embodiment.
Figure 15:
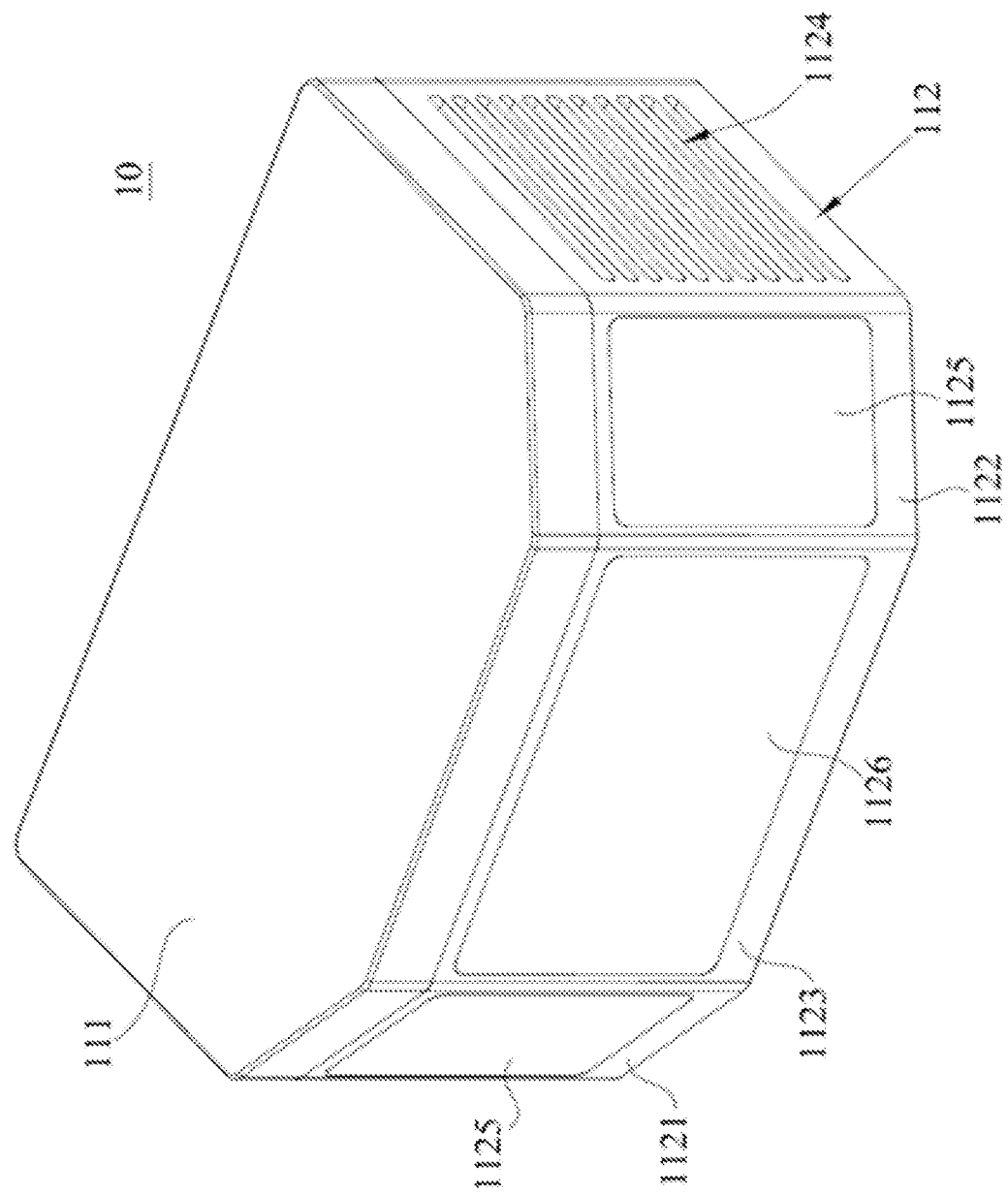
FIG. 15 is a schematic stereogram of a LiDAR according to an embodiment of this application.

The method for the LiDAR system provided in this application may be applied to a computer device shown in FIG. 14. The computer device may be a terminal, and its internal structural diagram may be FIG. 14. The computer device includes a processor, a memory, a network interface, a screen, and an input device connected through a system bus. Herein, the processor of the computer device is configured to provide computing and control capabilities. Memories of the computer device include a non-volatile storage medium and an internal memory. The non-volatile storage medium stores an operating system and a computer program. The internal memory provides an environment for execution of the operating system and the computer program in the non-volatile storage medium. The network interface of the computer device is configured to communicate with an external terminal through a network connection. When being executed by the processor, the computer program implements the method for controlling a LiDAR system. The screen of the computer device may be a liquid crystal display or an electronic ink display, and the input device of the computer device may be a touch layer covered on the screen, or a button, a trackball or a touchpad arranged on a casing of the computer device, or an external keyboard, touchpad, mouse, or the like.

A person skilled in the art can understand that FIG. 14 is only a block diagram of a partial structure related to the solution of this application, and does not constitute a limitation on the computer device to which the solution of this application is applied. The computer device may specifically include more or fewer components than those shown in the figure, or a combination of some components, or a different component arrangement.

In an embodiment, a computer device is provided, and includes a memory and a processor. A computer program is stored in the memory, and when the processor executes the computer program, the following steps are implemented:

Control a laser emission device to emit an outgoing laser in a preset direction to a corresponding detection region.

Control a laser receiving device to receive a reflected laser returned after the outgoing laser is reflected by an object in the corresponding detection region.

An implementation principle and a technical effect of the computer device provided in the foregoing embodiment are similar to those of the foregoing method embodiment. Details are not described herein again.

In an embodiment, a computer-readable storage medium is provided, and stores a computer program, and when the computer program is executed by a processor, the following steps are also implemented:

Control a laser emission device to emit an outgoing laser in a preset direction to a corresponding detection region.

Control a laser receiving device to receive a reflected laser returned after the outgoing laser is reflected by an object in the corresponding detection region.

An implementation principle and a technical effect of the computer-readable storage medium provided in the foregoing embodiment are similar to those of the foregoing method embodiment. Details are not described herein again.

As shown in FIG. 15 to FIG. 23, this embodiment provides a LiDAR 10, and the LiDAR 10 can enlarge a detection angle of view, to reduce a detection blind spot. Specifically, the LiDAR 10 may include a casing 100, a laser emission device, and a plurality of (two or more) laser receiving devices.

The casing 100 demarcates an inner chamber 200, and the inner chamber 200 can be divided into an emission chamber 210 and a receiving chamber 220. The laser emission device is arranged in the emission chamber 210, and the laser receiving devices are arranged in the receiving chamber 220. The inner chamber 200 may only include the emission chamber 210 and receiving chamber 220, or the inner chamber 200 may alternatively include other space in addition to the emission chamber 210 and the receiving chamber 220. For example, some space can be separated from the inner chamber to accommodate components such as a circuit board of the LiDAR, and the like. Because there are precision devices such as a control chip on the circuit board, the laser emission device is usually at high temperature, and these precision devices are apt to be affected by the temperature. Thus, to protect these precision device, heat insulation material can be used to separate a heat insulation chamber from the inner chamber, so that these precision devices are arranged in the heat insulation chamber to achieve a good protection effect.

In this embodiment, the inner chamber 200 includes the emission chamber 210 and the receiving chamber 220. The emission chamber 210 and the receiving chamber 220 are only divided by their functions. It should be noted that the emission chamber 210 and the receiving chamber 220 may be connected to each other, and only virtual division is performed. However, when the emission chamber 210 and the receiving chamber 220 are connected, because a laser beam generated by the laser emission device is easily scattered on a side wall of the inner chamber 200 or reflected by an optical device, if a scattered or reflected laser beam enters the receiving device, interference is caused and detection precision of the LiDAR 10 is affected. Therefore, in a preferred embodiment, the emission chamber 210 and the receiving chamber 220 may also be separated by using an isolation part, so that the emission chamber 210 and the receiving chamber 220 are relatively independent parts.

In this embodiment, the emission chamber 210 and the receiving chamber 220 are two relatively independent separated parts. Specifically, the casing 100 of the LiDAR 10 may include an outer casing 110 and an inner casing 120, the outer casing 110 demarcates the foregoing inner chamber 200, and the inner casing 120 divides the inner chamber 200 into the foregoing emission chamber 210 and receiving chamber 220. In addition, to facilitate transmission of the laser beam emitted from the emission chamber 210 to the outside of the casing 100 and transmission of the laser beam outside the casing 100 to the receiving chamber 220 in the casing 100, the outer casing 110 may include a first translucent plate 1126 and a second translucent plate 1125. The first translucent plate 1126 faces the emission chamber 210, and is configured to transmit the laser beam generated in the emission chamber 210 to the outside of the casing 100. The second translucent plate 1125 faces the receiving chamber 220, and is configured to transmit the laser beam reflected back from the outside of the casing 100 to the inside of the casing 100. Specific arrangement positions of the first translucent plate 1126 and the second translucent plate 1125 on the outer casing 110 depend on a specific condition.

There may be one or more laser emission devices. When there is one laser emission device, the plurality of laser receiving devices simultaneously receive a laser beam that is emitted by the laser emission device and reflected by the detected object. When there are a plurality of laser emission devices, the laser receiving devices can also simultaneously receive laser beams that are emitted by all the laser emission devices and reflected back from the detected object. Particularly, when there are a plurality of laser emission devices, the number of laser emission devices can be the same as the number of laser receiving devices. In this case, each laser receiving device can only correspondingly receive a laser beam emitted by one laser emission device and reflected back by the detected object. With such a structure, a system design can be simplified, a calculation complexity of a rear end of the receiving device can be lowered, crosstalk of light can be reduced, and assembly of light modulators can be easier to perform. In addition, when a specific laser emission device malfunctions, only one laser receiving device is affected, and detection ranges of all laser receiving devices are not affected, thereby improving applicable performance.

It should be noted that, in this embodiment, regardless of whether there is one or more laser emission devices, it is considered that each laser emission device emits a laser beam to the first target region. When there is one laser emission device, a laser beam emitted by the laser emission device covers the first target region. When there are a plurality of laser emission devices, a total region covered by laser beams emitted by the laser emission devices is the first target region. That is, the first target region is formed by combining a plurality of emission subregions, and each laser emission device emits a laser beam to each emission subregion in a one-to-one correspondence manner. In addition, emission subregions may be partially overlapped, completely overlapped, or non-overlapped. It should be noted that because both the emission region and the receiving region are conical, the foregoing "overlapping" only represents a case within a proper detection distance of the LiDAR (for example, when the receiving region and the emission region are at positions extremely close to the LiDAR and cannot be overlapped, and therefore, an overlapping state at the positions is omitted). The proper detection distance depends on the application scenario of the LiDAR.

In addition, when each laser receiving device only correspondingly receives a laser beam emitted by one laser emission device and reflected back by the detected object, to reduce crosstalk between pipelines (that is, to prevent a laser beam emitted by the first emission device from being mistakenly received by the second receiving device, and prevent a laser beam emitted by the second emission device from being mistakenly received by the first receiving device), in an embodiment, parts of emission regions can be overlapped, and each laser receiving device only receives a laser beam reflected by a part of each emission subregion that is not overlapped with another emission region. In another embodiment, none of the emission subregions may be overlapped. Preferably, in another embodiment, the LiDAR 10 may further include a control device, the control device is configured to control on-off of the first emission device 410 and the second emission device 420, so that the first receiving device 310 receives the laser beam emitted by the first emission device 410 to the first detection subregion and the second receiving device 320 receives the laser beam emitted by the second emission device 420 to the second detection subregion. After the control device is added, each emission subregion is not affected with or without overlapping.

A specific control process of the control device may be as follows: within a specific period of time, one laser emission device is started and emits a laser beam, and another laser emission device does not emit a laser beam. In this case, one corresponding laser receiving device is started and receives a reflected laser beam emitted by the laser emission device. In the next period of time, another laser emission device is started and emits a laser beam, and the other laser emission devices do not emit a laser beam. In this case, a laser receiving device corresponding to the foregoing laser emission device is started and receives a reflected laser beam emitted by the laser emission device. In this way, an interval period of time can be reduced to proper time, to achieve a complete detection effect.

The plurality of laser receiving devices in this embodiment are arranged in the receiving chamber 220, the plurality of laser receiving devices can receive a laser beam reflected from a second target region, and at least parts of the first target region and the second target region are overlapped. It should be noted that the second target region includes a plurality of detection subregions, each detection subregion is less than the first target region and has at least a part overlapped with the first target region, and each laser receiving device receives, in a one-to-one correspondence manner, a laser beam reflected from each detection subregion. Particularly, the second target region may completely belong to the first target region, or may only partially belong to the first target region. Because the laser receiving device can only receive the laser beam reflected from the first target region, to improve utilization of the receiving field of view, preferably, the second target region completely belongs to the first target region.

In the LiDAR 10 provided in this embodiment, the laser emission device and the laser receiving device are arranged independently, and there are at least two laser receiving devices. Compared with the structure with only one laser receiving device in the prior art, the plurality of laser receiving devices are added, which can enlarge the receiving field of view and increase the detection angle of view, thereby reducing a detection blind spot of the LiDAR 10.

Figure 16:
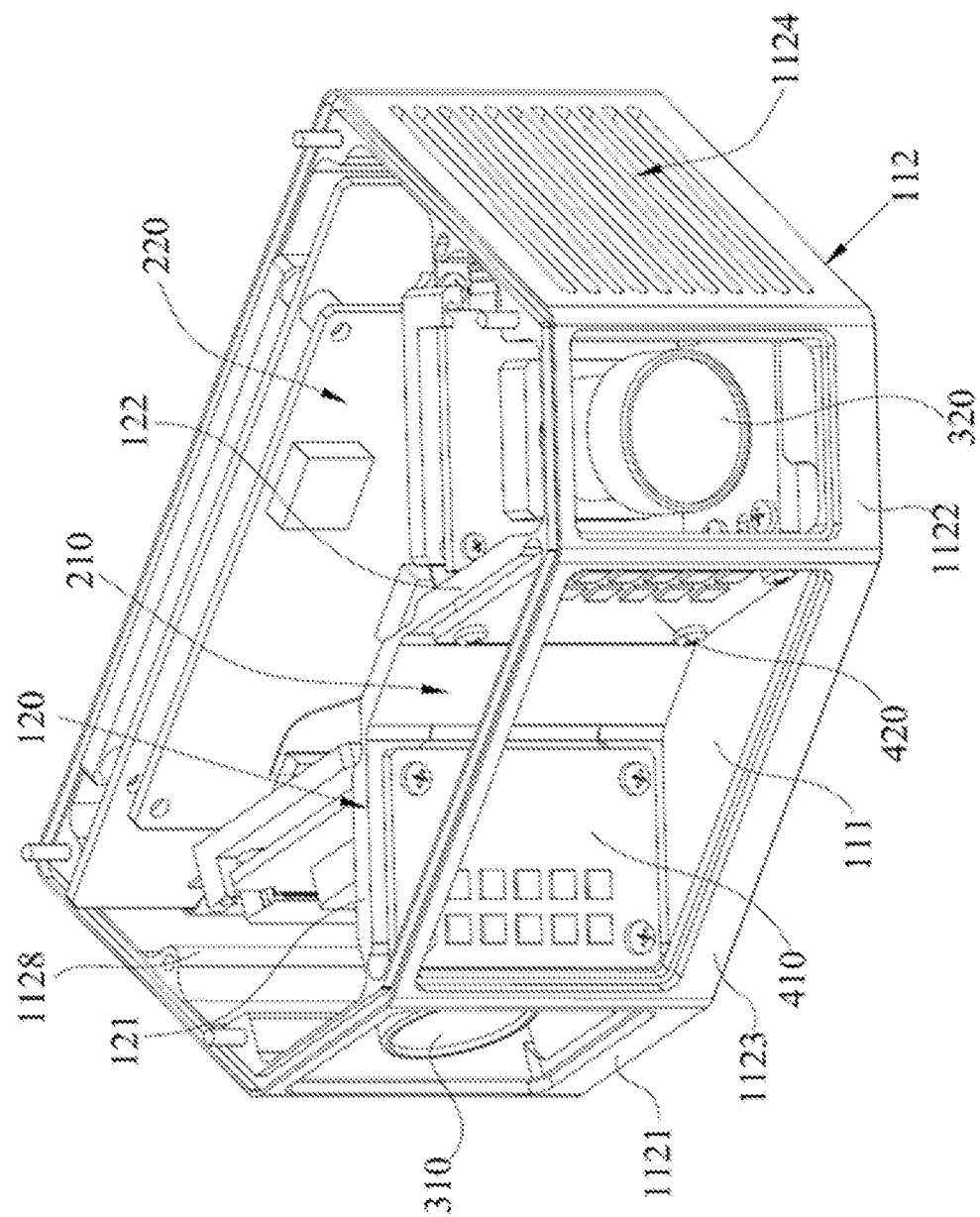
FIG. 16 is a schematic stereogram of a combination of a casing, a laser emission device, and a laser receiving device of a LiDAR according to an embodiment of this application.
Figure 17:
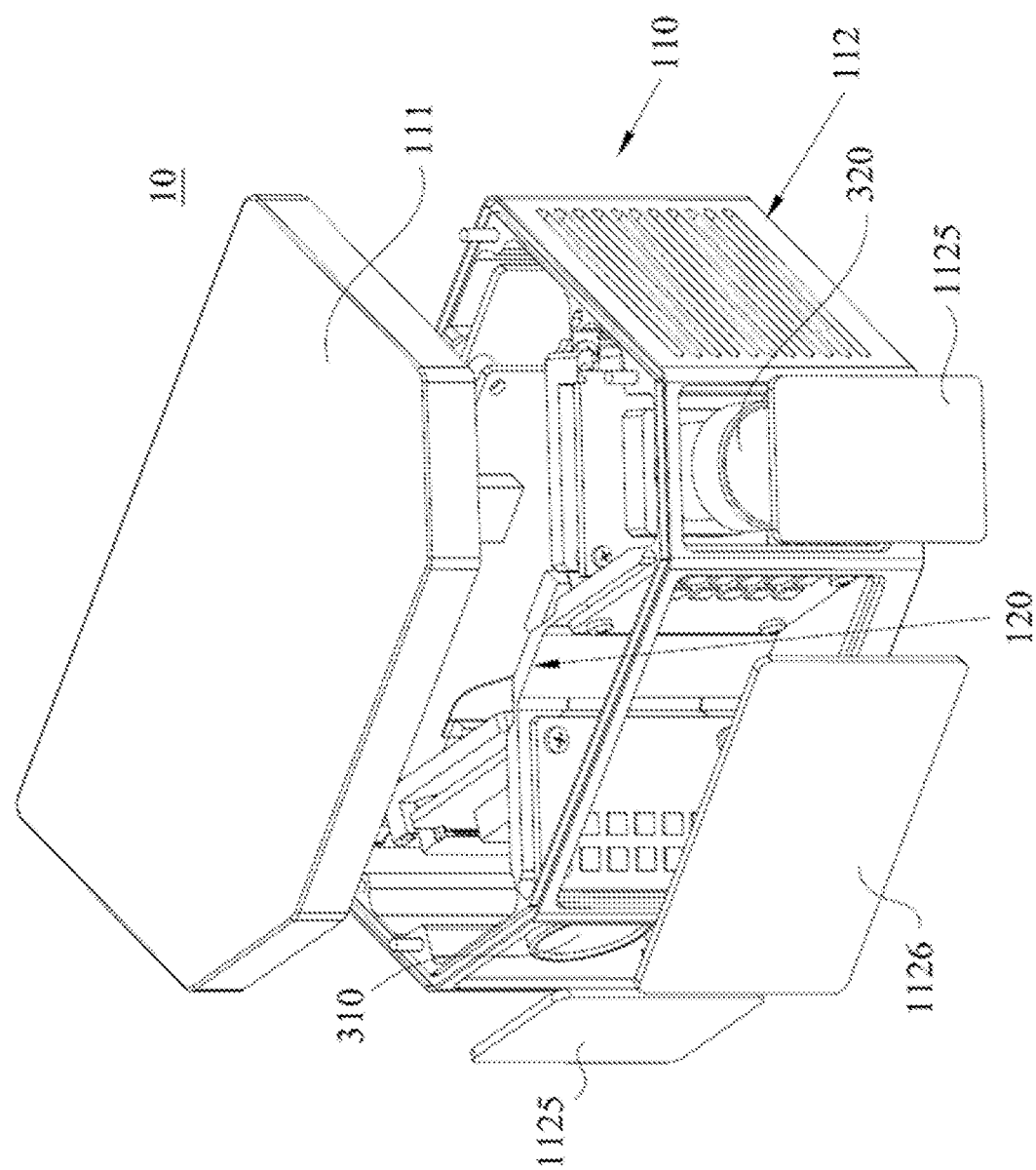
FIG. 17 is a first exploded schematic view of a LiDAR according to an embodiment of this application.
Figure 18:
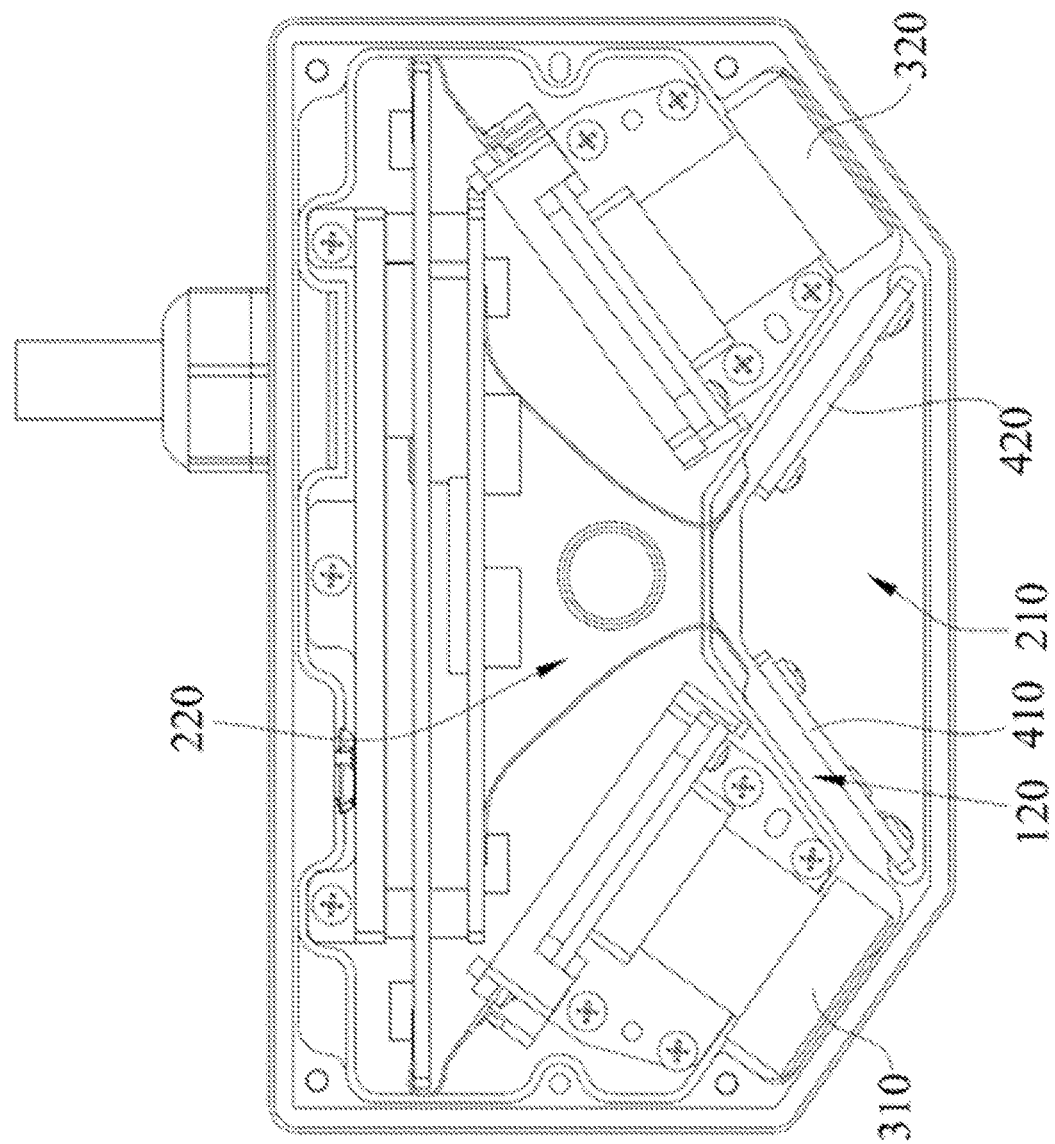
FIG. 18 is a first schematic full cross-sectional view of a LiDAR according to an embodiment of this application.
Figure 19:
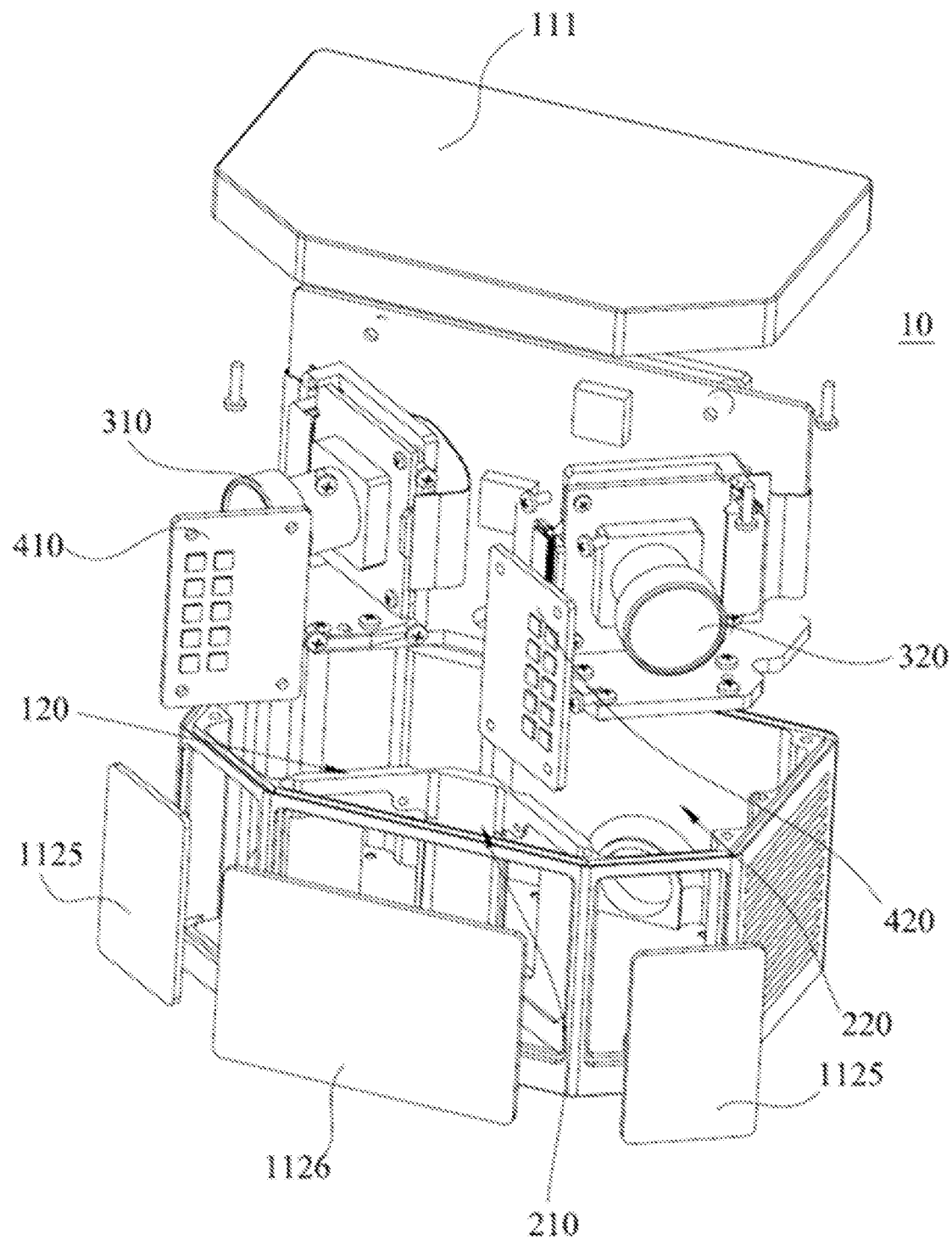
FIG. 19 is a second exploded schematic view of a LiDAR according to an embodiment of this application.
Figure 20:
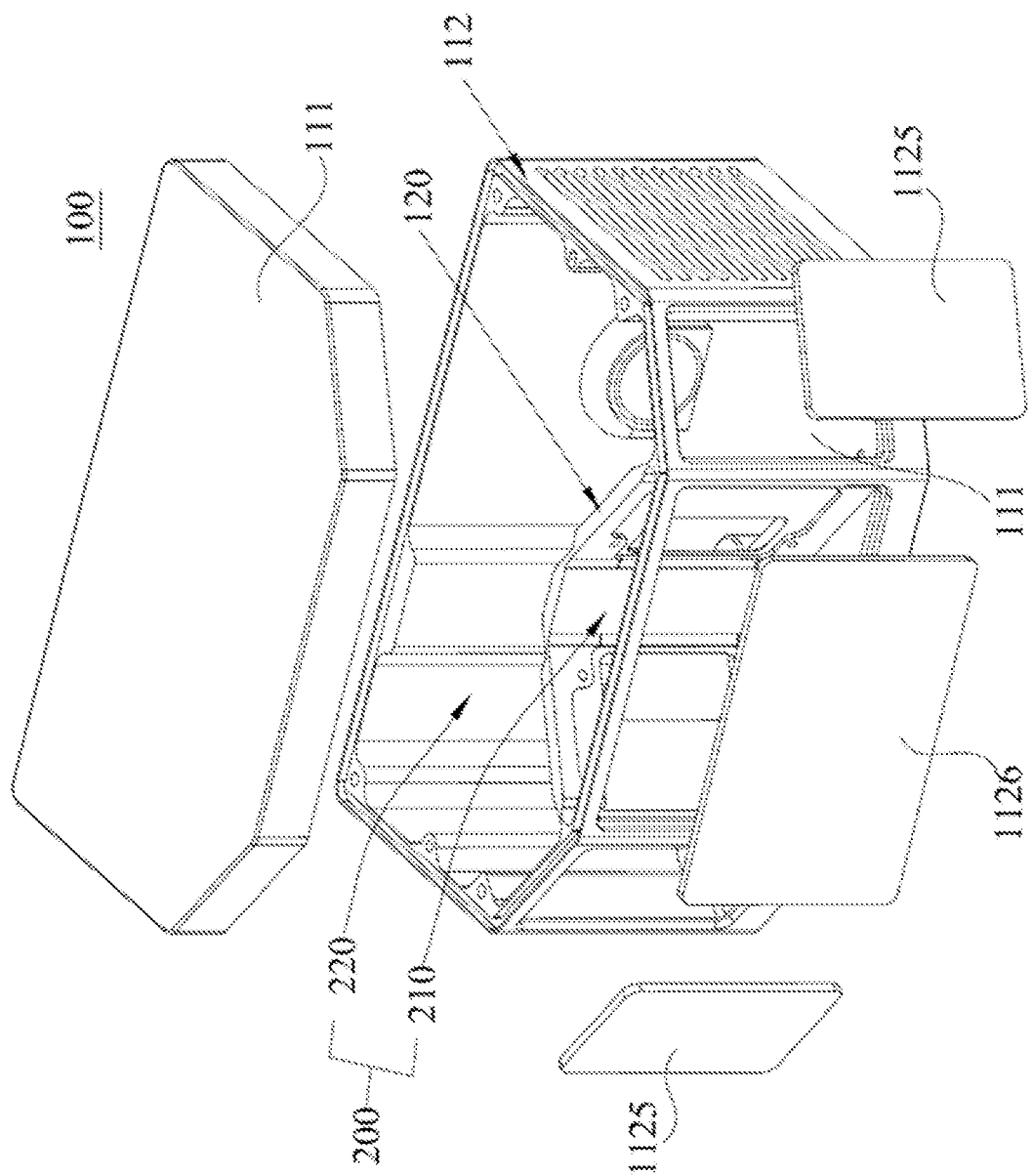
FIG. 20 is an exploded schematic view of a casing of a LiDAR according to an embodiment of this application.
Figure 21:
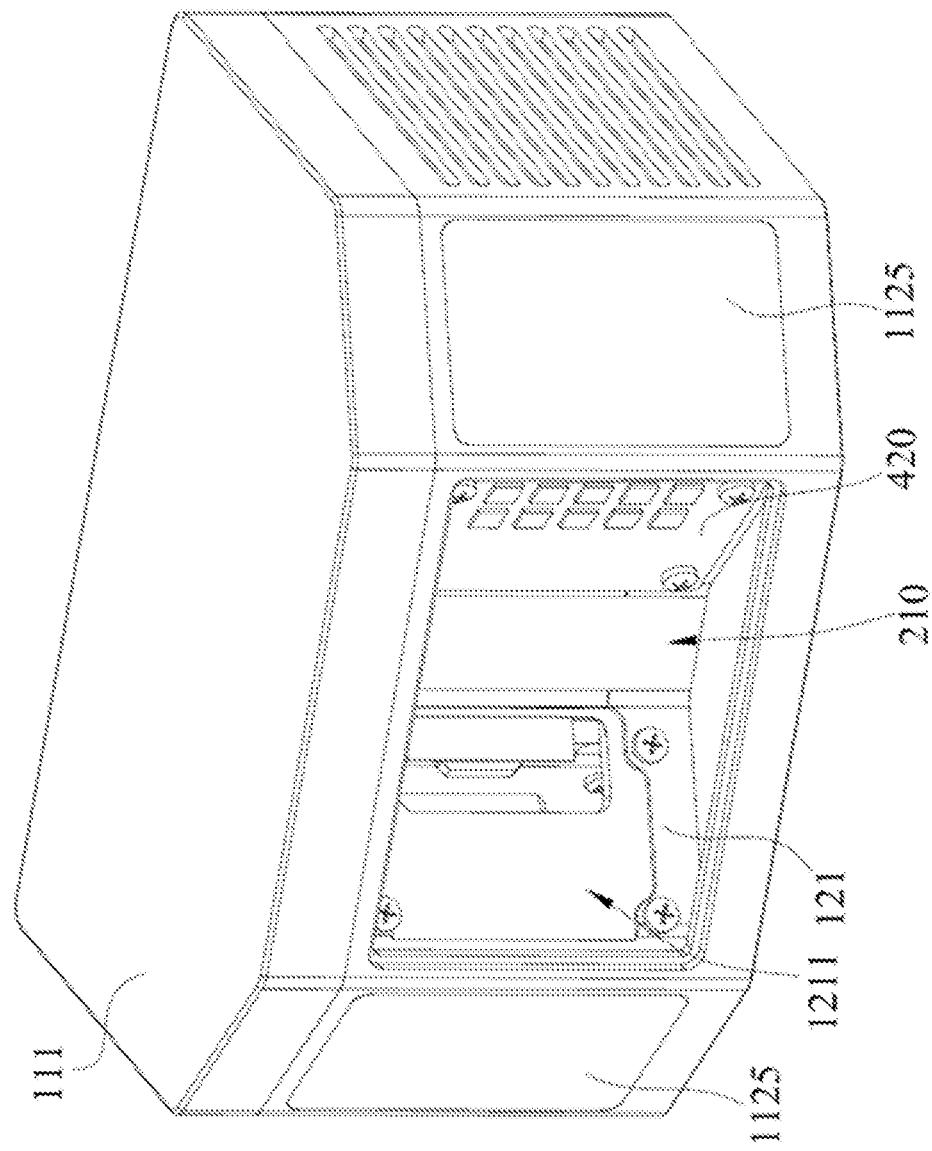
FIG. 21 is a schematic stereogram of a partial casing and a laser emission device of a LiDAR according to an embodiment of this application.

As shown in FIG. 16 to FIG. 18, in an embodiment, there may be two laser emission devices. For ease of description, the two laser emission devices are referred to as the first emission device 410 and the second emission device 420. The first emission device 410 emits a laser beam toward the first emission subregion (namely, one corresponding emission subregion), and the second emission device 420 emits a laser beam toward the second emission subregion (namely, another corresponding emission subregion), and the first target region is formed by combining the first emission subregion and the second emission subregion. The first emission subregion and the second emission subregion may be partially overlapped, completely overlapped, or non-overlapped. Preferably, the first emission subregion and the second emission subregion may be partially overlapped to implement full coverage of the entire detection field of view. A specific situation is described above. Details are not described herein again.

When there are two laser emission devices, there may also be two laser receiving devices. For ease of description, the two laser receiving devices are referred to as a first receiving device 310 and a second receiving device 320, and both the first receiving device 310 and the second receiving device 320 are configured to receive the laser beam reflected back from the first target region. When the LiDAR 10 has two receiving devices and two emission devices, in an embodiment, as shown in FIG. 8 and FIG. 9, the two laser emission devices may be located between the two laser receiving devices. Specifically, the first emission device 410 is located between the second emission device 420 and the second receiving device 320, and the second emission device 420 is located between the first emission device 410 and the first receiving device 310. In addition, in this case, a laser beam emitted by the first emission device 410 and a laser beam received by the first receiving device 310 can be directed toward the right side (with reference to the orientation shown in the figure), so that a laser beam emitted by the second emission device 420 and a laser beam received by the second receiving device 320 is directed toward the left side (with reference to the orientation shown in the figure).

In this embodiment, the first receiving device 310 is configured to receive light from the first detection subregion, and the first detection subregion is located in the first emission subregion. Certainly, in another embodiment, the first detection subregion may also be partially located outside the first emission subregion, and in this case, the first receiving device can only receive a laser beam reflected by a part of the first detection subregion that is located in the first emission subregion. The second receiving device 320 is configured to receive light from a second detection subregion, and the second detection subregion is located in the second emission subregion. In addition, when the first emission subregion and the second emission subregion have an overlapped part, to prevent the laser beam emitted by the second emission device 420 from being reflected to the first receiving device 310 and prevent the laser beam emitted by the first emission device 410 from being reflected to the second receiving device 320, the first detection subregion may be located at a position of the first emission subregion other than the foregoing overlapped part, and the second detection subregion may be located at a position of the second emission subregion other than the foregoing overlapped part. Particularly, because diffuse reflection of light occurs in the detection region and causes light crosstalk, even if the foregoing solution is used, the problem of light crosstalk cannot be completely eliminated. Preferably, the LiDAR 10 in this embodiment may further include a control device (not shown in the figure), the control device is configured to control on-off of the first emission device 410 and the second emission device 420, so that the first receiving device 310 receives the laser beam emitted by the first emission device 410 to the first detection subregion and the second receiving device 320 receives the laser beam emitted by the second emission device 420 to the second detection subregion. A specific working principle of the control device is described above. Details are not described herein again. The control device can ensure that only the first receiving device receives the light reflected from the detection region when the first emission device is started, and only the second receiving device receives the light reflected from the detection region when the second emission device is started. Therefore, the problem of light crosstalk is basically eliminated.

As shown in FIG. 16 and FIG. 17, the casing 100 may include an outer casing 110 and an inner casing 120; the outer casing 110 demarcates an inner chamber 200, and includes a first translucent plate 1126 and two second translucent plates 1125; and the inner casing 120 is provided in the inner chamber 200, connected to an inner wall of the outer casing 110, and divides the inner chamber 200 into an emission chamber 210 and a receiving chamber 220. The inner casing 120 is respectively connected to two end plates 111 and an emission wall 1123, and demarcates the emission chamber 210 together with the emission wall 1123 and the two end plates 111.

The first translucent plate 1126 faces the emission chamber 210, and laser beams emitted by the first emission device 410 and the second emission device 420 pass through the first translucent plate 1126 and are directed to the outside of the LiDAR 10. The two second translucent plates 1125 both face the receiving chamber 220, the first receiving device 310 receives a laser beam passing through one of the second translucent plates 1125, and the second receiving device 320 receives a laser beam passing through the other second translucent plate 1125.

Specifically, the outer casing 110 includes two end plates 111 which are set opposite to each other and a side wall plate 112. The side wall plate 112 is located between the two end plates 111 and demarcates the inner chamber 200 together with the two end plates 111. The side wall plate 112 includes an emission wall 1123, a first receiving wall 1121, and a second receiving wall 1122. Along a circumferential direction of the side wall plate 112, the first receiving wall 1121 and the second receiving wall 1122 are respectively located at two ends of the emission wall 1123.

The first translucent plate 1126 is arranged at the emission wall 1123, and the first translucent plate 1126 can be a flat plate or a curved plate. This may specifically depend on a shape of the emission wall 1123. As the flat plate, the first translucent plate 1126 may be circular or polygonal. In this embodiment, the first translucent plate 1126 is a rectangular flat plate. The first translucent plate 1126 may completely cover the emission wall 1123 (in this case, the first translucent plate 1126 is the emission wall 1123) or may partially cover the emission wall 1123.

The two second translucent plates 1125 are arranged on the first receiving wall 1121 and the second receiving wall 1122 in a one-to-one correspondence manner. Similarly, the second translucent plate 1125 may be a flat plate or a curved plate. This depends on shapes of the first receiving wall 1121 and the second receiving wall 1122. As a flat plate, the second translucent plate 1125 can be circular or polygonal. In this embodiment, the second translucent plate 1125 is a rectangular flat plate.

When the emission wall 1123, the first receiving wall 1121, and the second receiving wall 1122 are all flat, the first receiving wall 1121, the second receiving wall 1122, and the emission wall 1123 may be coplanar. To reduce an overlapping area between the first receiving subregion and the second receiving subregion and increase an entire detection field of view of the LiDAR, in this embodiment, as shown in FIG. 1, FIG. 2, FIG. 8, and FIG. 9, the first receiving wall 1121 and the emission wall 1123 form a first included angle c (shown in FIG. 22), the second receiving wall 1122 and the emission wall 1123 form a second included angle d (shown in FIG. 22), and the first included angle c and the second included angle d are equal, both of which are obtuse angles less than 180 degrees. For example, the first included angle c and the second included angle d can be 170 degrees, 150 degrees, 135 degrees, 120 degrees, or 100 degrees. It should be noted that, as described above, the first included angle c and the second included angle d are both included angles obtained by measuring the inside of the casing 100. That is, the first included angle c is an included angle between an inner wall surface of the first receiving wall 1121 and an inner wall surface of the emission wall 1123, and the second included angle d is an included angle between an inner wall surface of the second receiving wall 1122 and the inner wall surface of the emission wall 1123.

As shown in FIG. 24 and FIG. 25, due to a hardware limitation, in the prior art, intensity of light emitted by the laser emission device varies at different positions in the emission field of view, and such variation has specific impact on the detection precision of the LiDAR. It can be seen from FIG. 24 that intensity of light at a center of the emission field of view is lower, and intensity of light at a position near an edge of the emission field of view is higher. To improve uniformity of light throughout the emission field of view, in an embodiment, the LiDAR may further include a diffuser (namely, a micro-optical system with a specific structure (diffuser or ROE)). The diffuser is configured to adjust the light emitted by the laser emission device, so that light energy is more uniformly distributed throughout the emission field of view. Outgoing light emitted by the laser emission device passes through the specific micro-optical system (diffuser or ROE) and then illuminates the field of view at a time through floodlight. In this case, the light in the emission field of view is distributed in a specific region in the space according to a specific rule. FIG. 25 is a curve chart showing that intensity of light in an emission field of view changes with positions. It can be seen that the intensity of light becomes more uniform throughout the emission field of view.

Specifically, a light source chip in the laser emission device in this embodiment may be a vertical-cavity surface-emitting laser (VCSEL) produced through a semiconductor process, and an angle of view of the outgoing light is generally 20 to 24°. A surface of the chip is covered with a micro-optical device such as a diffuser (diffraction type) or ROE (refractive type), to diffuse outgoing light and implement outgoing energy shaping and uniform emission through multiple refraction or reflection, thereby focusing more energy within a designed outgoing angle of view. The diffuser has a diffraction micro-optical structure, and usually uses a material of an organic polymer. The ROE is a refractive micro-optical element made from glass, and implements a function similar to that of the diffuser, but a principle of the ROE is based on refraction and reflection of light. Similar to a microlens array, the ROE has better high-temperature resistance and needs higher costs. Based on a far-field energy distribution curve of the light source chip, corresponding optical lens parameters of a receiving end are designed to compensate for uneven energy distribution of an emission light source.

Figure 26:
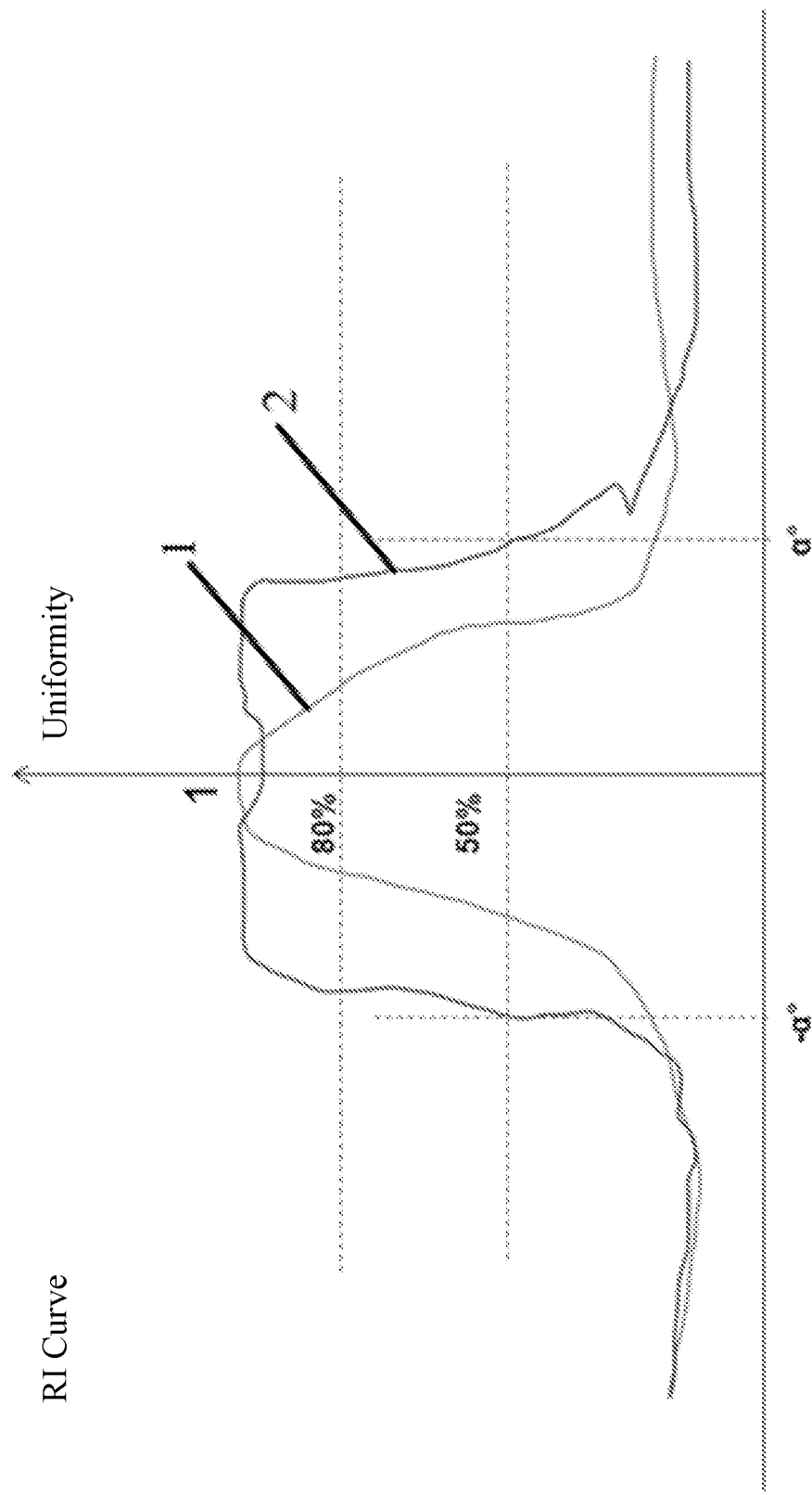
FIG. 26 is a schematic diagram of curves of a light receiving angle changing with uniformity in the receiving field of view of the laser receiving device, where a curve 1 is a schematic curve of a laser receiving device in the prior art, and a curve 2 is a schematic curve according to an embodiment of this application.
Figure 27:
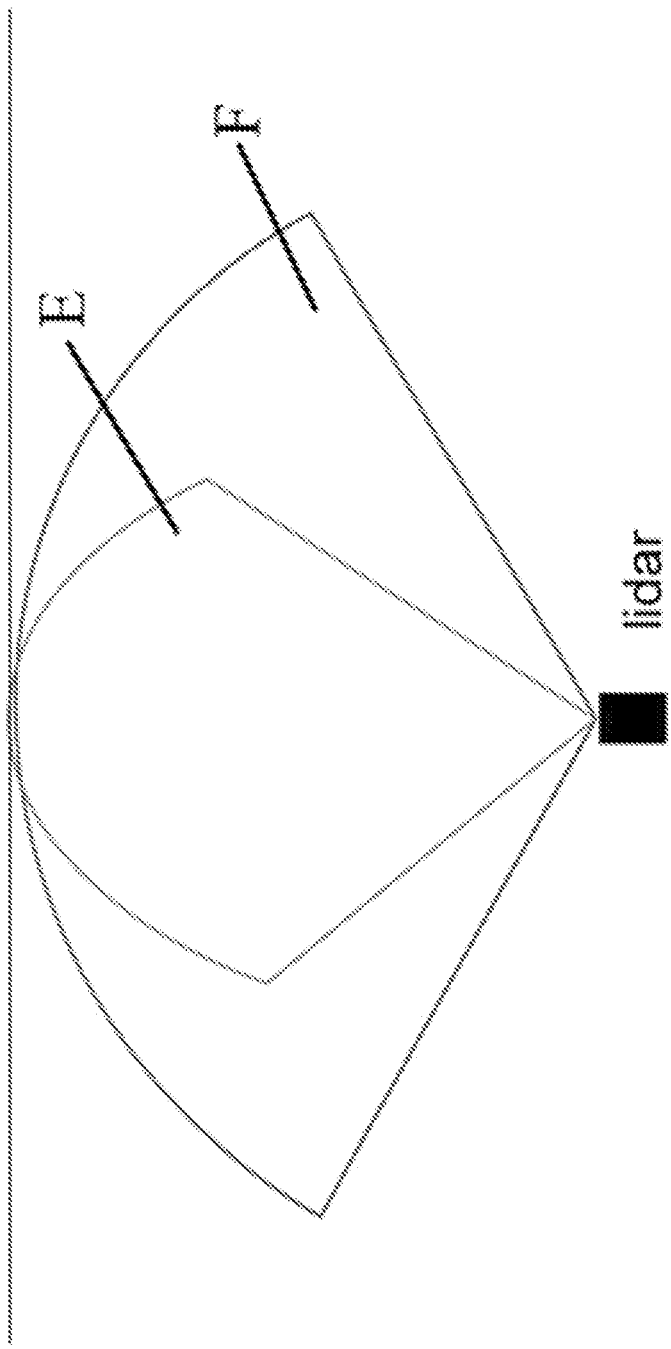
FIG. 27 is a schematic diagram of a scope of a receiving field of the laser receiving device, where a field of view E is a schematic diagram of a field of view in the prior art, and a field of view F is a schematic diagram of a field of view according to an embodiment of this application.

As shown in FIG. 26 and FIG. 27, the optical lens of the receiving end usually has maximum receiving efficiency at the center, and the receiving efficiency attenuates rapidly in the peripheral region, as indicated by a curve 1 in FIG. 26. The optical lens of the receiving end with poor uniformity is used for receiving a laser, and cooperating with the foregoing laser emission device with poor uniformity of energy distribution, and as a result, the distance that the LiDAR can detect is non-uniform, and the detection field of view of the LiDAR is small, that is, a detection field of view E in FIG. 27 with a long detection distance in the middle and an extremely insufficient detection distance on both sides.

In an embodiment, to more uniformly perform detection, the optical lens of the receiving end of the laser receiving device may be improved accordingly. Specifically, optical lenses of the receiving end of the laser receiving device can use 6 optical lenses, including 5 spherical glass lenses and 1 aspherical glass lens (which, compared with the spherical lens, increases a degree of freedom, has a higher-order dimension, and is equivalent to 1.5 to 2 spherical glass lenses). The plurality of lenses cooperate with each other to implement correction and effectively compensate for an aberration of a tangential surface and a sagittal surface, thereby ensuring sufficient resolution (required for a planar array radar) on the premise of sufficient light-transmission. Defocusing of the tangential surface and the sagittal surface causes imaging distortion. The distortion is decreased through methods of using a material with a high refractive index and optimizing an internal transmission angle of view of an optical path, and so on. Generally, TV distortion needs to be less than −30%. Great light-transmission inevitably causes a large included angle between a received reflected laser beam and a central optical axis of the optical lens of the receiving end. A combination of lenses are used to switch between high and low refractive indexes, thereby improving spherical aberration. A design combining a multi-layer mirror coating with high-performance and proper low angle shift (LAS) filter passband is used to ensure that energy transmission efficiency of the optical lens of the receiving end reaches up to 95%. To reduce crosstalk and noise, the lens is coated to ensure that infrared transmittance of a single lens is less than 0.5%. Because high reflectivity for an infrared band still exists when conventional blackening processing such as anodizing is used, an inner surface of a diaphragm inside the optical lens of the receiving end and an inner wall of a structural member are coated with a nano-coating with a temperature gradient process, to effectively improve a light absorption feature on the near-infrared band, thereby greatly reducing influence of stray light on the detection effect. Two lenses with negative dispersion and one lens with wavefront shaping are used to eliminate chromatic aberration from the system, and a symmetrical design should be used inside the lenses to improve the wavefront aberration. A combination of lenses that have high and low refractive indexes and are made of different materials are used to reduce a dispersion effect. Five groups of spherical lens and one aspherical lens cooperate with one another for iteration of a designed curved surface function of the lens, and iterative optimization of a relative illumination (RI) curve of the optical lens of the receiving end with great light-transmission, a high modulation transfer function (MTF), and wide bandwidth.

After the parameters of the optical lens of the receiving end of the laser receiving device are optimized, a detection field of view of the LiDAR, which is formed after the laser receiving device fits the laser emission device, is a field of view range F in FIG. 27. In FIG. 27, the LiDAR can detect a larger angle of view and more uniform distances at different angles.

Theoretically, the foregoing function can also be implemented through a combination of at least 3 glass aspherical lenses and a matched design of a higher-order Fresnel parameter. The optical lens of the receiving end is properly optimized, to eliminate influence of saturated expansion of high and low objects and a halo phenomenon on ranging performance in an actual working condition. A designed depth of field of the optical lens of the receiving end needs to meet a parameter requirement of the LiDAR. Generally, clear focusing and imaging can be implemented when a distance is greater than 0.5 m in the near field. This also imposes a limitation that there should actually be at least two optical lenses of the receiving end. An imaging mode of the LiDAR is to receive a reflected laser beam from the detection field of view at a time, and detectors of the laser receiving devices have the same energy efficiency for receiving the reflected laser beam from each region in space.

In an embodiment, as shown in FIG. 17 and FIG. 22, the first receiving device 310 has a first optical path axis 530, the first optical path axis 530 is perpendicular to one of the two second translucent plates 1125 intersecting with the first optical path axis, the second receiving device 320 has a second optical path axis 540, the second optical path axis 540 is perpendicular to the other of the two second translucent plates 1125 intersecting with the second optical path axis, and an included angle between the first optical path axis 530 and the second optical path axis 540 is greater than 45 degrees. With such structure, a larger angle of view can be implemented compared with the LiDAR in the prior art.

Figure 23:
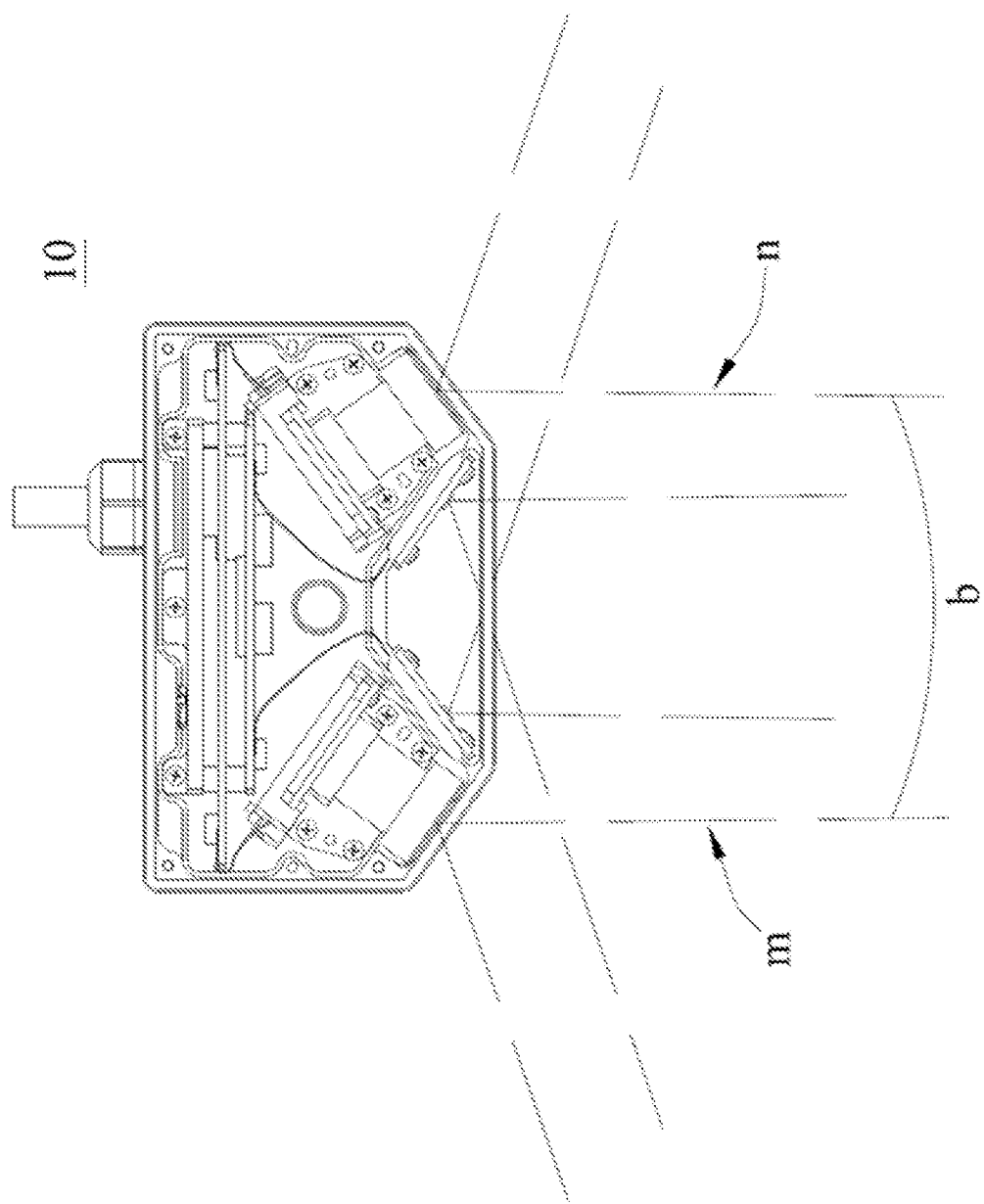
FIG. 23 is a third schematic full cross-sectional view of a LiDAR according to an embodiment of this application.

To eliminate a blind spot from the field of view of LiDAR 10, in this embodiment, as shown in FIG. 16 and FIG. 23, the first receiving device 310 has a first conical detection field, the first conical detection field has a first margin edge line m adjacent to the emission wall 1123, the second receiving device 320 has a second conical detection field, the second conical detection field has a second margin edge line n adjacent to the emission wall 1123, the first margin edge line m intersects with the second margin edge line n, and an intersection is located on a side of a surface of the emission wall 1123 facing a detected object. A minimum included angle b between the first margin edge line m and the second margin edge line n may be 1 degree. Because the LiDAR 10 has a small size, a distance between the first receiving device 310 and the second receiving device 320 is relatively small. Therefore, even if the included angle between the first margin edge line and the second margin edge line is small, a blind spot in the front field of view of the LiDAR 10 is not extremely large. For example, when the included angle b between the first margin edge line m and the second margin edge line n is 1 degree, because the distance between the first receiving device and the second receiving device is usually within 1 decimeter, the distance is considered to be 1 decimeter, and the farthest distance from the blind spot in the direct front field of view of the LiDAR is calculated to be 5.7 meters. The detection region of LiDAR may be longer than 5.7 meters. In addition, the blind spot is narrow and long, and has little impact on detection. A detected object appearing in the blind spot usually needs to pass by a detectable region, and therefore, even if the detected object appears in the long and narrow blind spot in direct front of the LiDAR, a motion parameter of the detected object can also be obtained indirectly.

As shown in FIG. 16 to FIG. 18, the inner casing 120 may include a first plate body 121 and a second plate body 122, and both the first plate body 121 and the second plate body 122 are separately connected to an emission wall 1123 and two end plates 111. An included angle between the first plate body 121 and the second plate body 122 is an obtuse angle (which refers to an angle between the first plate body 121 and the second plate body 122 that faces the emission chamber 210 herein). The first emission device 410 is arranged on a surface of the first plate body 121 that faces the emission chamber 210, and the second emission device 420 is arranged on a surface of the second plate body 122 that faces the emission chamber 210. After the first emission device 410 and the second emission device 420 are completely mounted, a central axis 510 of a laser beam emitted by the first emission device 410 can be made perpendicular to the first plate body 121, and a central axis 520 of a laser beam emitted by the second emission device 420 can be made perpendicular to the second plate body 122. In this way, when a shape of the inner casing 120 is designed, an included angle between the first plate body 121 and the second plate body 122 can be adjusted, to control a final emission field of view of the first emission device 410 and the second emission device 420, thereby reducing a design difficulty.

The inner casing 120 may only include the first plate body 121 and the second plate body 122, and the first plate body 121 and the second plate body 122 are integrated. In addition, the first plate body 121 and the second plate body 122 may also be plate bodies of the inner casing 120 that are used only for mounting the first emission device 410 and the second emission device 420, and the inner casing 120 also has another part.

To improve heat dissipation efficiency, in this embodiment, the inner casing 120 and a side wall plate 112 are integrated, and further, the inner casing 120, the side wall plate 112, and one end plate 111 may be integrated. With such structure, heat conduction efficiency of the two emission devices can be increased, thereby improving heat dissipation performance of the LiDAR 10. In an embodiment, for better heat dissipation, a plurality of heat dissipation grooves 1124 may be arranged on an outer wall surface of the side wall plate 112; and a plurality of heat dissipation ribs 1128 may be further arranged on an inner wall surface of the side wall plate 112. Specifically, the heat dissipation grooves 1124 can be blind grooves or through grooves, and each heat dissipation groove 1124 can be arranged at any part of the side wall plate 112 other than the first translucent plate 1126 and the second translucent plates 1125.

In an embodiment, a first mounting groove 1211 is arranged on a surface of the first plate body 121 that faces the first emission device 410, and the first emission device 410 is embedded in the first mounting groove 1211. A second mounting groove is arranged on a surface of the second plate body 122 that faces the second emission device 420, and the second emission device 420 is embedded in the second mounting groove. With such structure, the two emission devices are more stably mounted, and a contact area between the inner casing 120 and the two emission devices can also be increased, thereby improving heat dissipation performance. Further, a first heat conduction member may be further arranged in the first mounting groove 1211, and the first heat conduction member is connected to the first mounting groove 1211 and the first emission device 410. A second heat conduction member is arranged in the second mounting groove, and the second heat conduction member is connected to the second mounting groove and the second emission device 420. The first heat conduction member and the second heat conduction member may be made of any material with good heat conduction performance. In addition, the first heat conduction member and the second heat conduction member may also be made from a material with buffering performance. For example, the first heat conduction member and the second heat conduction member may both be thermal silicone.

A shape of the first heat conduction groove depends on a shape of the first emission device 410. In this embodiment, a surface of the first emission device 410 that faces the first plate body 121 is rectangular, and therefore, the first heat conduction groove is a trough with a rectangular cross-section. In this case, the first heat conduction member can be in a shape of a rectangular sheet and is placed on the bottom of the first heat conduction groove. The first heat conduction member can also be annular and located between an outer peripheral edge of the first emission device 410 and a side wall of the first heat conduction groove. Certainly, the first emission device 410, the first heat conduction groove, and the first heat conduction member may also have another shape. Details are described herein again.

Figure 28:
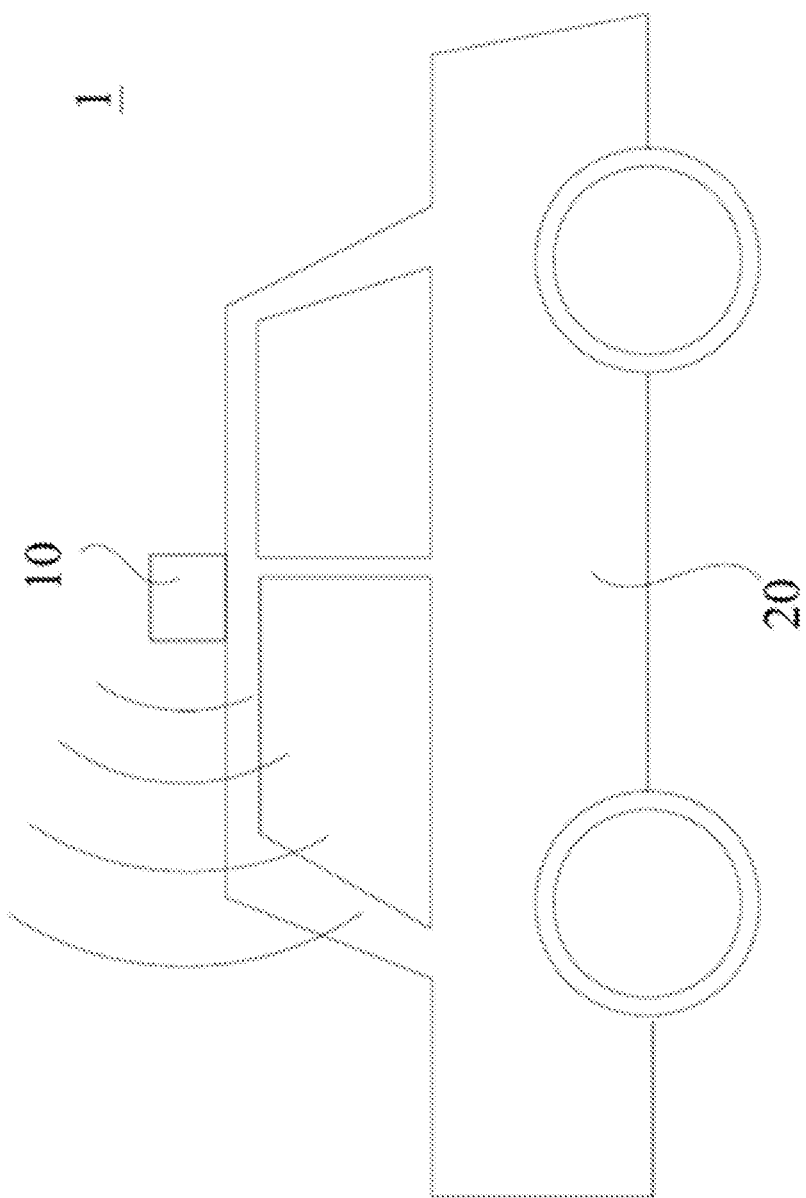
FIG. 28 is a schematic diagram of an apparatus according to an embodiment of this application.
Figure 29:
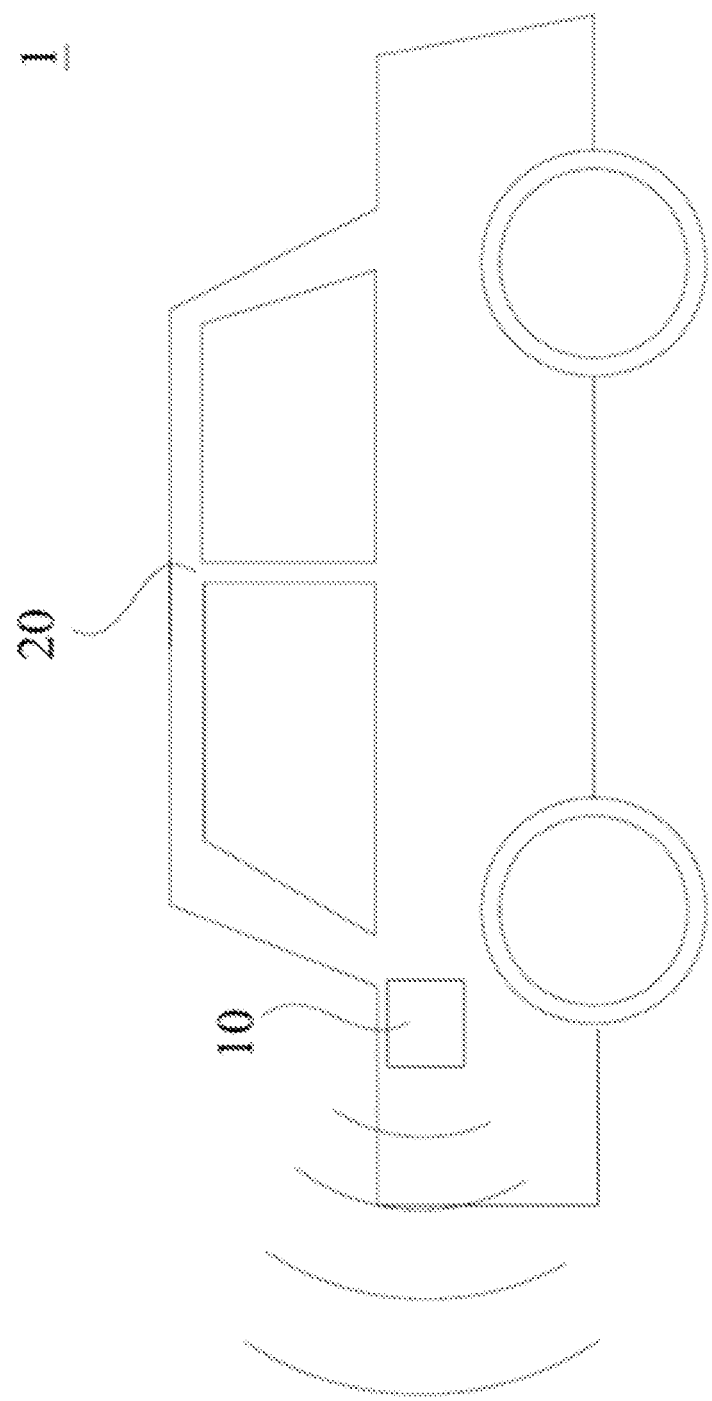
FIG. 29 is a schematic diagram of an apparatus according to another embodiment of this application.

As shown in FIG. 28 and FIG. 29, a second aspect of the embodiments of this application further provides an apparatus 1, where the apparatus 1 includes the LiDAR 10 in any one of the foregoing embodiments. The apparatus 1 can be any apparatus capable of detecting a laser, and specifically, the apparatus can be a vehicle. The vehicle includes a vehicle body 20, and the LiDAR 10 can be mounted outside the vehicle body 20 or embedded in the vehicle body 20. When the LiDAR 10 is arranged outside the vehicle body 20, the LiDAR 10 is preferably arranged on the top of the vehicle body 20.

The same or similar reference signs in the drawings of the embodiments correspond to the same or similar components. In descriptions of this application, it should be understood that orientation or position relationships indicated by terms such as "above," "under," "left," and "right" are based on the orientation or position relationships shown in the accompanying drawings, are merely intended to describe this application and simplify the descriptions, but are not intended to indicate or imply that the specified device or element shall have a specific orientation or be formed and operated in a specific orientation, and therefore, the terms for describing the position relationships in the drawings are only used for exemplary illustration, and should not be construed as a limitation on this patent. A person of ordinary skill in the art can understand specific meanings of the foregoing terms based on a specific situation.

The foregoing descriptions are only preferred embodiments of this application, and are not intended to limit this application. Any modification, equivalent replacement and improvement made within the spirit and principle of this application shall be included within the protection scope of this application.

What is claimed is:
1. A LiDAR, comprising:
a casing, demarcating an emission chamber and a receiving chamber;
a plurality of laser emission devices, arranged in the emission chamber and configured to emit a laser beam to a first target region;
a plurality of laser receiving devices, arranged in the receiving chamber,
wherein the plurality of laser receiving devices are configured to receive a laser beam reflected from a second target region, and the first target region and the second target region are at least partially overlapped wherein the first target region is formed by combining a plurality of emission subregions, and each laser emission device emits a laser beam to each emission subregion in a one-to-one correspondence manner;

the second target region comprises a plurality of detection subregions, each detection subregion is less than the first target region and at least partially overlaps with the first target region, and each laser receiving device receives, in a one-to-one correspondence manner, a laser beam reflected from each detection subregion;

a number of laser emission devices is the same as a number of laser receiving devices, and each laser receiving device receives, in a one-to-one correspondence manner, the laser beam emitted by each laser emission device to and reflected back from the first target region;

the laser emission devices comprise a first emission device and a second emission device, wherein the first emission device emits a first laser beam to a first emission subregion, the second emission device emits a second laser beam to a second emission subregion, the first emission subregion and the second emission subregion have an overlapped part, and the first target region is formed by combining the first emission subregion and the second emission subregion; and the laser receiving devices comprise a first receiving device and a second receiving device, wherein the first receiving device and the second receiving device are both configured to receive the laser beams reflected back from the first target region, wherein the first receiving device is configured to receive light from a first detection subregion, and the first detection subregion is located in the first emission subregion; and the second receiving device is configured to receive light from a second detection subregion, and the second detection subregion is located in the second emission subregion, and a control device, configured to control on-off of the first emission device and the second emission device, so that the first receiving device receives the first laser beam emitted by the first emission device to the first detection subregion and the second receiving device receives the second laser beam emitted by the second emission device to the second detection subregion, wherein the casing comprises:

an outer casing, demarcating an inner chamber, wherein the outer casing comprises a first translucent plate and two second translucent plates; and an inner casing, arranged in the inner chamber, wherein the inner casing is connected to an inner wall surface of the outer casing, and the inner casing divides the inner chamber into an emission chamber and a receiving chamber, wherein the first translucent plate faces the emission chamber, and laser beams emitted by the first emission device and the second emission device pass through the first translucent plate and are directed outside the LiDAR; and both the second translucent plates face the receiving chamber, the first receiving device receives the first laser beam passing through one of the second translucent plates, and the second receiving device receives the second laser beam passing through the other second translucent plate.

2. The LiDAR according to claim 1, wherein the outer casing comprises:

two opposite end plates; and a side wall plate, located between the two end plates and demarcating the inner chamber together with the two end plates, wherein the side wall plate comprises an emission wall, a first receiving wall, and a second receiving wall, wherein along a circumferential direction of the side wall plate, the first receiving wall and the second receiving wall are respectively located at two ends of the emission wall, the first translucent plate is arranged on the emission wall, and the two second translucent plates are arranged on the first receiving wall and the second receiving wall in a one-to-one correspondence, and wherein the inner casing is separately connected to the two end plates and the emission wall, and demarcates the emission chamber together with the emission wall and the two end plates.

3. The LiDAR according to claim 2, wherein the emission wall, the first receiving wall, and the second receiving wall are all plate-shaped, and wherein the first receiving wall and the emission wall form a first included angle, the second receiving wall and the emission wall form a second included angle, and the first included angle and the second included angle are equal, both of which are obtuse angles less than 180 degrees.

4. The LiDAR accoridng to claim 3, wherein the inner casing comprises a first plate body and a second plate body, and wherein the first plate body and the second plate body are respectively connected to the emission wall and the two end plates, an included angle between the first plate body and the second plate body that faces the emission chamber is an obtuse angle, the first emission device is provided on a surface of the first plate body facing the emission chamber, and the second emission device is provided on a surface of the second plate body facing the emission chamber.

5. The LiDAR according to claim 3, wherein the first receiving device has a first optical path axis, and the first optical path axis is perpendicular to the one of the two second translucent plates intersecting with the first optical path axis, wherein the second receiving device has a second optical path axis, and the second optical path axis is perpendicular to the other of the two second translucent plates intersecting with the second optical path axis, and wherein an included angle between the first optical path axis and the second optical path axis is greater than 45 degrees.

6. The LiDAR according to claim 3, wherein the first receiving device has a first conical detection field, and the first conical detection field has a first margin edge line adjacent to the emission wall, wherein the second receiving device has a second conical detection field, the second conical detection field has a second margin edge line adjacent to the emission wall, and the first margin edge line intersects with the second margin edge line, and wherein an intersection is located on a side of a surface of the emission wall facing a detected object.

* * * * *